US012203721B1

(12) United States Patent
Rosenthal

(10) Patent No.: US 12,203,721 B1
(45) Date of Patent: Jan. 21, 2025

(54) FLETCHING JIG ALIGNMENT DEVICE

(71) Applicant: Keith Brian Rosenthal, Onalaska, WI (US)

(72) Inventor: Keith Brian Rosenthal, Onalaska, WI (US)

( * ) Notice: Subject to any disclaimer, the term of this patent is extended or adjusted under 35 U.S.C. 154(b) by 536 days.

(21) Appl. No.: 17/384,752

(22) Filed: Jul. 24, 2021

(51) Int. Cl.
*F41B 5/14* (2006.01)
*B25B 11/02* (2006.01)
*F42B 6/06* (2006.01)

(52) U.S. Cl.
CPC ............. *F41B 5/1446* (2013.01); *B25B 11/02* (2013.01); *F41B 5/14* (2013.01); *F42B 6/06* (2013.01)

(58) Field of Classification Search
CPC ................................ F41B 5/1446; F42B 6/06
USPC .......................................................... 269/38
See application file for complete search history.

(56) References Cited

U.S. PATENT DOCUMENTS

| | | | | |
|---|---|---|---|---|
| 2,286,574 A * | 6/1942 | Rohde | B27M 3/22 | 269/95 |
| 2,337,080 A * | 12/1943 | Bitzenburger | B27M 3/22 | 269/254 R |
| 2,836,208 A | 5/1958 | Hoyt, Jr. | | |
| 3,121,280 A * | 2/1964 | McFadden | F41B 5/1446 | 269/38 |
| 3,330,551 A * | 7/1967 | Bitzenburger | F41B 5/1446 | 269/254 R |
| 3,846,998 A * | 11/1974 | Lock | F41B 5/148 | 33/506 |
| 4,620,431 A * | 11/1986 | Muldoon | B21D 3/14 | 33/508 |
| 4,623,410 A * | 11/1986 | Hillesheim | G01B 5/0023 | 156/64 |
| 5,515,766 A * | 5/1996 | Fleury | F42B 33/10 | 86/44 |
| 6,394,919 B1 * | 5/2002 | Ossege | F41B 5/12 | 473/582 |
| 2014/0066237 A1 * | 3/2014 | Marshall, Jr. | F41B 5/1446 | 473/586 |

FOREIGN PATENT DOCUMENTS

CN 118268418 A * 7/2024

* cited by examiner

*Primary Examiner* — Mahdi H Nejad
(74) *Attorney, Agent, or Firm* — BRRLaw LLC; Bryan R. Rosiejka

(57) ABSTRACT

An inventive fletching jig alignment device suitable for aligning a fletching jig assembly, and thus a fletching component to a shaft component of an arrow, comprises a base assembly, an adjustment assembly and a fletching assembly. Preferably, the alignment is accurate to within 0.01 inch or less. In some embodiments, the inventive fletching jig alignment device comprises a plurality of fletching assemblies, wherein the alignment configuration of each fletching assembly can be adjusted simultaneously. Accordingly, in such embodiments, a fletching component can be aligned to a plurality of arrow shaft components simultaneously. The invention also provides a method for aligning a fletching jig assembly.

28 Claims, 18 Drawing Sheets

FLETCHING JIG ALIGNMENT DEVICE

TECHNICAL FIELD

The present disclosure generally relates to archery arrows. More particularly, the present disclosure is directed to a device which can precisely align fletching components to a desired configuration, such as for accurate and repeatable application of fletching components upon one or more arrow shaft components.

BACKGROUND

An archery arrow typically comprises one or more fletching components (also referred to more simply as "fletching" or "vanes") which, among other things, can help steer, stabilize and/or rotate the arrow after being launched from a bow. Such fletching components can also help correct any slight errors that would otherwise influence an arrow's flight. As a result, precise alignment and disposition of such fletching components onto the shaft of an arrow is an important variable. In addition, such fletching components can be configured upon an arrow in a variety of orientations, including straight (i.e., parallel) with respect to the longitudinal axis of the arrow, angled with respect to the longitudinal axis of the arrow, or spiraled (i.e., helical) about the longitudinal axis of the arrow. Typically, a conventional arrow will have three (3) fletching components disposed about the circumference of an arrow shaft, although less or more fletching components can also be utilized.

To aid with the alignment and attachment of fletching components to an arrow shaft, a fletching jig can be utilized. Such fletching jigs can help generally align each fletching component to an arrow shaft after which the fletching components are typically glued into position. However, such fletching jigs have limitations. For example, on their own, such fletching jigs can be susceptible to alignment variation and thus can lack the precision and repeatability required, particularly when applying fletching components to a plurality of arrows. Thus, there is a need for a fletching jig alignment device which can precisely align such fletching jigs, and thus ultimately the fletching component upon an arrow shaft component. In addition, there is a further need for a fletching jig alignment device which can precisely reproduce a variety fletching jig assembly alignment configurations on a repeated basis.

In addition, most existing fletching jigs are limited to a single arrow when attaching fletching components to an arrow shaft. Moreover, utilizing a single fletching jig for a plurality of arrows is time consuming and can limit production. Thus, there is an additional need for a fletching jig alignment device that can accommodate a plurality of fletching jigs while precisely aligning each jig simultaneously, preferably having an accuracy within about 0.01 inch or less.

SUMMARY

The inventive fletching jig alignment device of the present disclosure solves one or more of the needs enumerated above. In some preferred embodiments, the inventive fletching jig alignment device can comprise a generally rectangular base member having a first or top side (which is preferably a planar surface) an opposing second or bottom side distal to the top side, a third or "point" side (which generally faces the same direction as the point component of an arrow when properly disposed during use) orthogonal to top and bottom sides, an opposing fourth or "nock" side (which generally faces the same direction as the nock component of an arrow when properly disposed during use) distal to the point side, a fifth or "adjustment" side (which generally faces the side or end at which a user can make adjustments to the device) orthogonal to the top and bottom sides and orthogonal to the point and nock sides, and an opposing sixth or "calibration" side (which generally faces the side or end at which a user can calibrate the device) distal to the adjustment side. The inventive device also comprises first and second jig support base members which are disposed upon, and substantially anchored to, the top side of the base member. The inventive device further comprises first and second adjustable members disposed upon, and movably attached to, the top side of the base member. Such base member, first and second jig support base members, and first and second adjustable members, together form a base assembly. The inventive device additionally comprises a fletching assembly and an adjustment assembly, each disposed upon the base assembly. In general, the fletching assembly is adapted to hold a shaft component of an arrow, and is also adapted to secure a fletching component for alignment to the shaft component. In some embodiments, the fletching assembly can further provide for attachment of the fletching component to the shaft component. In some embodiments, the inventive fletching jig alignment device herein can comprise a plurality of fletching assemblies, each comprising a fletching jig assembly, thus allowing for the precise alignment of such fletching jig assemblies (and thus ultimately a fletching component to a plurality of shaft components) simultaneously. Preferably, such alignment is accurate to within 0.01 inch or less, such as within 0.005 inch or less, or within 0.001 inch or less.

In some embodiments, an inventive fletching jig alignment device for aligning a fletching component to a shaft component of an arrow comprises an alignment accuracy of about 0.01 inch or less. In some aspects of such embodiments, the alignment is adjustable in a longitudinal direction with respect to the device. In other aspects of such embodiments, the inventive fletching jig alignment device is capable of aligning a fletching component to a shaft component of a plurality of arrows simultaneously. In still other aspects of such embodiments, the inventive fletching jig alignment device can provide for attachment of the fletching component to the shaft component. In yet other aspects of such embodiments, the inventive fletching jig alignment device comprises a base assembly, an adjustment assembly and a fletching assembly. In further aspects of such embodiments, the inventive fletching jig alignment device comprises a plurality of fletching assemblies.

In some embodiments, an inventive fletching jig alignment device for aligning a fletching component to a shaft component of an arrow comprises a base assembly, a fletching assembly and an adjustment assembly.

In some embodiments, an inventive fletching jig alignment device for aligning a fletching component to a shaft component of an arrow comprises a base assembly, a fletching assembly and an adjustment assembly, wherein the base assembly comprises a base member, a first jig support base member, a second jig support base member, a first adjustable member and a second adjustable member. In further aspects of such embodiments, the base member comprises a top side, a bottom side, a point side, a nock side, an adjustment end and a calibration end, wherein the first jig support base member, the second jig support base member, the first adjustable member and the second adjustable member are disposed upon the top side of the base member. In still further aspects of such embodiments, the first jig support base member is disposed proximate to the point side of the base member, the second adjustable member is disposed proximate to the nock side of the base member, the first adjustable member is disposed between the first jig support base member and the second adjustable member, and the second jig support base member is disposed between the first adjustable member and the second adjustable member. In yet further aspects of such embodiments, the first adjustable member and the second adjustable member are each movable in at least a longitudinal direction with respect to the base member.

In some embodiments, an inventive fletching jig alignment device for aligning a fletching component to a shaft component of an arrow comprises a base assembly, a fletching assembly and an adjustment assembly, wherein the fletching assembly comprises an arrow shaft support base member, a first clamp base member, a second clamp base member and a fletching jig assembly. In further aspects of such embodiments, the arrow shaft support base member is disposed upon the first jig support base member and the second jig support base member, the first clamp base member is disposed upon the first adjustable member, and the second clamp base member is disposed upon the second adjustable member. In other aspects of such embodiments, the fletching jig assembly is disposed upon the arrow shaft support base member, the first clamp base member, and the second clamp base member. In still other aspects of such embodiments, the fletching jig assembly comprises an arrow shaft support member adapted to hold a shaft component of an arrow, a clamp mounting member, and a fletching clamp member adapted to secure a fletching component of an arrow. In yet other aspects of such embodiments, the arrow shaft support member is disposed upon the arrow shaft support base member, the clamp mounting member is disposed upon the first clamp base member and the second clamp base member, and the fletching clamp member is removably disposed upon the clamp mounting member.

In some embodiments, an inventive fletching jig alignment device for aligning a fletching component to a shaft component of an arrow comprises a base assembly, a fletching assembly and an adjustment assembly, wherein the adjustment assembly comprises a first adjustment subassembly and a second adjustment subassembly. In further aspects of such embodiments, the first adjustment subassembly is disposed upon the base member proximate to the adjustment end thereof and is substantially longitudinally aligned with the first adjustable member, and the second adjustment subassembly is disposed upon the base member proximate to the adjustment end thereof and is substantially longitudinally aligned with the second adjustable member. In other aspects of such embodiments, the first adjustment subassembly comprises a first adjustment assembly support member disposed upon the base member, a first adjustment base member disposed upon the first adjustable member, a first adjustment element extending from the first adjustment assembly support member to the first adjustment base member, and a first distance measurement device disposed upon the first adjustment assembly support member, and the second adjustment subassembly comprises a second adjustment assembly support member disposed upon the base member, a second adjustment base member disposed upon the second adjustable member, a second adjustment element extending from the second adjustment assembly support member to the second adjustment base member, and a second distance measurement device disposed upon the second adjustment assembly support member. In still other aspects of such embodiments, the first adjustment subassembly can adjust the position of the first adjustable member with an accuracy of about 0.01 inch or less, and the second adjustment subassembly can adjust the position of the second adjustable member with an accuracy of about 0.01 inch or less. In yet other aspects of such embodiments, the first adjustment subassembly further comprises a biasing means, and the second adjustment subassembly further comprises a biasing means.

In some embodiments, an inventive fletching jig alignment device for aligning a fletching component to a shaft component of an arrow comprises a base assembly, an adjustment assembly, and a plurality of fletching assemblies. In further aspects of such embodiments, the inventive fletching jig alignment device can adjustably align the plurality of fletching assemblies simultaneously. In other aspects of such embodiments, the inventive fletching jig alignment device can adjustably align the plurality of fletching assemblies with an accuracy of about 0.01 inch or less.

In some embodiments, a method for aligning a fletching jig assembly comprises:

a) providing a fletching jig alignment device comprising a base assembly, a fletching assembly and an adjustment assembly, wherein the base assembly comprises a first adjustable member and a second adjustable member, wherein the adjustment assembly comprises a first adjustment subassembly and a second adjustment subassembly, and wherein the fletching assembly comprises a fletching jig assembly; and
b) manipulating the first adjustment subassembly to positionally adjust the first adjustable member and manipulating the second adjustment assembly to positionally adjust the second adjustable member to attain a fletching jig assembly alignment configuration.

In some further aspects of this method embodiment, the fletching jig assembly comprises an arrow shaft support member, a clamp mounting member, and a fletching clamp member, and the method further comprises:

a) providing a shaft component of an arrow;
b) providing a fletching component of an arrow;
c) removing the fletching clamp member from the fletching jig alignment device;
d) suitably securing the shaft component upon the arrow shaft support member;
e) suitably securing a fletching component into the fletching clamp member; and
f) affixing the fletching clamp member to the clamp mounting member such that an exposed edge of the fletching component is in contact with the shaft component.

In still further aspects of this method embodiment, the method further comprises:

a) applying an attachment means to the exposed edge of the fletching component; and
b) attaching the fletching component to the shaft component.

In other aspects of this method embodiment, the fletching jig assembly alignment configuration comprises an accuracy of about 0.01 inch or less. In still other aspects of this method embodiment, the fletching jig alignment device comprises a plurality of fletching assemblies. In further aspects of this method embodiment, the fletching jig assembly alignment configuration of each of the plurality of fletching assemblies is achieved simultaneously. In still further aspects of this method embodiment, the fletching jig assembly alignment configuration of each of the plurality of fletching assemblies comprises an accuracy of about 0.01 inch or less.

In other aspects of this method embodiment, the steps of the method of claim 26 are performed prior to the manipulating step of claim 25.

In some embodiments, a method for aligning a fletching jig assembly comprises:

a) providing a fletching jig alignment device comprising a base assembly, a fletching assembly and an adjustment assembly, wherein the base assembly comprises a first adjustable member and a second adjustable member, wherein the adjustment assembly comprises a first adjustment subassembly and a second adjustment assembly, and wherein the fletching assembly comprises a fletching jig assembly;
b) providing a shaft component of an arrow;
c) providing a fletching component of an arrow;
d) removing the fletching clamp member from the fletching jig alignment device;
e) suitably securing the shaft component upon the arrow shaft support member;
f) suitably securing a fletching component into the fletching clamp member;
g) affixing the fletching clamp member to the clamp mounting member such that an exposed edge of the fletching component is in contact with the shaft component; and
h) manipulating the first adjustment subassembly to positionally adjust the first adjustable member and manipulating the second adjustment assembly to positionally adjust the second adjustable member to attain a fletching jig assembly alignment configuration.

Numerous other features and advantages of the present invention will appear from the following description. In the description, reference is made to exemplary embodiments of the invention. Such embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

FIGURES

The foregoing and other features, aspects and advantages of the present invention will become better understood with regard to the following description, appended claims and accompanying drawings where:

Figure 1:
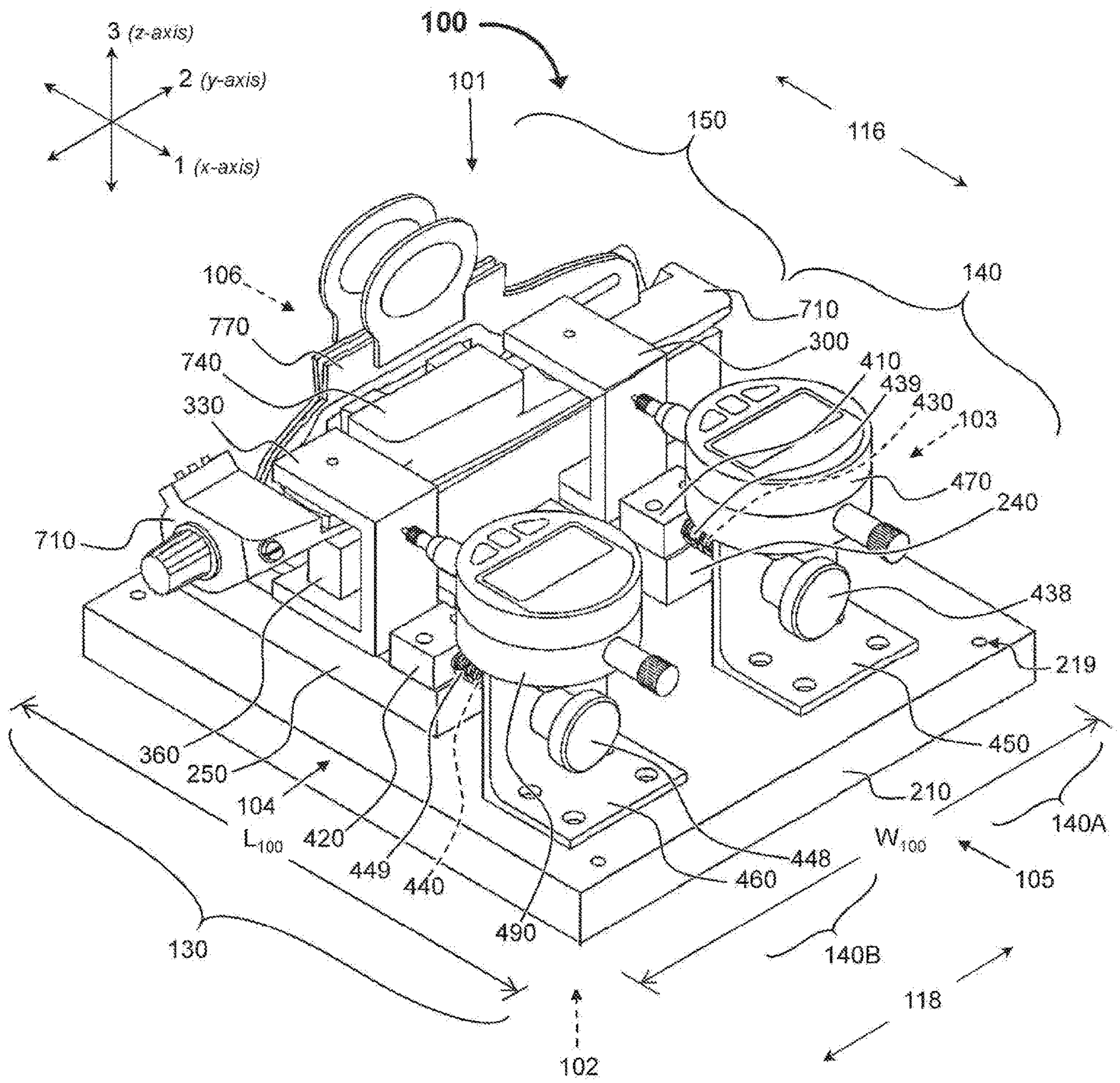
FIG. 1 is a perspective view showing a non-limiting exemplary embodiment of the fletching jig alignment device of the present invention comprising one (1) fletching assembly.

Repeated use of reference characters in the present specification and drawings is intended to represent the same or analogous features or elements of the present invention. It should be understood that the drawings herein are not intended to be drawn to scale, but rather are drawn to show particular elements of the invention.

Definitions

It should be noted that, when employed in the present disclosure, the terms "a" and "an" are intended to mean "at least one" of any stated features, elements, integers, steps, components, or groups and are not intended to be limited to only one of such features, elements, integers, steps, components, or groups thereof, except where specifically stated as such. In addition, use of the phrase "at least one" is not intended to render other uses of the terms "a" or "an" to be limited to only one of a feature, element, integer, step, component, or group.

It should be noted that, when employed in the present disclosure, the terms "comprises," "comprising" and other derivatives from the root term "comprise" are intended to be open ended terms that specify the presence of any stated features, elements, integers, steps, components, or groups, and are not intended to preclude the presence or addition of one or more other features, elements, integers, steps, components, or groups thereof.

As used herein, the term "adjustment" when used in reference to a side, end or edge, refers to the side, end or edge which generally faces the side, end or edge at which a user can make adjustments to the device 100 via the adjustment assembly 140, and which is distal to the calibration side, end or edge.

As used herein, the term "calibration" when used in reference to a side, end or edge, refers to the side, end or edge which generally faces the side, end or edge at which a user can calibrate the device 100, and which is distal to the adjustment side, end or edge.

As used herein, the term "nock" when used in reference to a side, end or edge, refers to the side, end or edge which generally faces the same direction as the nock component 806 of an arrow 800 (or where the nock component 806 would typically be disposed upon the shaft component 802 of such arrow 800) when properly mounted within the device 100 during use, and which is distal to the point side, end or edge.

As used herein, the term "point" when used in reference to a side, end or edge, refers to the side, end or edge which generally faces the same direction as the point component 804 of an arrow 800 (or where the point component 804 would typically be disposed upon the shaft component 802 of such arrow 800) when properly mounted within the device 100 during use, and which is distal to the nock side, end or edge.

These terms may be defined with additional language in the remaining portions of the specification.

DETAILED DESCRIPTION

The invention is generally directed to the alignment of a fletching component to a shaft component of an archery arrow. More particularly, the invention of the present disclosure is directed to a device which can precisely align one or more fletching assemblies to a desired fletching jig assembly alignment configuration, such that a fletching component can be aligned with respect to a shaft component of one or more archery arrows simultaneously, such as for attachment thereto. In some preferred embodiments, the inventive device can repeatedly and precisely provide such fletching jig assembly alignment configuration with an accuracy of about 0.01 inch (0.25 mm) or less, more preferably about 0.005 inch (0.127 mm) or less, and most preferably about 0.001 inch (0.025 mm) or less, despite induced changes to the orientation of the fletching assembly.

Although several exemplary embodiments of the present invention will be described herein, it should be understood that the disclosed embodiments are intended merely as non-limiting examples of the invention that may be embodied in various forms. Therefore, specific details disclosed herein, such as relating to structure, function, and the like, are not to be interpreted as limiting in any manner whatsoever, but rather only as one of numerous example bases for claims and/or teaching persons having ordinary skill in the art to variously employ the present invention in virtually any appropriately detailed structure or circumstance.

Accordingly, in the interest of brevity and conciseness, descriptions herein may be substantially directed to the non-limiting exemplary form of a generally rectangular inventive fletching jig alignment device which can accommodate up to six (6) fletching assemblies, and thus is suitable for aligning a fletching component upon one (1) to six (6) arrow shaft components simultaneously. It should be understood that the invention of the present disclosure can accommodate as few as one (1) fletching assembly or greater than six (6) fletching assemblies (i.e., there is no particular upper limit) without departing from the scope of the invention.

Figure 2A:
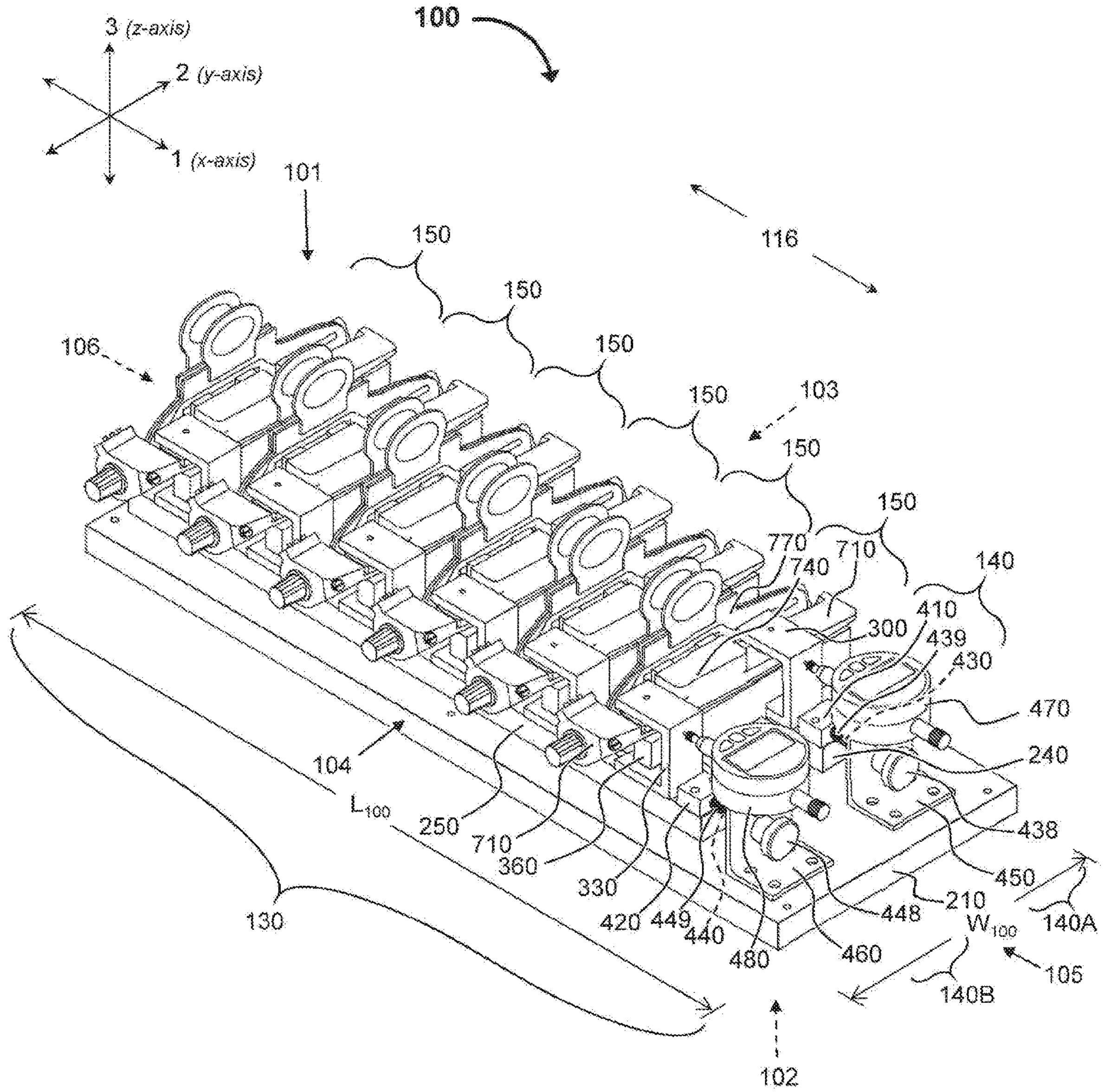
FIG. 2A is a perspective view showing a non-limiting exemplary embodiment of the fletching jig alignment device of the present invention comprising six (6) fletching assemblies.
Figure 2B:
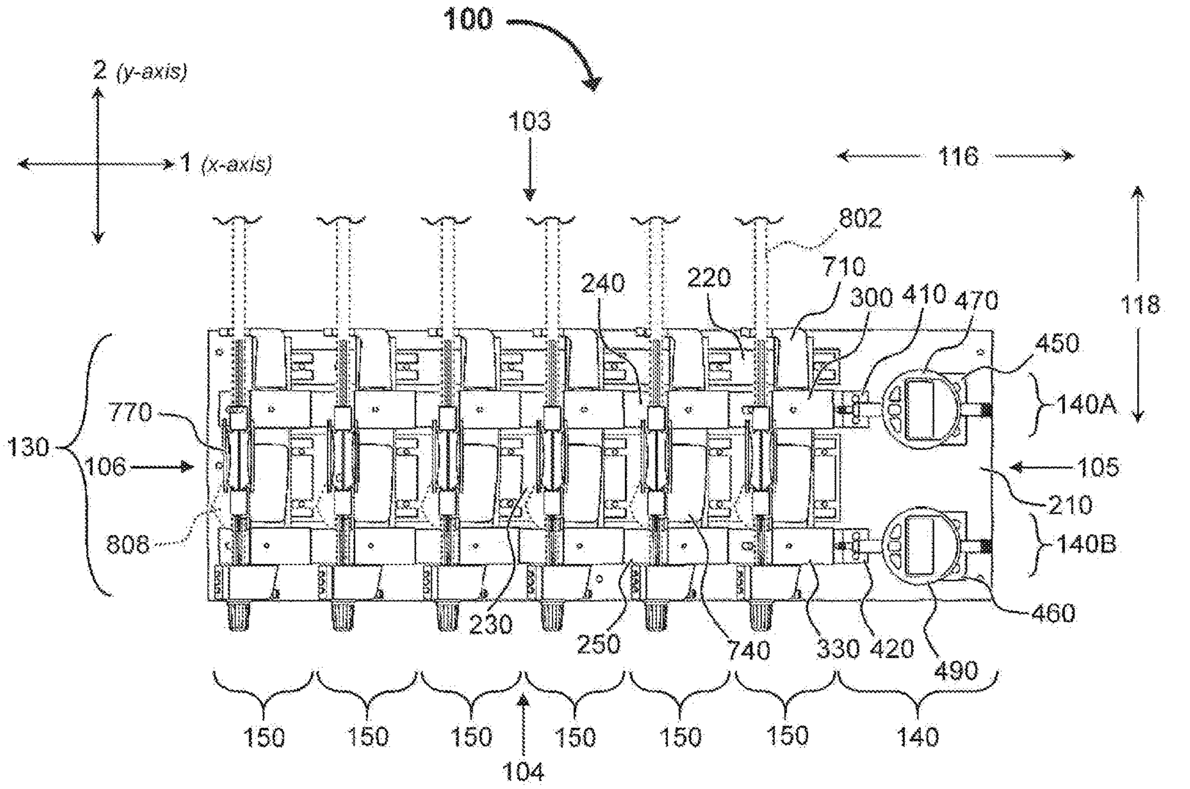
FIG. 2B is a top view showing the fletching jig alignment device of FIG. 2A.
Figure 2C:
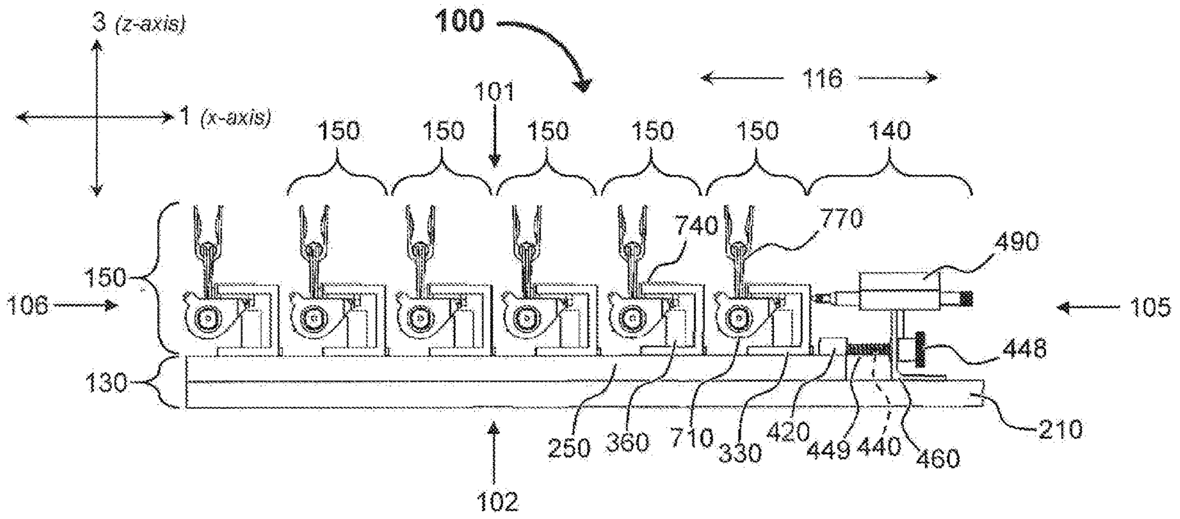
FIG. 2C is a side view showing the fletching jig alignment device of FIG. 2A.
Figure 2D:
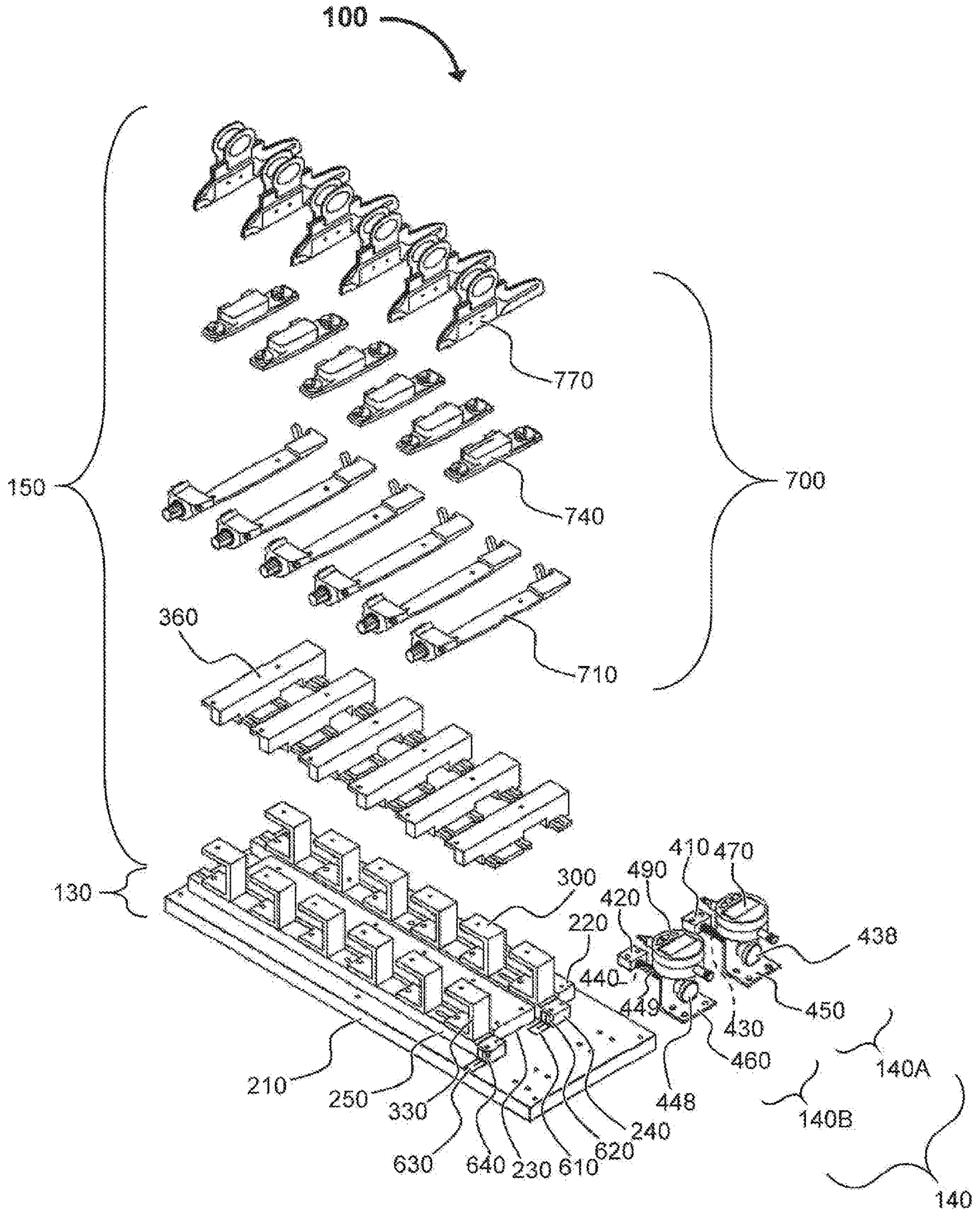
FIG. 2D is an exploded perspective view showing the fletching jig alignment device of FIG. 2A.

To gain a better understanding of the present invention, attention is directed to FIGS. 1-23 for exemplary purposes showing several non-limiting exemplary embodiments of an inventive fletching jig alignment device 100 of the present disclosure. With particular reference to FIGS. 1-2D, the fletching jig alignment device 100 comprises a base assembly 130, an adjustment assembly 140 (also may be referred to herein as an "alignment assembly"), and a fletching assembly 150. For example, the embodiment illustrated in FIG. 1 comprises one (1) fletching assembly 150 and the embodiment illustrated in FIG. 2A comprises six (6) fletching assemblies.

For purposes of reference herein, the base assembly 130 generally comprises a base member 210, a first jig support base member 220, a second jig support base member 230, a first adjustable member 240 and a second adjustable member 250.

For purposes of reference herein, the adjustment assembly 140 generally comprises a first adjustment subassembly 140A and a second adjustment subassembly 140B. The first adjustment subassembly 140A generally comprises a first adjustment assembly support member 450, a first adjustment base member 410, a first adjustment element 430 and a first distance measurement device 470. The second adjustment subassembly 140B generally comprises a second adjustment assembly support member 460, a second adjustment base member 420, a second adjustment element 440 and a second distance measurement device 490.

For purposes of reference herein, each fletching assembly 150 generally comprises an arrow shaft support base member 360, a first clamp base member 300, a second clamp base member 330, and a fletching jig assembly 700. Each fletching jig assembly 700 comprises an arrow shaft support member 710, a clamp mounting member 740 and a fletching clamp member 770.

The base assembly 130, adjustment assembly 140 and fletching assembly 150, and the respective components thereof, will be discussed further below.

Continuing with FIGS. 1-2D, the illustrated non-limiting exemplary fletching jig alignment device 100 exhibits a generally rectangular shape profile, and generally comprises a first or top side 101, an opposing second or bottom side 102 distal to the top side 101, a third or "point" side 103 (which generally faces the same direction as the point component 804 of an arrow 800 when properly mounted within the device 100 during use) generally orthogonal (e.g., in the y-z plane) to the top side 101 and bottom side 102, an opposing fourth or "nock" side 104 (which generally faces the same direction as the nock component 806 of an arrow 800 when properly mounted within the device 100 during use) distal to the point side 103, a fifth or "adjustment" side or end 105 (which is generally orthogonal to the point side 103 and nock side 104 in the x-y plane, and which generally faces the side at which a user can make adjustments to the device 100 via the adjustment assembly 140), and an opposing sixth or "calibration" side or end 106 (which is generally orthogonal to the point side 103 and nock side 104 in the x-y plane, and which generally faces the side at which a user can calibrate the device 100) distal to the adjustment end 105. In addition, the device 100 can comprise at least an overall length $L_{100}$ dimension in the longitudinal direction 116 (i.e., along the x-axis 1) and width $W_{100}$ dimension in the transverse direction 118 (i.e., along the y-axis 2).

Figure 3:
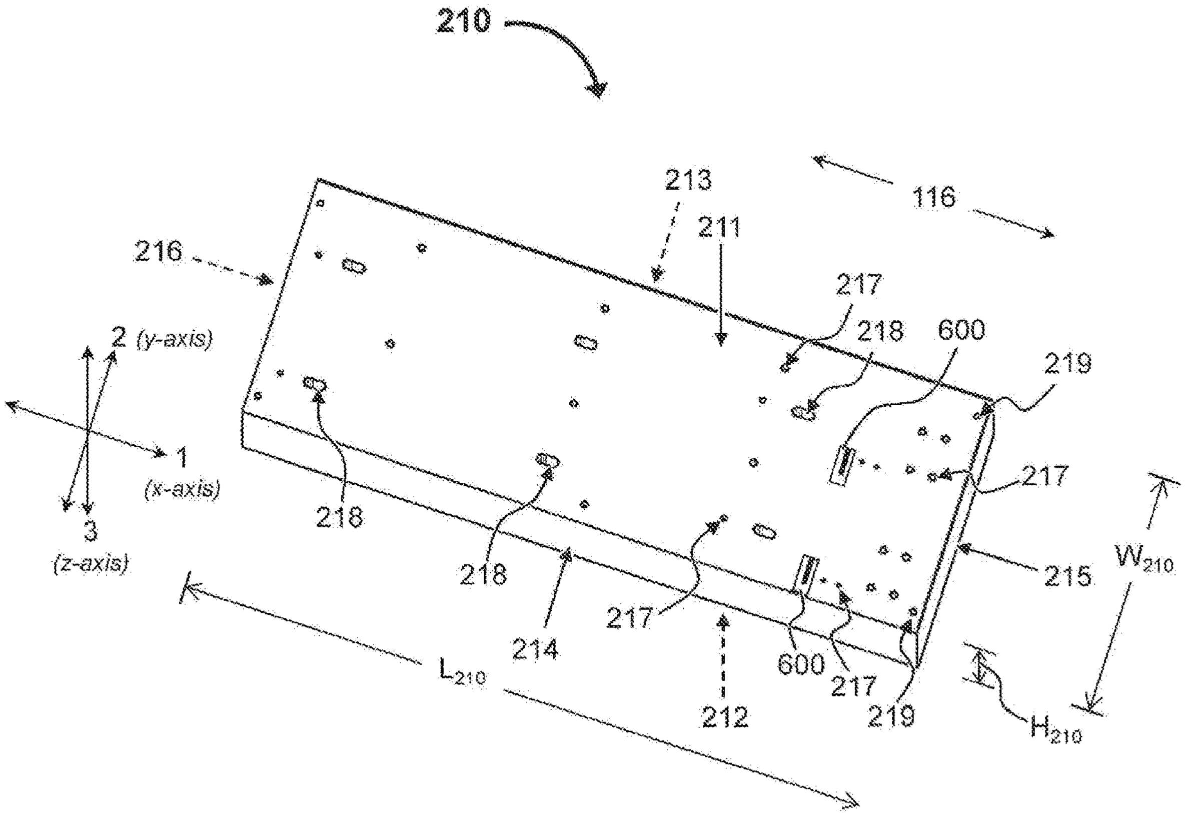
FIG. 3 is a perspective view showing a non-limiting exemplary embodiment of a base member of the of the fletching jig alignment device of the present invention.

Referring now to FIG. 3, the inventive fletching jig alignment device comprises a base member 210. One purpose of the base member is to provide support for essentially all components of the device 100. Another purpose can include providing a substrate for optionally mounting the device 100, such as onto a surface or onto an optional device mounting member 900, for example.

As illustrated in the non-limiting exemplary embodiment of FIG. 3, the base member 210 can comprise a generally rectangular shape profile, though it need not be. Accordingly, the base member 210 can comprise a first or top side 211 (which is preferably a major planar surface), an opposing second or bottom side 212 (which may be major planar surface) distal to the top side 211, a third or point side or edge 213 (which is generally orthogonal to the top side 211 and bottom side 212 in the y-z plane), an opposing fourth or nock side or edge 214 distal to the point side 213, a fifth or adjustment side, edge or end 215 (which is generally orthogonal to the point side 213 and nock side 214 in the x-y plane), and an opposing sixth or "calibration" side, edge or end 216 distal to the adjustment end 215. In some embodiments, the base member 210 can also comprise a length $L_{210}$, a width $W_{210}$ and a height $H_{210}$.

The base member 210 can comprise any suitable material, preferably a rigid material, as known to persons having ordinary skill in the art, and can include thermoplastics (polyethylene, polypropylene, polyvinyl chloride (PVC), etc.), metals, wood, ceramic, and the like, and combinations thereof. In one non-limiting exemplary embodiment, the base member 210 comprises high-density polyethylene.

The base member 210 can also have any suitable shape and dimensions (length, width, thickness/height, diameter, etc.) without departing from the scope of the invention, provided it can accommodate the various components of the device 100. For example, where the base member 210 comprises a rectangular shape profile, the width $W_{210}$ will typically be at least equivalent to or greater than the width $W_{710}$ of the particular arrow shaft support member 710 intended to be utilized with the device 100, though it may be less than the width $W_{710}$ in some alternative embodiments.

Various components of the device 100 can be attached (statically or adjustably) to the base member 210 (preferably to the top side 211 of the base member 210), as will be discussed further below. Suitable fastening means for securing such components to the base member 210 include those known to persons having ordinary skill in the art, such as screws, bolts, magnets, rivets, tacks, staples, nails, studs, compression fittings, adhesives, hook-and-loop, and the like, and combinations thereof. In some embodiments, the base member 210 can optionally comprise a plurality of apertures typically disposed at least partially through the thickness thereof (i.e., extending from the top side 211 towards or through the bottom side 212). Such optional apertures can include a device mounting aperture 219 for optionally securing the device 100 to an item (e.g., table, work bench, optional mounting member 900, etc.), a static component aperture 217 for securing or anchoring one or more components of the device 100 (such as a component of the base assembly 120) wherein such components are generally not intended to move during use, and/or an adjustable component aperture 218 for securing one or more components of the device 100 (such as a component of the base assembly 120) wherein such components are generally capable of being positionally adjusted prior to or during use (typically in the longitudinal 116 direction). In some desirable embodiments, an adjustable component aperture 218 can have a longitudinally 116 oblong shape (e.g., rectangular, oval, racetrack, etc.) with dimensions (e.g., longitudinal length) suitable to accommodate a particular adjustment range.

In some embodiments, one or more optional alignment means 600 (e.g., lines, dots, arrows, notches, bumps, sounds, etc.) can be disposed upon or incorporated into the top side 211 surface of the base member 210, which can assist with the initial set-up and/or alignment of the device 100 prior to or during use (see e.g., FIG. 2D), such as after initial calibration of the device 100. Such optional alignment means 600 (discussed further below) may desirably be located near the adjustment end 215 of the base member 210, though such alignment means can be located at any functional location without departing from the scope of the invention.

Figure 4:
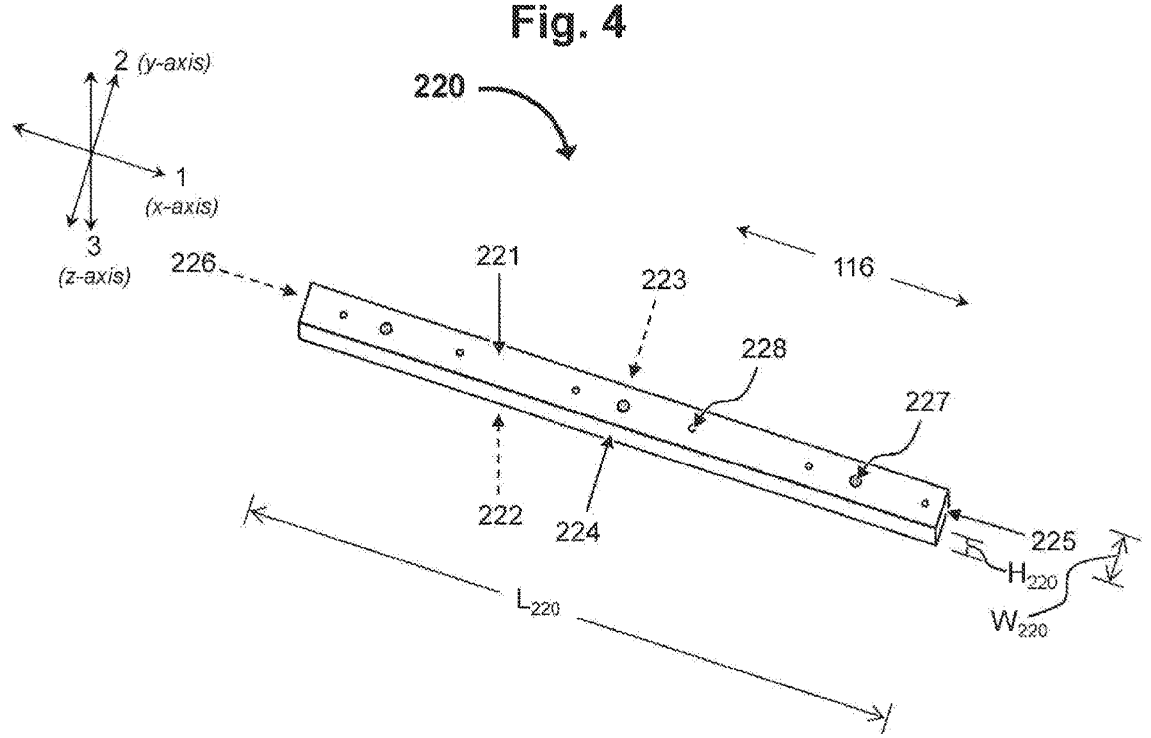
FIG. 4 is a perspective view showing a non-limiting exemplary embodiment of a first jig support base member of the of the fletching jig alignment device of the present invention.

Referring now to FIG. 4, the inventive device 100 also comprises a first jig support base member 220. One purpose of the first jig support base member 220 is to provide a support surface upon which the point end 363 of the arrow shaft support base member 360 can be disposed. Another purpose is to provide vertical spacing or distance as measured from the top side 211 of the base member 210 (i.e., upward along the z-axis 3) to help ensure the arrow shaft support base member 360 will have sufficient clearance above the first and second adjustable members 240, 250 (discussed further below). Desirably, the first jig support base member 220 is disposed generally longitudinally 116 upon the top side 211 of the base member 210, preferably adjacent to or proximate to the point side 213 thereof.

As illustrated in the non-limiting exemplary embodiment of FIG. 4, the first jig support base member 220 can comprise a generally rectangular shape profile, though it need not be. Accordingly, the first jig support base member 220 can generally comprise a first or top side 221 (which is preferably a major planar surface), an opposing second or bottom side 222 (which is preferably a major planar surface) distal to the top side 221, a third or point side or edge 223 (which is generally orthogonal to the top side 221 and bottom side 222 in the y-z plane), an opposing fourth or nock side or edge 224 distal to the point side 223, a fifth or adjustment side, edge or end 225 (which is generally orthogonal to the point side 223 and nock side 224 in the x-y plane), and an opposing sixth or calibration side, edge or end 226 distal to the adjustment end 225. Accordingly, the first jig support base member 220 can also comprise a length $L_{220}$, a width $W_{220}$ and a height $H_{220}$.

The first jig support base member 220 can comprise any suitable material, preferably a rigid material, as known to persons having ordinary skill in the art, and can include thermoplastics (polyethylene, polypropylene, polyvinyl chloride (PVC), etc.), metals, wood, ceramic, and the like, and combinations thereof. In one non-limiting exemplary embodiment, the first jig support base member 220 comprises high-density polyethylene.

The first jig support base member 220 can have any functional shape and dimensions (length, width, thickness/height, diameter, etc.) without departing from the scope of the invention. For example, in devices 100 comprising multiple fletching assemblies 150, the device 100 can comprise a single (e.g., strip-like) first jig support base member 220, or the device 100 can comprise multiple first jig support base members 220 aligned generally longitudinally 116 (such as in an end-to-end configuration) (e.g., each dedicated to a respective fletching assembly 150).

As referenced above, the first jig support base member 220 can be affixed to the base member 210 (typically upon the top side 211 of the base member 210 and adjacent to or proximate to the point side 213 thereof). Suitable fastening means for securing the first jig support base member 220 to the base member 210 include those known to persons having ordinary skill in the art, such as screws, bolts, magnets, rivets, tacks, staples, nails, compression fittings, adhesives, hook-and-loop, and the like, and combinations thereof. In some embodiments, the first jig support base member 220 can optionally comprise a plurality of apertures typically disposed through the thickness thereof (i.e., extending from the top side 221 towards or through the bottom side 222). Such apertures can include a support base member mounting aperture 227 for securely affixing or anchoring the first jig support base member 220 to the base member 210 and/or a jig support member mounting aperture 228 for securing the point side 363 portion of the arrow shaft support base member 360 to the first jig support base member 220. Such optional apertures 227 and/or 228 can have any suitable shape as known to persons having ordinary skill in the art, including circular, triangular, square, star-shaped, and the like, without departing from the scope of the invention.

Figure 5:
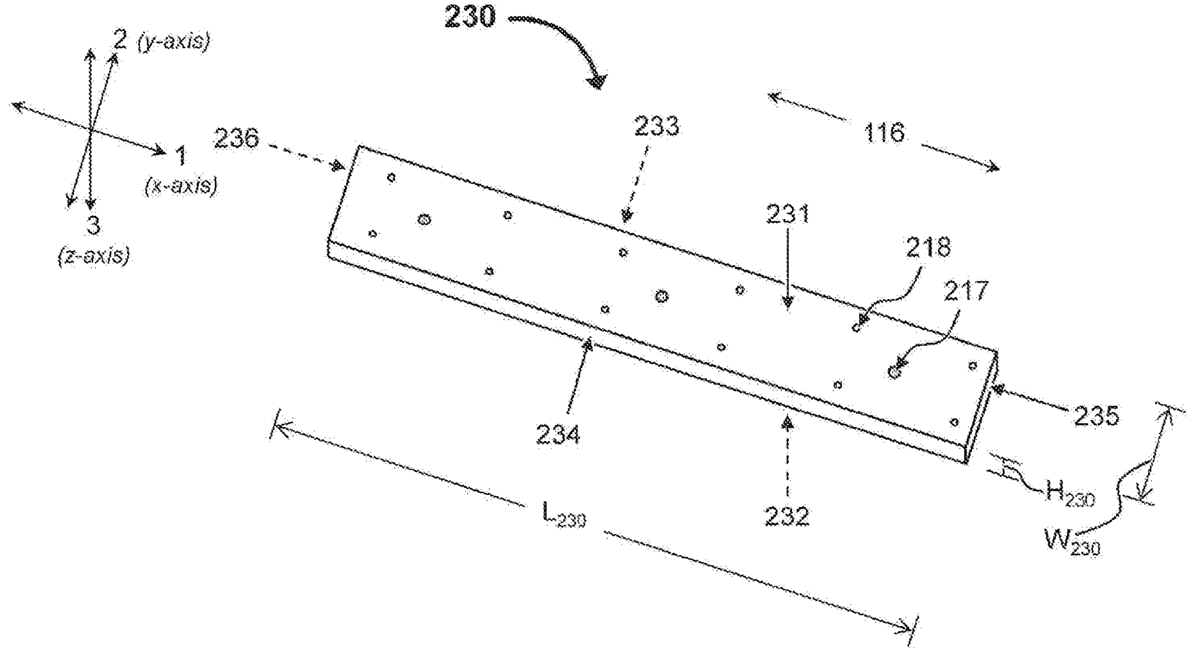
FIG. 5 is a perspective view showing a non-limiting exemplary embodiment of a second jig support base member of the of the fletching jig alignment device of the present invention.

Referring now to FIG. 5, the inventive fletching jig alignment device 100 also comprises a second jig support base member 230. One purpose of the second jig support base member 230 is to provide a support surface upon which the general nock end 364 of the arrow shaft support base member 360 can be disposed. Another purpose is to provide vertical spacing or distance as measured from the top side 211 of the base member 210 (i.e., along the z-axis 3) to help ensure the arrow shaft support base member 360 will have sufficient clearance above the first and second adjustable members 240, 250. An additional purpose, if desired, is to help ensure the arrow shaft support base member 360 is relatively level, such as with respect to the top side 211 of the base member 210. Desirably, the second jig support base member 220 is disposed generally longitudinally 116 upon the top side 211 of the base member 210, generally between the first jig support base member 220 and the nock side 214 of the base member 210.

As illustrated in the non-limiting exemplary embodiment of FIG. 5, the second jig support base member 230 can comprise a generally rectangular shape profile, though it need not be. Accordingly, the second jig support base member 230 can comprise a first or top side 231 (which is preferably a major planar surface), an opposing second or bottom side 232 (which is preferably a major planar surface) distal to the top side 231, a third or point side or edge 233 (which is generally orthogonal to the top side 231 and bottom side 232 in the y-z plane), an opposing fourth or nock side or edge 234 distal to the point side 233, a fifth or adjustment side, edge or end 235 (which is generally orthogonal to the point side 233 and nock side 234 in the x-y plane), and an opposing sixth or calibration side, edge or end 236 distal to the adjustment end 235. Accordingly, the second jig support base member 230 can also comprise a length $L_{230}$, a width $W_{230}$ and a height $H_{230}$. Typically, at least the height $H_{230}$ dimension of the second jig support base member 230 will generally be equivalent to that of the first jig support base member 220, though it need not be in some alternative embodiments.

The second jig support base member 230 can comprise any suitable material, preferably a rigid material, as known to persons having ordinary skill in the art, and can include thermoplastics (polyethylene, polypropylene, polyvinyl chloride (PVC), etc.), metals, wood, ceramics, and the like, and combinations thereof. In one non-limiting exemplary embodiment, the second jig support base member 230 comprises high-density polyethylene.

The second jig support base member 230 can have any functional shape and dimensions (length, width, thickness/height, diameter, etc.) without departing from the scope of the invention. For example, in devices 100 comprising multiple fletching assemblies 150, the device 100 can comprise a single (e.g., strip-like) second jig support base member 230, or the device 100 can comprise multiple second jig support base members 230 aligned generally longitudinally 116 (such as in an end-to-end configuration) (e.g., each dedicated to a respective fletching assembly 150).

As referenced above, the second jig support base member 230 can be affixed to the base member 210 (typically upon the top side 211 of the base member 210 generally between the first jig support base member 220 and the nock side 214 of the base member 210). Suitable fastening means for securing the second jig support base member 230 to the base member 210 include those known to persons having ordinary skill in the art, such as screws, bolts, magnets, rivets, tacks, staples, nails, compression fittings, adhesives, hook-and-loop, and the like, and combinations thereof. In some embodiments, the second jig support base member 230 can optionally comprise a plurality of apertures typically disposed through the thickness thereof (i.e., extending from the top side 231 towards or through the bottom side 232). Such apertures can include a support base member mounting aperture 237 for securely affixing or anchoring the second jig support base member 230 to the top side 211 of the base member 210, and/or a jig support member mounting aperture 238 for securing the nock side 364 portion of the arrow shaft support base member 360 to the second jig support base member 230. Such optional apertures 237 and/or 238 can have any suitable shape known to persons having ordinary skill in the art, including circular, triangular, square, star-shaped, and the like, without departing from the scope of the invention.

Figure 10A:
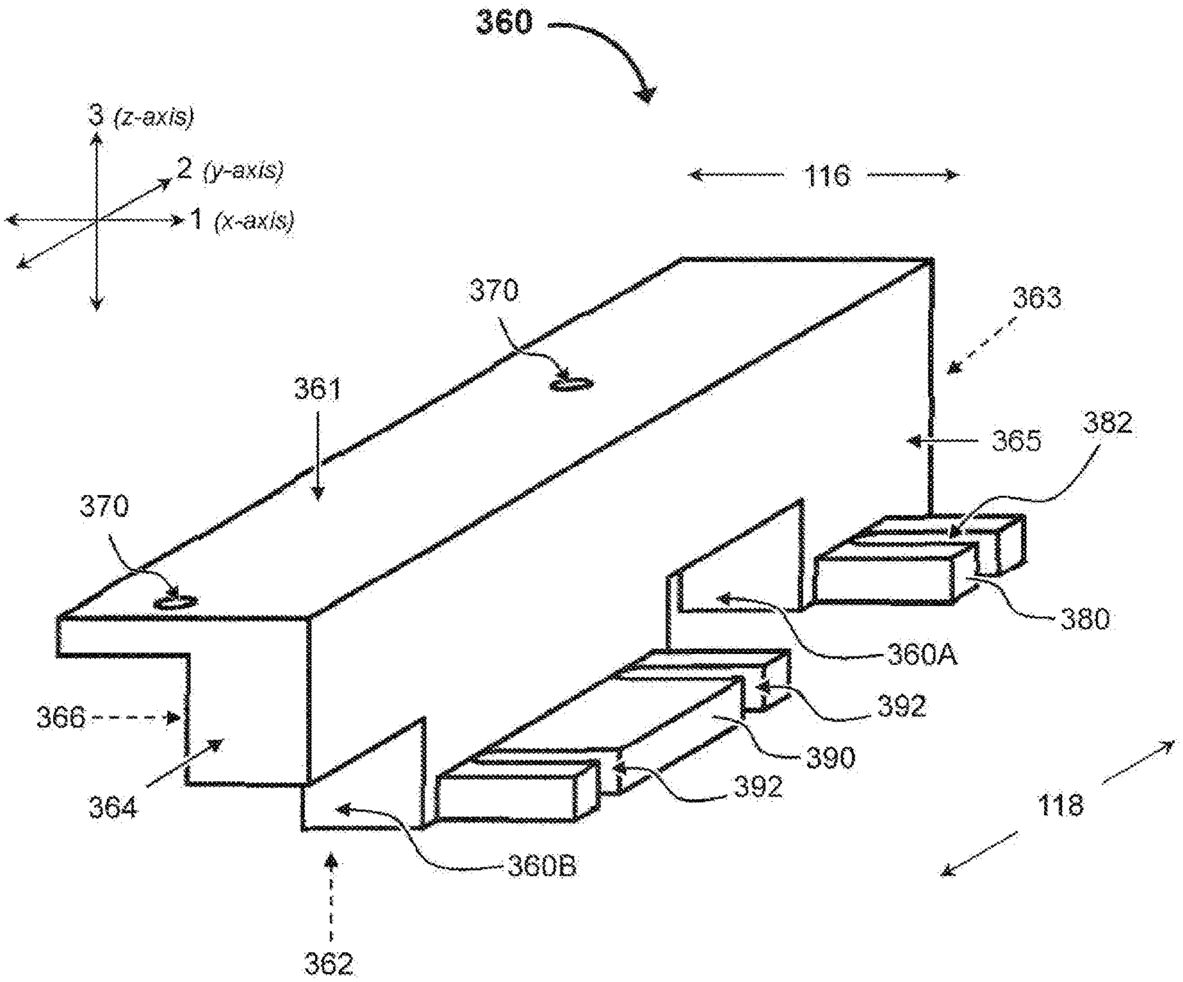
FIG. 10A is a perspective view showing a non-limiting exemplary embodiment of an arrow shaft support base member of the of the fletching jig alignment device of the present invention.
Figure 10B:
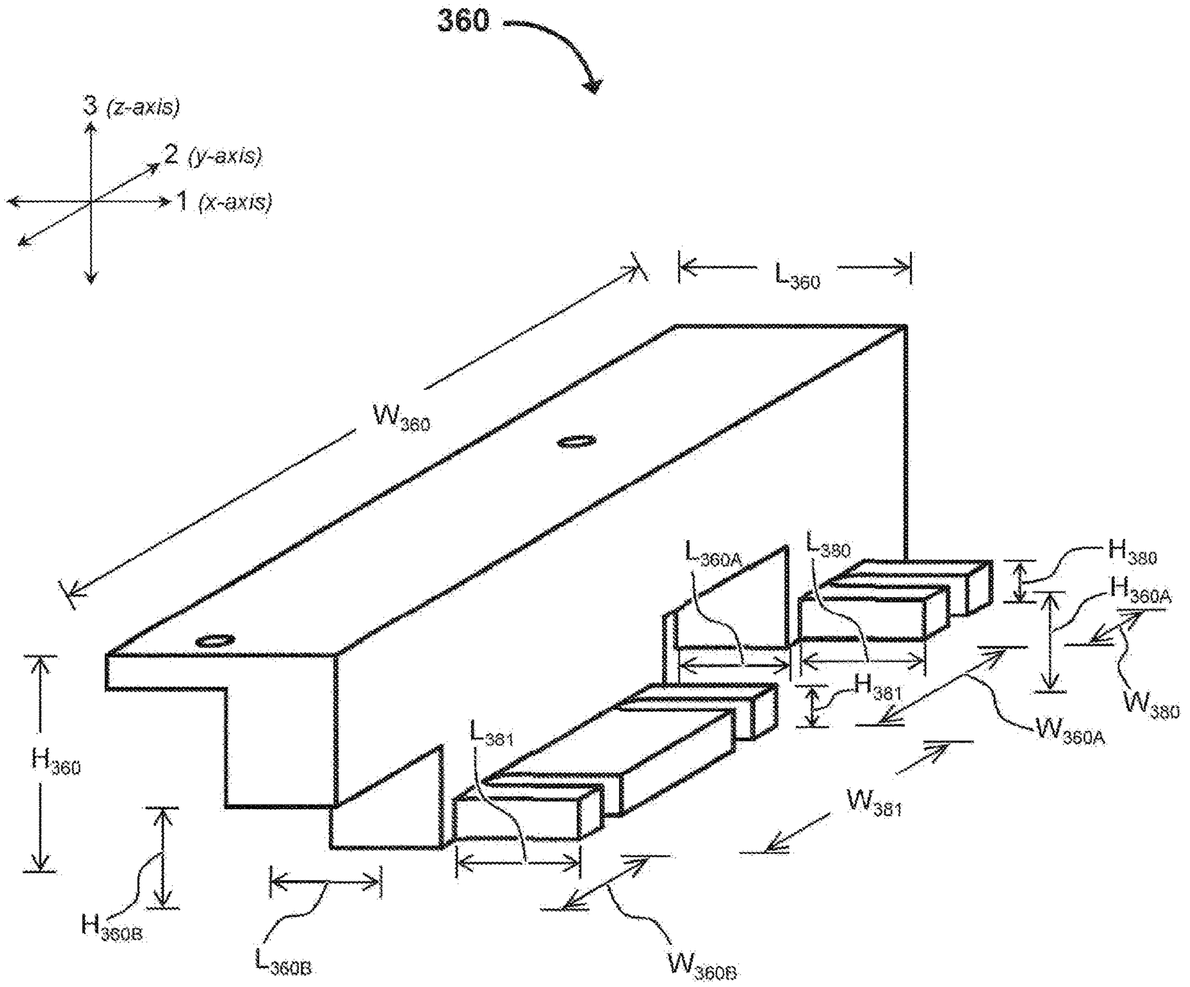
FIG. 10B is a perspective view showing the arrow shaft support base member of FIG. 10A.

Referring now to FIGS. 10A-10B, disposed upon the first jig support base member 220 and the second jig support base member 230 (desirably in a generally transverse 118 configuration with respect to the device 100) is an arrow shaft support base member 360. One purpose of the arrow shaft support base member 360 is to affix the arrow shaft support member 710 component of the fletching jig assembly 700 (discussed further below) to the inventive device 100.

As illustrated in the non-limiting exemplary embodiment of FIG. 10A, the arrow shaft support base member 360 can comprise a first or top side 361 (which is preferably a major planar surface), an opposing second or bottom side 362 distal to the top side 361, a third or point side or end 363 (which is generally orthogonal to the top side 361 and bottom side 362 in the y-z plane), an opposing fourth or nock side or end 364 distal to the point end 363, a fifth or adjustment side 365 (which is generally orthogonal to the point side 363 and nock side 364 in the x-y plane), and an opposing sixth or calibration side 366 (which is generally orthogonal to the point side 363 and nock side 364 in the x-y plane) distal to the adjustment side 365.

As further illustrated in FIG. 10B, in some embodiments, the arrow shaft support base member 360 can comprise a length $L_{360}$, a width $W_{360}$ and a height $H_{360}$. Typically, the width $W_{360}$ will be greater than the distance as measured from the point side 223 of the first jig support base member 220 to the nock side 234 of the second jig support base member 230, though it may be equivalent or less in some alternative embodiments. Typically, the height $H_{360}$ will be adapted such that the combination of the arrow shaft support base member 360, the arrow shaft support member 710 and the clamp mounting member 740 will fit beneath the bottom side 314 of the upper horizontal portion 310 of a corresponding first clamp base member 300 (discussed further below), as well beneath the bottom side 344 of the upper horizontal portion 340 of a corresponding second clamp base member 330 (discussed further below), during use of the device 100.

In some embodiments, the general bottom side 362 portion of the arrow shaft support base member 360 can comprise a first opening 360A (also referred to herein as a "first open portion") which is generally defined by a length $L_{360A}$, a width $W_{360A}$ and a height $H_{360A}$, and which can preferably accommodate the presence of the lower horizontal portion 322 of a corresponding first clamp base member 300 during use of the device 100. Accordingly, the width $W_{360A}$ will typically be at least as great as the width $W_{300}$ of a corresponding first clamp base member 300 and the height $H_{360A}$ will be at least as great as the thickness or caliper $T_{300}$ of the lower horizontal portion 322 of a corresponding first clamp base member 300.

In some embodiments, the general bottom side 362 portion of the arrow shaft support base member 360 can similarly comprise a second opening 360B (also referred to herein as a "second open portion") which is generally defined by a length $L_{360B}$, a width $W_{360B}$ and a height $H_{360B}$, and which can accommodate the presence of the lower horizontal portion 352 of a corresponding second clamp base member 330 during use of the device 100. Accordingly, the width $W_{360B}$ will typically be at least as great as the width $W_{330}$ of a corresponding second clamp base member 330 and the height $H_{360B}$ will be at least as great as the thickness or caliper $T_{330}$ of the lower horizontal portion 352 of a corresponding second clamp base member 330.

The arrow shaft support base member 360 can comprise any suitable material, preferably a rigid material, as known to persons having ordinary skill in the art, and can include metal, plastic, wood, ceramic, and the like, and combinations thereof. In one non-limiting exemplary embodiment, the arrow shaft support base member 360 comprises aluminum.

During use of the device 100, the bottom side 362 of the arrow shaft support base member 360 is preferably disposed upon, and generally in contact with, the top side 221 of the first jig support base member 220 and the top side 231 of the second jig support base member 230. Suitable fastening means for securing the arrow shaft support base member 360 to the first and second jig support base members 220, 230 include those known to persons having ordinary skill in the art, such as screws, bolts, rivets, nails, compression fittings, adhesives, magnets, hook-and-loop, and the like, and combinations thereof.

During use of the device 100, the arrow shaft support member 710 component of the fletching assembly 150 can preferably be affixed to the top side 361 of the arrow shaft support base member 360, though it may be affixed to an alternative location upon the arrow shaft support base member 360 without departing from the scope of the invention. Suitable means for securing the arrow shaft support member 710 component to the arrow shaft support base member 360 include those known to persons having ordinary skill in the art, and can include screws, bolts, rivets, pins, compression fittings, adhesives, hook-and-loop, and the like, and combinations thereof. For example, as illustrated in FIG. 10A, disposed through the top side 361 of the arrow shaft support base member 360 can be an optional jig mounting aperture 370, such as for use with screws, bolts, pins, rivets, studs, compression fittings, and the like, and combinations thereof.

In some embodiments, the arrow shaft support base member 360 can comprise an optional first mounting element 380 (such as generally disposed on the alignment side 365 of the arrow shaft support base member 360 and generally located between the first opening 360A and the point end 363 thereof). For example, such first mounting element 380 can extend from the general bottom side 362 of the shaft alignment support member 360 toward the adjustment end 105 of the device 100, though other functional mounting elements and locations known to persons having ordinary skill in the art can also be utilized without departing from the scope of the invention. As illustrated in FIG. 10B, such first mounting element 380 can be further defined by a length $L_{380}$, a width $W_{380}$ and a height $H_{380}$. In addition, such optional first mounting element 380 can comprise at least one mounting aperture 382 disposed therethrough (such as for use with screws, bolts, nails, pins, rivets, studs, compression fittings, etc.), wherein the mounting aperture 382 can correspond to an optional jig support member mounting aperture 228 of the first jig support base member 220, for example. In some embodiments, such aperture 382 can optionally comprise a general U-shape or oval-shape (i.e., longitudinally 116 oblong), which can allow for fine or minute adjustment of the arrow shaft support base member 360 in the longitudinal direction 116 for example (such as for calibration purposes, for example). One non-limiting example is shown in FIG. 10A wherein the arrow shaft support base member 360 comprises an optional first mounting element 380 comprising one (1) U-shaped mounting aperture 382.

In some embodiments, the arrow shaft support base member 360 can additionally or alternatively comprise an optional second mounting element 390 (such as generally disposed on the alignment side 365 of the shaft alignment support member 360 and generally located between the first opening 360A and the second opening 360B thereof). For example, such second mounting element 390 can extend from the general bottom side 362 of the shaft alignment support member 360 toward the adjustment end 105 of the device 100, though other functional mounting elements and locations known to persons having ordinary skill in the art can also be utilized without departing from the scope of the invention. As illustrated in FIG. 10B, such second mounting element 390 can be further defined by a length $L_{390}$, a width $W_{390}$ and a height $H_{390}$. In addition, such optional second mounting element 390 can comprise at least one mounting aperture 392 disposed therethrough (such as for use with screws, bolts, nails, pins, rivets, studs, compression fittings, etc.), wherein the mounting aperture 392 can correspond to an optional jig support member mounting aperture 238 of the second jig support base member 230, for example. In some embodiments, such aperture 392 can comprise a general U-shape or oval-shape (i.e., longitudinally 116 oblong) which can allow for fine or minute adjustment of the arrow shaft support base member 360 in the longitudinal direction 116 for example (such as for calibration purposes, for example). One non-limiting example is shown in FIG. 10A wherein the arrow shaft support base member 360 comprises an optional second mounting element 390 comprising two (2) U-shaped mounting apertures 392.

Figure 6:
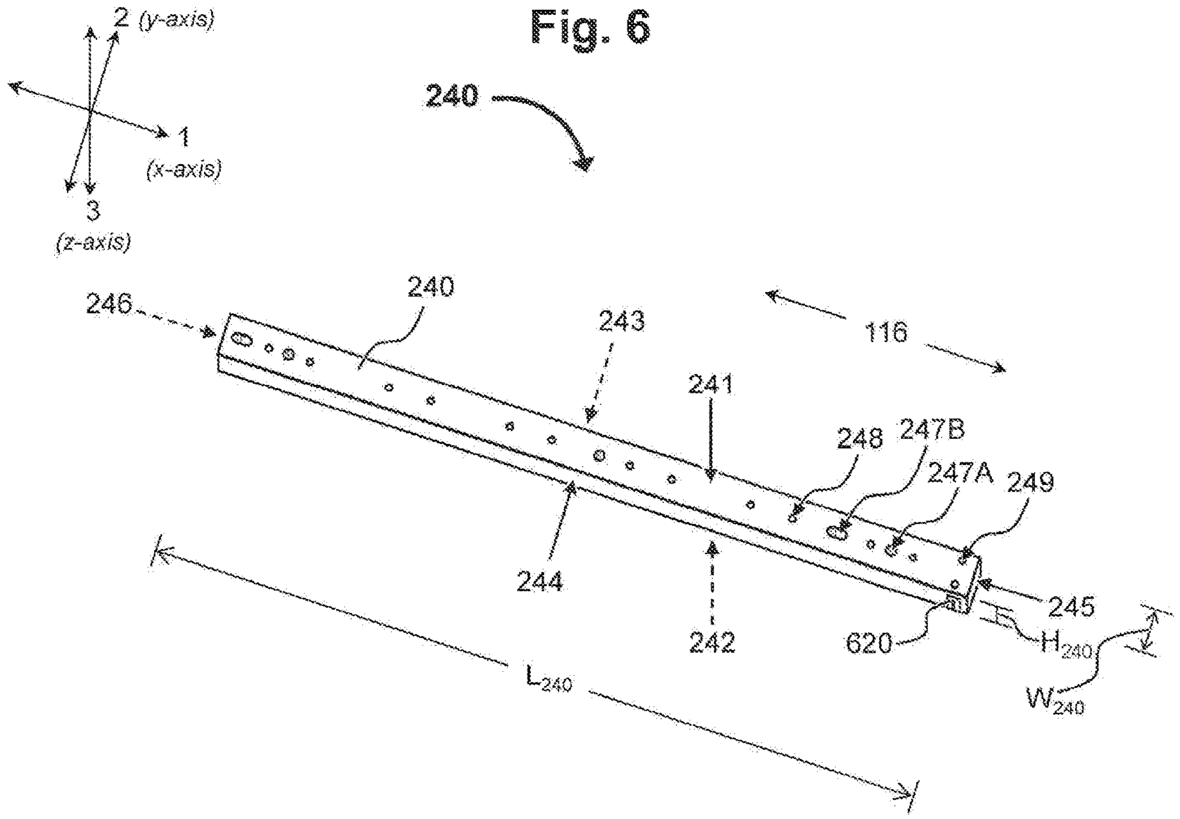
FIG. 6 is a perspective view showing a non-limiting exemplary embodiment of a first adjustable member of the of the fletching jig alignment device of the present invention.

Referring now to FIG. 6, the inventive fletching jig alignment device 100 also comprises a first adjustable member 240. One purpose of the first adjustable member 240 is to provide for at least longitudinal 116 movement (i.e., positional adjustment) of the first clamp base member 300 (and thus ultimately of the point end 773 of the fletching clamp member 770). Desirably, the first adjustable member 240 is disposed longitudinally 116 upon the top side 211 of the base member 210, typically between the first jig support base member 220 and the second jig support base member 230 (desirably disposed generally equidistant therebetween, though it need not be).

As illustrated in the non-limiting exemplary embodiment of FIG. 6, the first adjustable member 240 can comprise a generally rectangular shape profile, though it need not be. Accordingly, the first adjustable member 240 can comprise a first or top side 241 (which is preferably a major planar surface), an opposing second or bottom side 242 (which may be a major planar surface), a third or point side or edge 243 (which is generally orthogonal to the top side 241 and bottom side 242 in the y-z plane), an opposing fourth or nock side or edge 244 distal to the point side 243, a fifth or adjustment side, edge or end 245 (which is generally orthogonal to the point side 243 and nock side 244 in the x-y plane), and an opposing sixth or calibration side, edge or end 246 distal to the adjustment end 245. In such embodiments, the first adjustable member 240 can also comprise a length $L_{240}$, a width $W_{240}$ and a height $H_{240}$. Desirably, at least the height $H_{240}$ dimension of the first adjustable member 240 will be generally equivalent to the height $H_{220}$ of the first jig support base member 220 and/or the height $H_{230}$ of the second jig support base member 230, though it may be less than or greater than the height $H_{220}$ of the first jig support base member 220 and/or the height $H_{230}$ of the second jig support base member 230 without departing from the scope of the invention.

The first adjustable member 240 can comprise any suitable material, preferably a rigid material, as known to persons having ordinary skill in the art, such as thermoplastics (polyethylene, polypropylene, polyvinyl chloride (PVC), etc.), metals, wood, ceramics, and the like, and combinations thereof. By way of example only, in one non-limiting exemplary embodiment, the first adjustable member 240 can comprise high-density polyethylene.

The first adjustable member 240 can have any functional shape and dimensions (length, width, thickness/height, diameter, etc.) without departing from the scope of the invention, provided it can accommodate a first clamp base member 300. For example, in devices 100 comprising a plurality of fletching assemblies 150, the device 100 can comprise a single (e.g., strip-like) first adjustable member 240, or the device 100 can comprise multiple interconnected first adjustable members 240 (such as longitudinally 116 aligned in an end-to-end configuration, for example) (e.g., each dedicated to a respective first clamp base member 300).

Suitable fastening means for adjustably securing the first adjustable member 240 to the base member 210 include those known to persons having ordinary skill in the art, such as screws, bolts, studs, rivets, doweling, pins, compression fittings, releasable adhesives, magnets, hook-and-loop, and the like, and combinations thereof. Preferably, such fastening means will be suitable for allowing positional adjustment (e.g., longitudinal 116 movement) of the first adjustable member 240 with respect to the base member 210.

In some embodiments, the first adjustable member 240 can further comprise optional apertures at least partially disposed through the thickness thereof which extend from the bottom side 242 towards or through the top side 241. Such apertures can comprise an optional static mounting aperture 247A (e.g., disposed at least through the bottom side 242 and which aligns or mates with a corresponding optional adjustable component aperture 218 of the base member 210) for movably attaching the first adjustable member 240 to the top side 211 of the base member 210, and/or an optional adjustable mounting aperture 247B (which preferably corresponds to a respective optional static component aperture 217 of the base member 210) for movably attaching the first adjustable member 240 to the top side 211 of the base member 210.

In some embodiments, the first adjustable member 240 can further comprise optional apertures at least partially disposed through the thickness thereof which extend from the top side 241 towards or through the bottom side 242. Such apertures can comprise an optional static clamp base mounting aperture 248 for securing and anchoring a first clamp base member 300 to the top side 241 of the first adjustable member 240, and/or an optional static adjustment base mounting aperture 249 for securing and anchoring a first adjustment base member 410 to the top side 241 of the first adjustable member 240 (preferably located proximate or adjacent to the adjustment end 245 thereof).

Generally, the optional static apertures 247A, 248, 249 can have any suitable shape profile known to persons having ordinary skill in the art, including circular, triangular, square, star-shaped, and the like, without departing from the scope of the invention. In contrast, the optional adjustable mounting aperture 247B can desirably have an oblong shape profile with dimensions (e.g., a longitudinal 116 length dimension) suitable to accommodate a particular positional adjustment range. Suitable shape profiles for such adjustable mounting aperture 247B include those known to persons having ordinary skill in the art, such as rectangular, ovular, racetrack, and the like. It may be noted that in some embodiments of the device 100 comprising an adjustable mounting aperture 247B in the first adjustable member 240 and/or an adjustable component aperture 218 in the base member 210, the length of the aperture 247B and/or 218 can generally define the distance range of movement (e.g. longitudinal 116 movement) of the first adjustable member 240 (i.e., the length range between the device's 100 fully contracted state and fully extended state).

By way of example only, in one non-limiting exemplary embodiment, a doweling pin can be partially press-fit into an optional static mounting aperture 247A located on the bottom side 242 of the first adjustment member 240 wherein the remainder of the doweling pin is disposed (and thus movable) within a corresponding optional adjustable component aperture 218 of the base member 210. Alternatively or in addition, a screw for example can be disposed through (and movable within) an optional adjustable mounting aperture 247B (e.g., extending from the top side 241 through the bottom side 242 of the first adjustment member 240) and can be loosely tightened into a corresponding optional static component aperture 217 of the base member 210. Accordingly, such exemplary configuration can allow for positional adjustment (e.g., longitudinal 116 movement) of the first adjustable member 240 (e.g., with respect to base member 210).

In addition, in some embodiments, it may be desirable to optionally dispose a suitable lubricant upon the bottom side 242 of the first adjustable member 240 to enhance the movability of the first adjustable member 240 with respect to the base member 210. Suitable lubricants include those known to persons having ordinary skill in the art, for example graphite, silicone, petroleum grease, oil, and the like, and will depend in part upon the materials of the base member 210 and first adjustable member 240.

Figure 7:
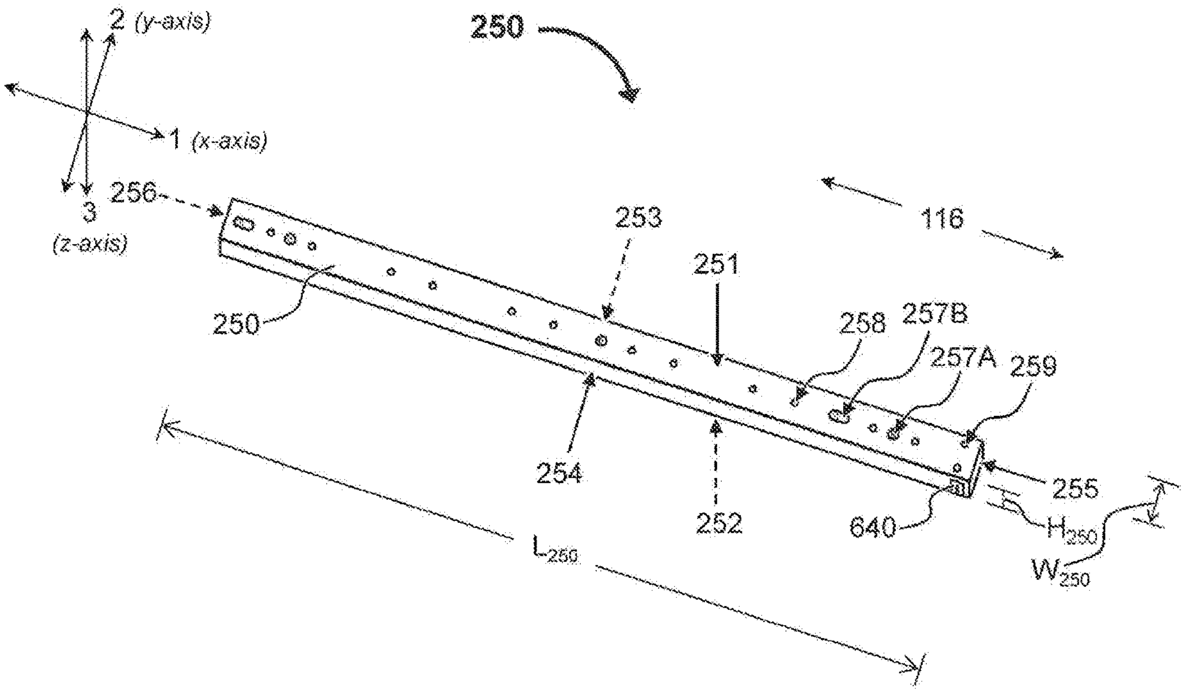
FIG. 7 is a perspective view showing a non-limiting exemplary embodiment of a second adjustable member of the of the fletching jig alignment device of the present invention.

Referring now to FIG. 7, the inventive fletching jig alignment device 100 also comprises a second adjustable member 250. One purpose of the second adjustable member 250 is to provide for at least longitudinal 116 movement (i.e., positional adjustment) of the second clamp base member 330 (and thus ultimately of the nock end 774 of the fletching clamp member 770). Desirably, the second adjustable member 250 is disposed longitudinally 116 upon the top side 211 of the base member 210, typically between the second jig support base member 230 and the nock edge 214 of the base member 210 (desirably disposed generally equidistant therebetween, though it need not be).

In some preferred embodiments, the second adjustable member 250 can be a substantial duplicate of the first adjustable member 240, though it need not be. For example, as illustrated in the non-limiting exemplary embodiment of FIG. 7, the second adjustable member 250 can comprise a generally rectangular shape profile, though it need not be. Accordingly, the second adjustable member 250 can comprise a first or top side 251 (which is preferably a major planar surface), an opposing second or bottom side 252 (which may be a major planar surface), a third or point side or edge 253 (which is generally orthogonal to the top side 251 and bottom side 252 in the y-z plane), an opposing fourth or nock side or edge 254 distal to the point side 253, a fifth or adjustment side, edge or end 255 (which is generally orthogonal to the point side 253 and nock side 254 in the x-y plane), and an opposing sixth or calibration side, edge or end 256 distal to the adjustment end 255. In such embodiments, the second adjustable member 250 can also comprise a length $L_{250}$, a width $W_{250}$ and a height $H_{250}$. Desirably, at least the height $H_{250}$ dimension of the second adjustable member 250 will be generally equivalent to the height $H_{240}$ of the first adjustable member 240, though it may be less than or greater than the height $H_{240}$ of the first adjustable member 240 without departing from the scope of the invention.

The second adjustable member 250 can comprise any suitable material, preferably a rigid material, as known to persons having ordinary skill in the art, such as thermoplastics (polyethylene, polypropylene, polyvinyl chloride (PVC), etc.), metals, wood, ceramics, and the like, and combinations thereof. By way of example only, in one non-limiting exemplary embodiment, the second adjustable member 250 can comprise high-density polyethylene.

The second adjustable member 250 can have any functional shape and dimensions (length, width, thickness/height, diameter, etc.) without departing from the scope of the invention, provided it can accommodate a second clamp base member 330. For example, in devices 100 comprising a plurality of fletching assemblies 150, the device 100 can comprise a single (e.g., strip-like) second adjustable member 250, or the device 100 can comprise multiple interconnected second adjustable members 250 (such as longitudinally 116 aligned in an end-to-end configuration, for example) (e.g., each dedicated to a respective second clamp base member 330).

Suitable fastening means for securing the second adjustable member 250 to the base member 210 include those known to persons having ordinary skill in the art, such as screws, bolts, studs, rivets, doweling, pins, compression fittings, releasable adhesives, magnets, hook-and-loop, and the like, and combinations thereof. Preferably, such fastening means will be suitable for allowing positional adjustment (e.g., longitudinal 116 movement) of the second adjustable member 250 with respect to the base member 210.

In some embodiments, the second adjustable member 250 can further comprise optional apertures at least partially disposed through the thickness thereof which extend from the bottom side 252 towards or through the top side 251. Such apertures can comprise an optional static mounting aperture 257A (e.g., disposed at least through the bottom side 252 and which aligns or mates with a corresponding optional adjustable component aperture 218 of the base member 210) for movably attaching the second adjustable member 250 to the top side 211 of the base member 210, and/or an optional adjustable mounting aperture 257B (which preferably corresponds to a respective optional static component aperture 217 of the base member 210) for movably attaching the second adjustable member 250 to the top side 211 of the base member 210.

In some embodiments, the second adjustable member 250 can further comprise optional apertures at least partially disposed through the thickness thereof which extend from the top side 251 towards or through the bottom side 252. Such apertures can comprise an optional static clamp base mounting aperture 258 for securing and anchoring a second clamp base member 330 to the top side 251 of the second adjustable member 250, and/or an optional static adjustment base mounting aperture 259 for securing and anchoring a second adjustment base member 420 to the top side 251 of the second adjustable member 250 (preferably located proximate or adjacent to the adjustment end 255 thereof).

Generally, the optional static apertures 257A, 258, 259 can have any suitable shape profile known to persons having ordinary skill in the art, including circular, triangular, square, star-shaped, and the like, without departing from the scope of the invention. In contrast, the optional adjustable mounting aperture 257B can desirably have an oblong shape profile with dimensions (e.g., a longitudinal 116 length dimension) suitable to accommodate a particular positional adjustment range. Suitable shape profiles for such adjustable mounting aperture 257B include those known to persons having ordinary skill in the art, such as rectangular, ovular, racetrack, and the like. It may be noted that in some embodiments of the device 100 comprising an adjustable mounting aperture 257B in the second adjustable member 250 and/or an adjustable component aperture 218 in the base member 210, the length of the aperture 257B and/or 218 can generally define the distance range of movement (e.g., longitudinal 116 movement) of the second adjustable member 250 (i.e., the length range between the device's 100 fully contracted state and fully extended state). In some embodiments, the length of an optional adjustable mounting aperture 257B of the second adjustable member 250 can be substantially equivalent to the length of an optional adjustable mounting aperture 247B of the first adjustable member 240, though it need not be.

By way of example only, in one non-limiting exemplary embodiment, a doweling pin can be partially press-fit into an optional static mounting aperture 257A located on the bottom side 252 of the second adjustable member 250 wherein the remainder of the doweling pin is disposed (and thus movable) within a corresponding optional adjustable component aperture 218 of the base member 210. Alternatively or in addition, a screw for example can be disposed through (and movable within) an optional adjustable mounting aperture 257B (e.g., extending from the top side 251 through the bottom side 252 of the second adjustable member 250) and can be loosely tightened into a corresponding optional static component aperture 217 of the base member 210. Accordingly, such exemplary configuration can allow for positional adjustment (e.g., longitudinal 116 movement) of the second adjustable member 250 (e.g., with respect to base member 210).

In addition, in some embodiments, it may be desirable to optionally dispose a suitable lubricant upon the bottom side 252 of the second adjustable member 250 to enhance the movability of the second adjustable member 250 with respect to the base member 210. Suitable lubricants include those known to persons having ordinary skill in the art, for example graphite, silicone, petroleum grease, oil, and the like, and will depend in part upon the materials of the base member 210 and second adjustable member 250.

Figure 8:
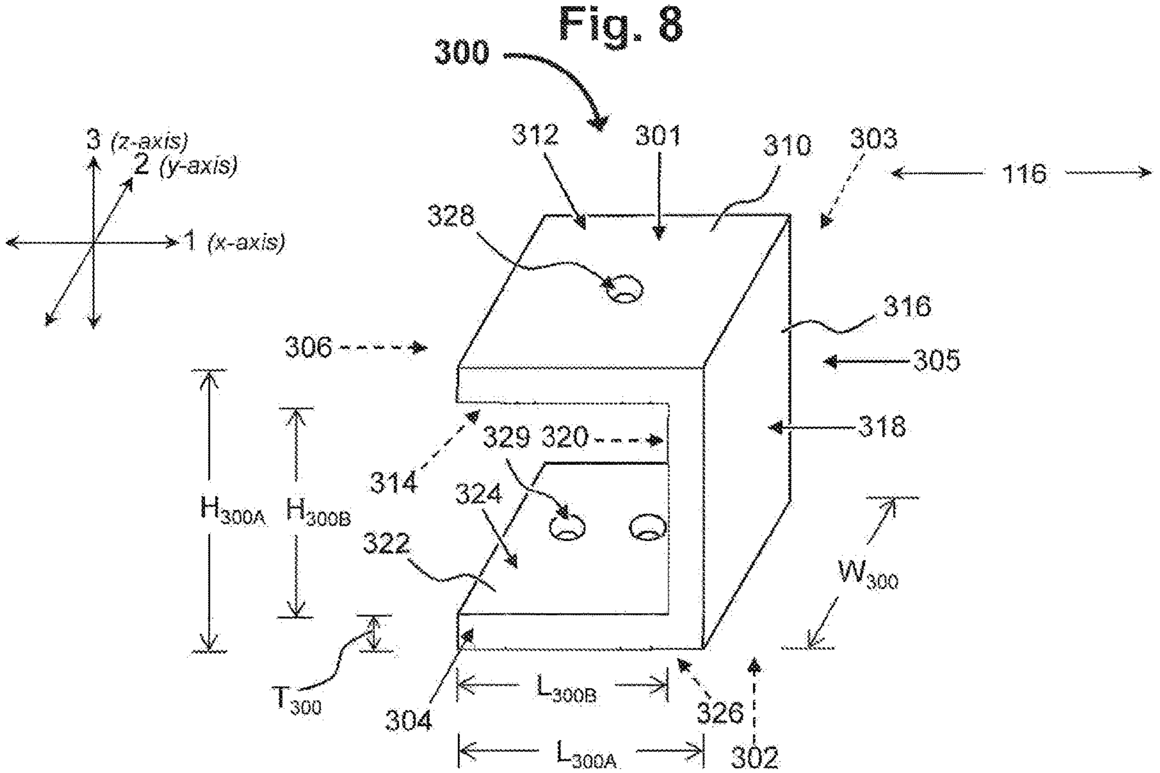
FIG. 8 is a perspective view showing a non-limiting exemplary embodiment of a first clamp base member of the of the fletching jig alignment device of the present invention.

Referring now to FIG. 8, the inventive fletching jig alignment device 100 also comprises a first clamp base member 300 disposed upon the first adjustable member 240. One purpose of the first clamp base member 300 is to secure the point end 743 of the clamp mounting member 740 component of the fletching jig assembly 700 (discussed further below) to the inventive device 100 such that the orientation of the point end 743 of the clamp mounting member 740 (and ultimately the point end 773 of the fletching clamp 770 attached thereto) can be positionally adjusted (e.g., in a longitudinal 116 direction) while maintaining a constant height of the clamp mounting member 740 (i.e., the distance as measured from the top side 211 of the base member 210 along the z-axis 3) during use, including during adjustment thereof.

As illustrated in the non-limiting exemplary embodiment of FIG. 8, as a whole (i.e., a single unitary unit), the first clamp base member 300 can comprise a first or top side 301 (which may be a major planar surface), an opposing second or bottom side 302 (which may be a major planar surface) distal to the top side 301, a third or point side, edge or end 303 (which is generally orthogonal to the top side 301 and bottom side 302 in the y-z plane), an opposing fourth or nock side, edge or end 304 distal to the point side 303, a fifth or adjustment side, edge or end 305 (which is preferably a major planar surface and which is generally orthogonal to the point side 303 and nock side 304), and an opposing sixth or calibration side, edge or end 306 distal to the adjustment side 305.

In some preferred embodiments, the first clamp base member 300 can have a generally "C" shape profile. For example, as illustrated in FIG. 8, the first clamp base member 300 can comprise three (3) primary portions, including a first, top or upper generally horizontal portion 310 having a first or top side 312 (which may be a major planar surface) and an opposing second or bottom side 314 (which may be a major planar surface), an opposing second, bottom or lower generally horizontal portion 322 distal to the first horizontal portion 310 having a first or top side 324 (which may be a major planar surface) and an opposing second or bottom side 326 (which may be a major planar surface), and an interconnecting generally vertical portion 316 disposed therebetween and having an adjustment side 318 (which is preferably a major planar surface) and an opposing calibration side 320 (which may be a major planar surface). It should be understood that other functional shapes of the first clamp base member 300 as would be known to persons having ordinary skill in the art can also be utilized without departing from the scope of the invention.

As further illustrated in FIG. 8, in some embodiments, the first clamp base member 300 can also comprise an outer or outside length $L_{300A}$, a width $W_{300}$ and an outer or outside height $H_{300A}$. Due to its shape and thickness (i.e., caliper), the first clamp base member 300 can additionally comprise an inner or inside length $L_{300B}$ (which is generally less than the outer length $L_{300A}$), as well as an inner or inside height $H_{300B}$ (which is generally less than the outer height $H_{300A}$). Preferably, at least the inner length $L_{300B}$ dimension and the inner height $H_{300B}$ dimension of the first clamp base member 300 will be sufficient to accommodate the combination of the arrow shaft support base member 360, the arrow shaft support member 710 component and clamp mounting member 740, though in some alternative embodiments it need not be (depending on the particular configuration of the arrow shaft support base member 360 and the arrow shaft support member 710 component attached thereto).

Desirably, the width $W_{300}$ dimension of the first clamp base member 300 will be equivalent to or less than the width $W_{240}$ of the first adjustable member 240, though it can be greater than the width $W_{240}$ of the first adjustable member 240 without departing from the scope of the invention.

The first clamp base member 300 can comprise any suitable material, preferably a rigid material, as known to persons having ordinary skill in the art, and can include metal, plastic, wood, ceramic, and the like, and combinations thereof. In one non-limiting exemplary embodiment, the first clamp base member 300 comprises aluminum.

In some preferred embodiments, the bottom side 326 of the lower horizontal portion 322 of the clamp base member 300 can be disposed upon, and generally in contact with, the top side 241 of the first adjustable member 240, wherein the calibration side 320 of the vertical portion 316 (and thus the open portion of the C-shaped clamp base member 300) faces the calibration end 106 of the device 100. Suitable fastening means for securing the first clamp base member 300 to the first adjustable member 240 include those known to persons having ordinary skill in the art, such as screws, bolts, rivets, nails, pins, studs, compression fittings, adhesives, hook-and-loop, and the like, and combinations thereof. For example, as illustrated in FIG. 8, disposed through the lower horizontal portion 322 of the first clamp base member 300 can be an optional attachment aperture 329, such as for use with screws, bolts, nails, pins, rivets, and the like.

During use of the device 100, the point end 743 of the clamp mounting member 740 can preferably be affixed to the first clamp base member 300. In some preferred embodiments, the point end 743 of the clamp mounting member 740 can be affixed to, and generally in contact with, the bottom side 314 of the upper horizontal portion 310 of the first clamp base member 300, though it can alternatively be affixed to a different functional location (e.g., the top side 312 of the upper horizontal portion 310) without departing from the scope of the invention. Suitable means for securing the clamp mounting member 740 to the first clamp base member 300 include those known to persons having ordinary skill in the art, such as screws, bolts, rivets, pins, studs, compression fittings, adhesives, hook-and-loop, and the like, and combinations thereof. For example, as illustrated in FIG. 8, disposed through the upper horizontal portion 310 of the first clamp base member 300 can be an optional clamp base mounting aperture 328, such as for use with pins, bolts, screws, and the like.

Figure 9:
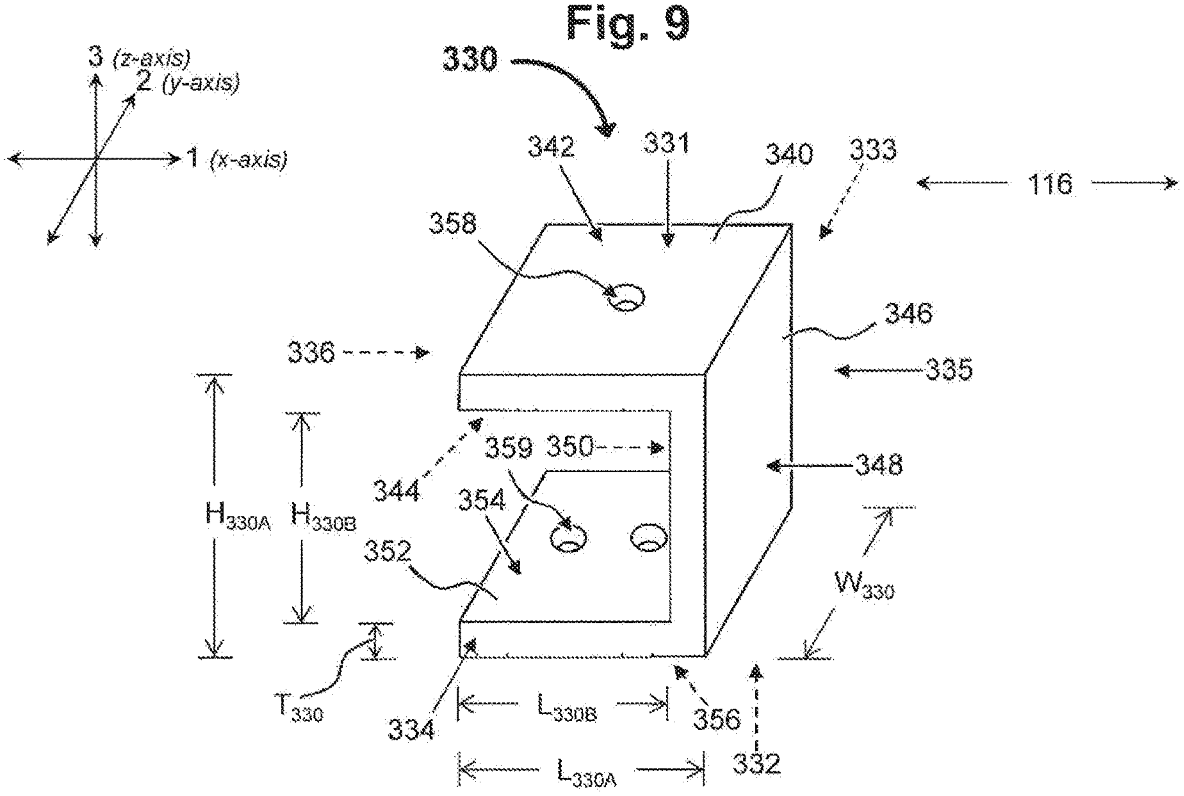
FIG. 9 is a perspective view showing a non-limiting exemplary embodiment of a second clamp base member of the of the fletching jig alignment device of the present invention.

Referring now to FIG. 9, the inventive fletching jig alignment device 100 also comprises a second clamp base member 330 disposed upon the second adjustable member 250. One purpose of the second clamp base member 330 is to secure the nock end 744 of the clamp mounting member 740 component of the fletching jig assembly 700 to the inventive device 100 such that the orientation of the nock end 744 of the clamp mounting member 740 (and ultimately the nock end 774 of the fletching clamp 770 attached thereto) can be positionally adjusted (e.g., in a longitudinal 116 direction) while maintaining a constant height of the clamp mounting member 740 during use, including during adjustment thereof.

As illustrated in the non-limiting exemplary embodiment of FIG. 9, as a whole (i.e., a single unitary unit), the first clamp base member 330 can comprise a first or top side 331 (which may be a major planar surface), an opposing second or bottom side 332 (which may be a major planar surface) distal to the top side 331, a third or point side, edge or end 333 (which is generally orthogonal to the top side 331 and bottom side 332 in the y-z plane), an opposing fourth or nock side, edge or end 334 distal to the point side 333, a fifth or adjustment side, edge or end 335 (which is preferably a major planar surface and which is generally orthogonal to the point side 333 and nock side 334), and an opposing sixth or calibration side, edge or end 336 distal to the adjustment side 335.

In some preferred embodiments, the second clamp base member 330 can have a generally "C" shape profile. For example, as illustrated in FIG. 9, the second clamp base member 330 can comprise three (3) primary portions, including a first, top or upper generally horizontal portion 340 having a first or top side 342 (which may be a major planar surface) and an opposing second or bottom side 344 (which may be a major planar surface), an opposing second, bottom or lower generally horizontal portion 352 distal to the first horizontal portion 340 having a first or top side 354 (which may be a major planar surface) and an opposing second or bottom side 356 (which may be a major planar surface), and an interconnecting generally vertical portion 346 disposed therebetween and having an adjustment side 348 (which is preferably a major planar surface) and an opposing calibration side 350 (which may be a major planar surface). It should be understood that other functional shapes of the second clamp base member 330 as would be known to persons having ordinary skill in the art can also be utilized without departing from the scope of the invention.

As further illustrated in FIG. 9, in some embodiments, the second clamp base member 330 can also comprise an outer or outside length $L_{330A}$, a width $W_{330}$ and an outer or outside height $H_{330A}$. Due to its shape and thickness (i.e., caliper), the second clamp base member 330 can additionally comprise an inner or inside length $L_{330B}$ (which is generally less than the outer length $L_{330A}$), as well as an inner or inside height $H_{330B}$ (which is generally less than the outer height $H_{330A}$). Preferably, at least the inner length $L_{330B}$ dimension and the inner height $H_{330B}$ dimension of the second clamp base member 330 will be sufficient to accommodate the combination of the arrow shaft support base member 360, the arrow shaft support member 710 component and the clamp mounting member 740, though in some alternative embodiments it need not be (depending on the particular configuration of the arrow shaft support base member 360 and the arrow shaft support member 710 component attached thereto). Desirably, the width $W_{330}$ dimension of the second clamp base member 330 is equivalent to or less than the width $W_{250}$ of the second adjustable member 250, though it can be greater than the width $W_{250}$ of the second adjustable member 250 without departing from the scope of the invention.

The second clamp base member 330 can comprise any suitable material, preferably a rigid material, as known to persons having ordinary skill in the art, and can include metal, plastic, wood, ceramic, and the like, and combinations thereof. In one non-limiting exemplary embodiment, the second clamp base member 330 comprises aluminum.

In some preferred embodiments, the bottom side 356 of the lower horizontal portion 352 of the clamp base member 330 can be disposed upon, and generally in contact with, the top side 251 of the second adjustable member 250, wherein the calibration side 350 of the vertical portion 346 (and thus the open portion of the C-shaped clamp base member 330) faces the calibration end 106 of the device 100. Suitable fastening means for securing the second clamp base member 330 to the second adjustable member 250 include those known to persons having ordinary skill in the art, such as screws, bolts, rivets, nails, pins, studs, compression fittings, adhesives, hook-and-loop, and the like, and combinations thereof. For example, as illustrated in FIG. 9, disposed through the lower horizontal portion 352 of the second clamp base member 330 can be an optional attachment aperture 359, such as for use with screws, bolts, nails, pins, rivets, and the like.

During use of the device 100, the nock end 744 of the clamp mounting member 740 component can preferably be affixed to the second clamp base member 330. In some preferred embodiments, the nock end 744 of the clamp mounting member 740 can be affixed to, and generally in contact with, the bottom side 344 of the upper horizontal portion 340 of the second clamp base member 330, though it can alternatively be affixed to a different functional location (e.g., the top side 342 of the upper horizontal portion 340) without departing from the scope of the invention. Suitable means for securing the clamp mounting member 740 to the second clamp base member 330 include those known to persons having ordinary skill in the art, such as screws, bolts, rivets, pins, studs, compression fittings, adhesives, hook-and-loop, and the like, and combinations thereof. For example, as illustrated in FIG. 9, disposed through the upper horizontal portion 340 of the second clamp base member 330 can be an optional clamp base mounting aperture 358, such as for use with pins, bolts, screws, and the like.

In some embodiments, the second clamp base member 330 may be dimensionally equivalent to the first clamp base member 300, though it may comprise a different functional configuration without departing from the scope of the invention. In some embodiments, the second clamp base member 330 may comprise the same materials as the first clamp base member 300, though it may comprise different materials without departing from the scope of the invention.

The combination of the arrow shaft support base member 360, first clamp base member 300, second clamp base member 330, and fletching jig assembly 700 (wherein the fletching jig assembly 700 comprises an arrow shaft support member 710, a clamp mounting member 740 and a fletching clamp member 770) together form a fletching assembly 150 of the invention.

As shown in FIGS. 1-2D, the inventive fletching jig alignment device 100 also comprises an adjustment assembly 140. The adjustment assembly 140 further comprises a first adjustment subassembly 140A and a second adjustment subassembly 140B. The first adjustment subassembly 140A generally comprises a first adjustment assembly support member 450, a first adjustment base member 410, a first adjustment element 430 and a first distance measurement device 470 (and is generally longitudinally 116 aligned with the first adjustable member 240). The second adjustment subassembly 140B generally comprises a second adjustment assembly support member 460, a second adjustment base member 420, a second adjustment element 440 and a second distance measurement device 490 (and is generally longitudinally 116 aligned with the second adjustable member 250).

Figure 11:
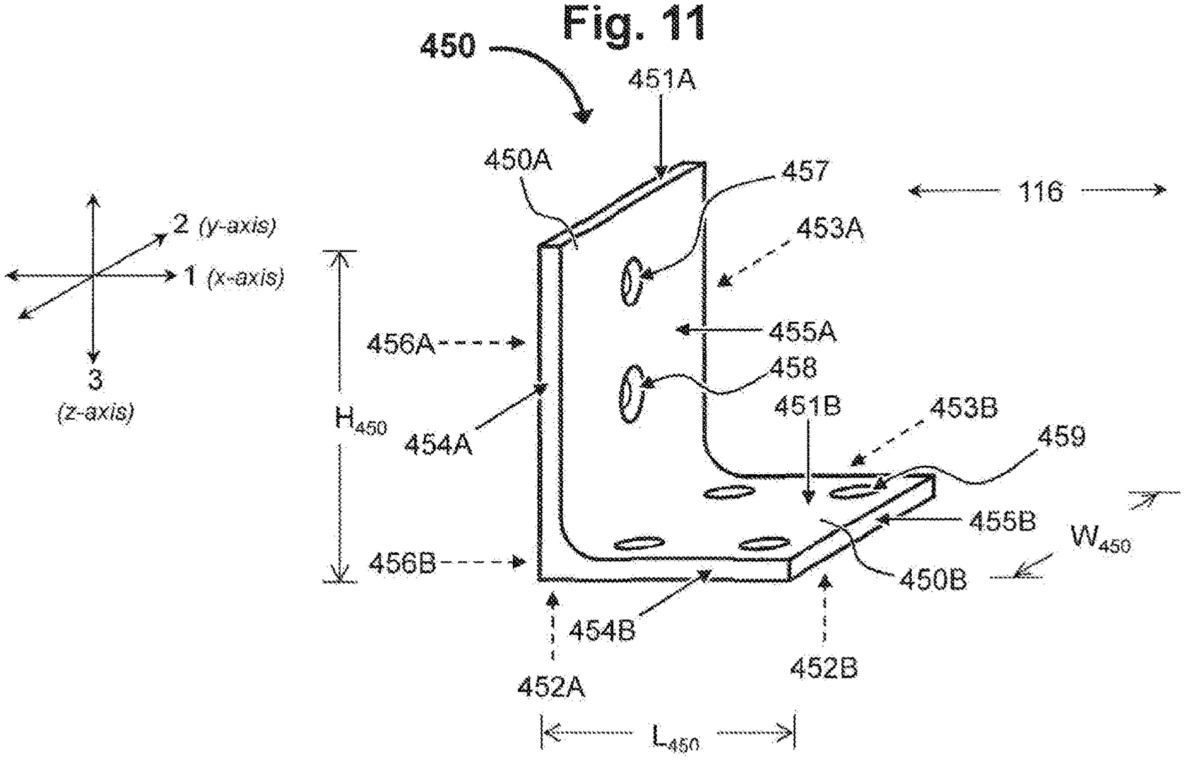
FIG. 11 is a perspective view showing a non-limiting exemplary embodiment of a first adjustment assembly support member of the of the fletching jig alignment device of the present invention.

Referring now to FIG. 11, the inventive fletching jig alignment device 100 also comprises a first adjustment assembly support member 450 preferably disposed upon the top side 211 of the base member 210, generally proximate to the point side 213 and adjustment end 215 thereof. The first adjustment assembly support member 450 is generally longitudinally 116 aligned with the first adjustable member 240, and is more particularly aligned with the first adjustment base member 410 disposed thereupon (discussed further below). One purpose of the first adjustment assembly support member 450 is for housing the first adjustment element 430. Another purpose is for providing a base upon which the first distance measurement device 470 can be mounted.

As illustrated in the non-limiting exemplary embodiment of FIG. 11, the first adjustment assembly support member 450 can comprise at least a vertical element 450A comprising a top side, edge or end 451A, an opposing bottom side, edge or end 452A distal to the top side 451A, a point side, edge or end 453A, an opposing nock side, edge or end 454A distal to the point side 453A, an adjustment side 455A (which may be a major planar surface), and an opposing calibration side 456A distal to the adjustment side 455A. The vertical element 450A of the first adjustment assembly support member 450 can have any suitable functional shape as would be known to persons having ordinary skill in the art, and may desirably be square or rectangular in shape, for example.

In some embodiments, the first adjustment assembly support member 450 can also comprise an optional horizontal element 450B. For example, such optional horizontal element 450B can be integrated with, and/or can extend from, the bottom side 452A portion of the vertical element 450A. The horizontal element 450B can comprise a top side 451B (which may be a major planar surface), an opposing bottom side 452B (which may be a major planar surface) distal to the top side 451B, a point side, edge or end 453B, an opposing nock side, edge or end 454A distal to the point side 453B, an adjustment side, edge or end 455B, and an opposing calibration side, edge or end 456B distal to the adjustment side 455B. Accordingly, where an optional horizontal element 450B is present, the first adjustment assembly support member 450 can exhibit a general "L" shape profile, though it may have a different functional shape profile without departing from the scope of the invention.

As further illustrated in FIG. 11, in some embodiments, the first adjustment assembly support member 450 can comprise a length L450 (which includes an optional horizontal element 450B), a width $W_{450}$ and a height $H_{450}$. In some embodiments, the width $W_{450}$ can be generally equivalent to the width $W_{240}$ of the first adjustable member 240 and/or the width $W_{410}$ of the first adjustment base member 410, though it may have a different width without departing from the scope of the invention. Preferably, the height $H_{450}$ of the first adjustment assembly support member 450 will be less than the outer height $H_{300A}$ of the first clamp base member 300 (after being mounted onto the first adjustable member 240), such that the first distance measurement device 470 (when properly mounted upon the first adjustment assembly support member 450) can sufficiently contact the adjustment side 318 of the first clamp base member 300 during use. Preferably, the height $H_{450}$ of the first adjustment assembly support member 450 will be greater than the height $H_{410}$ of the first adjustment base member 410 (after being mounted onto the first adjustable member 240), such that the first adjustment assembly support member 450 can suitably support the first adjustment element 430 (which connects the first adjustment assembly support member 450 to the first adjustment base member 410).

The first adjustment assembly support member 450 can comprise any suitable material, preferably a rigid material, as known to persons having ordinary skill in the art, and can include metal, plastic, wood, ceramic, glass, and the like, and combinations thereof. In one non-limiting exemplary embodiment, the first adjustment assembly support member 450 comprises aluminum.

In some preferred embodiments, the first adjustment assembly support member 450 can comprise an adjustment aperture 458 which can house the adjustment end 435 of the first adjustment element 430. The adjustment aperture 458 extends from the adjustment side 455A of the vertical element 450A through the calibration side 456A thereof. Preferably, the adjustment aperture 458 can have a diameter generally equivalent to or greater than the diameter of the first adjustment element 430 such that the first adjustment element 430 can be movable (e.g., rotatable, extendable, etc.) therewithin. Preferably, the adjustment aperture 458 is positionally configured such that the calibration end 436 of the first adjustment element 430 aligns with the adjustment aperture 418 of the first adjustment base member 410 during use.

In addition, the first adjustment assembly support member 450 can also comprise an optional distance measurement device mounting aperture 457 which can allow for secure attachment (i.e., anchoring) of the first distance measurement device 470 thereto. Desirably, the optional distance measurement device mounting aperture 457 can be disposed above the adjustment aperture 458, though it may be disposed in a different location without departing from the scope of the invention.

In some embodiments, the first adjustment assembly support member 450 can be inserted into the base member 210 (e.g., resembling a vertical tab), and can be held securely in place via friction, adhesive, mechanical means, etc. In embodiments comprising an optional horizontal element 450B, the bottom side 452B of the first adjustment assembly support member 450 can be affixed to, and generally in contact with, the top side 211 of the base member 210, though it may comprise a different functional configuration without departing from the scope of the invention. Suitable means for securing the horizontal element 450B of the first adjustment assembly support member 450 to the base member 210 include those known to persons having ordinary skill in the art, such as screws, bolts, rivets, pins, studs, compression fittings, adhesives, hook-and-loop, and the like, and combinations thereof. For example, as illustrated in FIG. 11, disposed from the top side 451B of horizontal element 450B through the bottom side 452B thereof can be an optional mounting aperture 459, such as for use with screws, bolts, pins, rivets, and the like.

Figure 12:
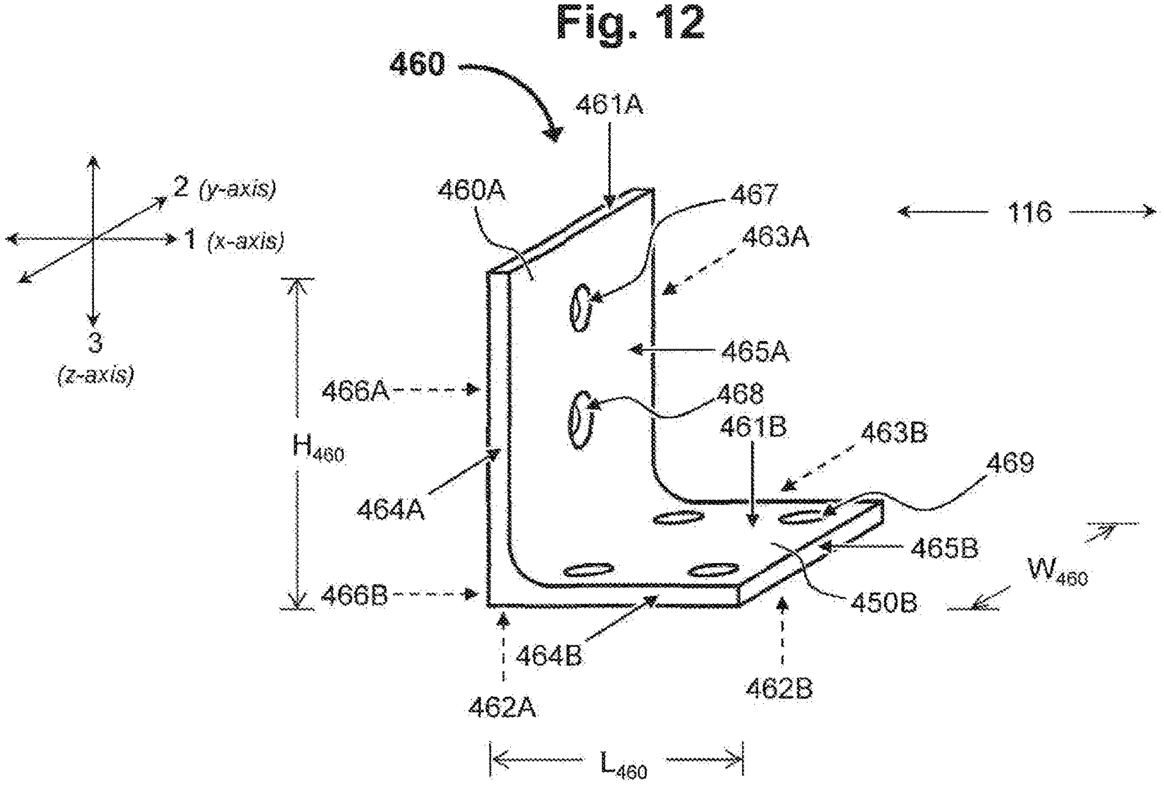
FIG. 12 is a perspective view showing a non-limiting exemplary embodiment of a second adjustment assembly support member of the of the fletching jig alignment device of the present invention.

Referring now to FIG. 12, the inventive fletching jig alignment device 100 also comprises a second adjustment assembly support member 460 preferably disposed upon the top side 211 of the base member 210, generally proximate to the nock side 214 and adjustment end 215 thereof. The second adjustment assembly support member 460 is generally longitudinally 116 aligned with the second adjustable member 250, and is more particularly aligned with the second adjustment base member 420 disposed thereupon (discussed further below). One purpose of the second adjustment assembly support member 460 is for housing the second adjustment element 440. Another purpose is for providing a base upon which the second distance measurement device 480 can be mounted.

As illustrated in the non-limiting exemplary embodiment of FIG. 12, the second adjustment assembly support member 460 can comprise at least a vertical element 460A comprising a top side, edge or end 461A, an opposing bottom side, edge or end 462A distal to the top side 461A, a point side, edge or end 463A, an opposing nock side, edge or end 464A distal to the point side 463A, an adjustment side 465A (which may be a major planar surface), and an opposing calibration side 466A distal to the adjustment side 465A. The vertical element 460A of the second adjustment assembly support member 460 can have any suitable functional shape as would be known to persons having ordinary skill in the art, and may desirably be square or rectangular in shape, for example.

In some embodiments, the second adjustment assembly support member 460 can also comprise an optional horizontal element 460B. For example, such optional horizontal element 460B can be integrated with, and/or can extend from, the bottom side 462A portion of the vertical element 460A. The horizontal element 460B can comprise a top side 461B (which may be a major planar surface), an opposing bottom side 462B (which may be a major planar surface) distal to the top side 461B, a point side, edge or end 463B, an opposing nock side, edge or end 464A distal to the point side 463B, an adjustment side, edge or end 465B, and an opposing calibration side, edge or end 466B distal to the adjustment side 465B. Accordingly, where an optional horizontal element 460B is present, the second adjustment assembly support member 460 can exhibit a general "L" shape profile, though it may have a different functional shape profile without departing from the scope of the invention.

As further illustrated in FIG. 12, in some embodiments, the second adjustment assembly support member 460 can comprise a length L460 (which includes an optional horizontal element 460B), a width $W_{460}$ and a height $H_{460}$. In some embodiments, the width $W_{460}$ can be generally equivalent to the width $W_{250}$ of the second adjustable member 250 and/or the width $W_{420}$ of the second adjustment base member 420, though it may have a different width without departing from the scope of the invention. Preferably, the height $H_{460}$ of the second adjustment assembly support member 460 will be less than the outer height $H_{330A}$ of the second clamp base member 330 (after being mounted onto the second adjustable member 250), such that the second distance measurement device 480 (when properly mounted upon the second adjustment assembly support member 460) can sufficiently contact the adjustment side 348 of the second clamp base member 330 during use. Preferably, the height $H_{460}$ of the second adjustment assembly support member 460 will be greater than the height $H_{420}$ of the second adjustment base member 420 (after being mounted onto the second adjustable member 250), such that the second adjustment assembly support member 460 can suitably support the second adjustment element 440 (which connects the second adjustment assembly support member 460 to the second adjustment base member 420). In some embodiments, the second adjustment assembly support member 460 can be dimensionally equivalent to the first adjustment assembly support member 450, though it need not be without departing from the scope of the invention The second adjustment assembly support member 460 can comprise any suitable material, preferably a rigid material, as known to persons having ordinary skill in the art, and can include metal, plastic, wood, ceramic, glass, and the like, and combinations thereof. In one non-limiting exemplary embodiment, the second adjustment assembly support member 460 comprises aluminum.

In some preferred embodiments, the second adjustment assembly support member 460 can comprise an adjustment aperture 468 which can house the adjustment end 445 of the second adjustment element 440. The adjustment aperture 468 extends from the adjustment side 465A of the vertical element 460A through the calibration side 466A thereof. Preferably, the adjustment aperture 468 can have a diameter generally equivalent to or greater than the diameter of the second adjustment element 440 such that the second adjustment element 440 can be movable (e.g., rotatable, extendable, etc.) therewithin. Preferably, the adjustment aperture 468 is positionally configured such that the calibration end 446 of the second adjustment element 440 substantially aligns with the adjustment aperture 428 of the second adjustment base member 420 during use.

In addition, the second adjustment assembly support member 460 can also comprise an optional distance measurement device mounting aperture 467 which can allow for secure attachment (i.e., anchoring) of the second distance measurement device 480 thereto. Desirably, the optional distance measurement device mounting aperture 467 can be disposed above the adjustment aperture 468, though it may be disposed in a different location without departing from the scope of the invention.

In some embodiments, the second adjustment assembly support member 460 can be inserted into the base member 210 (e.g., resembling a vertical tab), and can be held securely in place via friction, adhesive, mechanical means, etc. In embodiments comprising an optional horizontal element 460B, the bottom side 462B of the second adjustment assembly support member 460 can be affixed to, and generally in contact with, the top side 211 of the base member 210, though it may comprise a different functional configuration without departing from the scope of the invention. Suitable means for securing the horizontal element 460B of the second adjustment assembly support member 460 to the base member 210 include those known to persons having ordinary skill in the art, and can include screws, bolts, rivets, pins, studs, compression fittings, adhesives, hook-and-loop, and the like, and combinations thereof. For example, as illustrated in FIG. 12, disposed from the top side 461B of horizontal element 460B through the bottom side 462B thereof can be an optional mounting aperture 469, such as for use with screws, bolts, pins, rivets, and the like.

Figure 13:
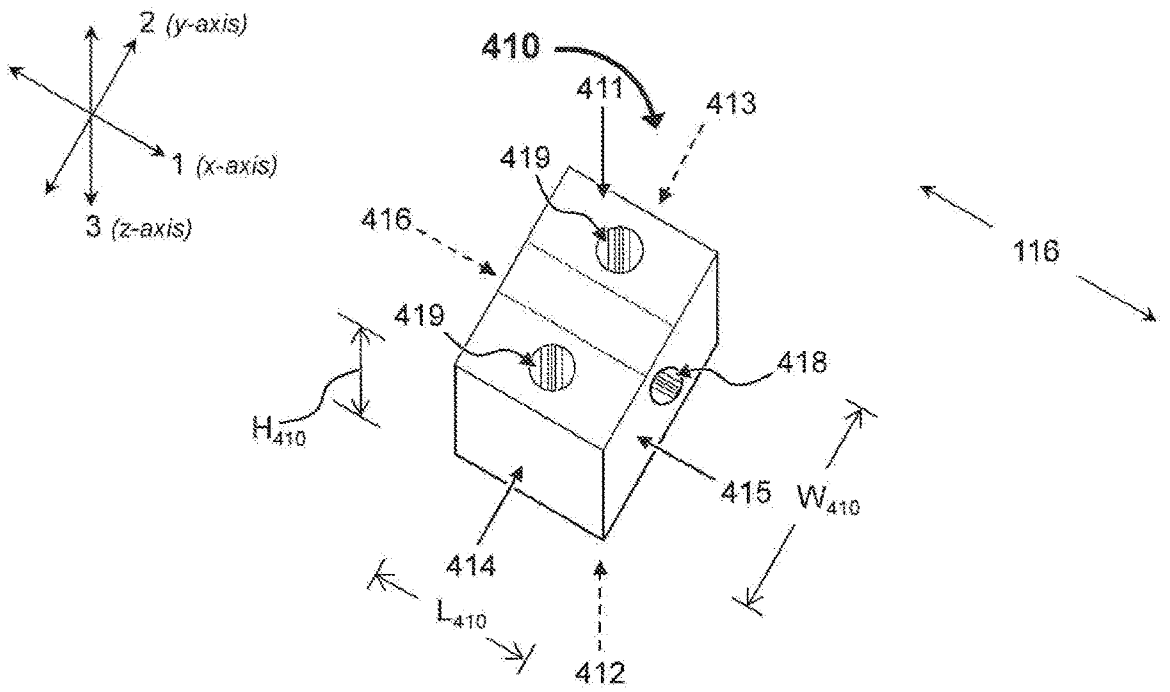
FIG. 13 is a perspective view showing a non-limiting exemplary embodiment of a first adjustment base member of the of the fletching jig alignment device of the present invention.

Referring now to FIG. 13, the inventive fletching jig alignment device 100 also comprises a first adjustment base member 410 disposed upon the first adjustable member 240 (preferably upon the top side 241), generally proximate or adjacent to the adjustment end 245 thereof. One purpose of the first adjustment base member 410 is to enable the first adjustable member 240 to be positionally adjusted (e.g., longitudinally 116 moved) with respect to the device 100 by providing a connection or nexus between the first adjustable member 240 and the first adjustment element 430, and is adapted to receive the calibration end 436 portion of the first adjustment element 430.

As illustrated in the non-limiting exemplary embodiment of FIG. 13, the first adjustment base member 410 can comprise a generally cubical shape profile, though it need not be. Accordingly, the first adjustment base member 410 can comprise a first or top side 411, an opposing second or bottom side 412 distal to the top side 411, a third or point side or end 413 (which is generally orthogonal to the top side 411 and bottom side 412 in the y-z plane), an opposing fourth or nock side or end 414 distal to the point side 413, a fifth or adjustment side 415 (which may be a major planar surface and which is generally orthogonal to the point side 413 and nock side 414 in the x-y plane), and an opposing sixth or calibration side 416 distal to the adjustment side 415. However, it should be understood that the first adjustment base member 410 can comprise any suitable functional shape as would be known to persons having ordinary skill in the art, including a block, a tab, a stud, a cylinder, and the like, without departing from the scope of the invention. In the illustrated embodiment, the first adjustment base member 410 can comprise a length L410, a width $W_{410}$ and a height $H_{410}$. In some embodiments, the width $W_{410}$ can be equivalent to, or less than, the width $W_{240}$ of the first adjustable member 240, though it may be greater than the width $W_{240}$ of the first adjustable member 240 without departing from the scope of the invention.

The first adjustment base member 410 can comprise any suitable material, preferably a rigid material, as known to persons having ordinary skill in the art, and can include metal, plastic, wood, ceramic, glass, and the like, and combinations thereof. In one non-limiting exemplary embodiment, the first adjustment base member 410 comprises aluminum.

The first adjustment base member 410 can desirably comprise an adjustment aperture 418 which can accept or accommodate the calibration end 436 portion of the first adjustment element 430. The adjustment aperture 418 is typically disposed through the adjustment side 415 of the first adjustment base member 410 and extends towards, or through, the calibration side 416 of the first adjustment base member 410. In embodiments where the first adjustment element 430 is threaded, the adjustment aperture 418 can comprise complimentary threading therewithin. Accordingly, the adjustment aperture 418 can have a diameter at least as great as the diameter of the first adjustment element 430. In some alternative embodiments, the adjustment aperture 418 can be replaced with an attachment means (not shown) which can secure (movably or immovably) the calibration end 436 portion of the first adjustment element 430 to the first adjustment base member 410.

In some preferred embodiments, the bottom side 412 of the first adjustment base member 410 can be affixed to, and generally in contact with, the top side 241 of the first adjustable member 240, though it need not be in some alternative embodiments. Suitable means for securing the first adjustment base member 410 to the first adjustable member 240 include those known to persons having ordinary skill in the art, such as screws, bolts, rivets, pins, studs, compression fittings, adhesives, hook-and-loop, and the like, and combinations thereof. For example, as illustrated in FIG. 13, disposed from the top side 411 of the first adjustment base member 410 through the bottom side 412 thereof can be an optional mounting aperture 419, such as for use with screws, bolts, pins, rivets, and the like.

Figure 14:
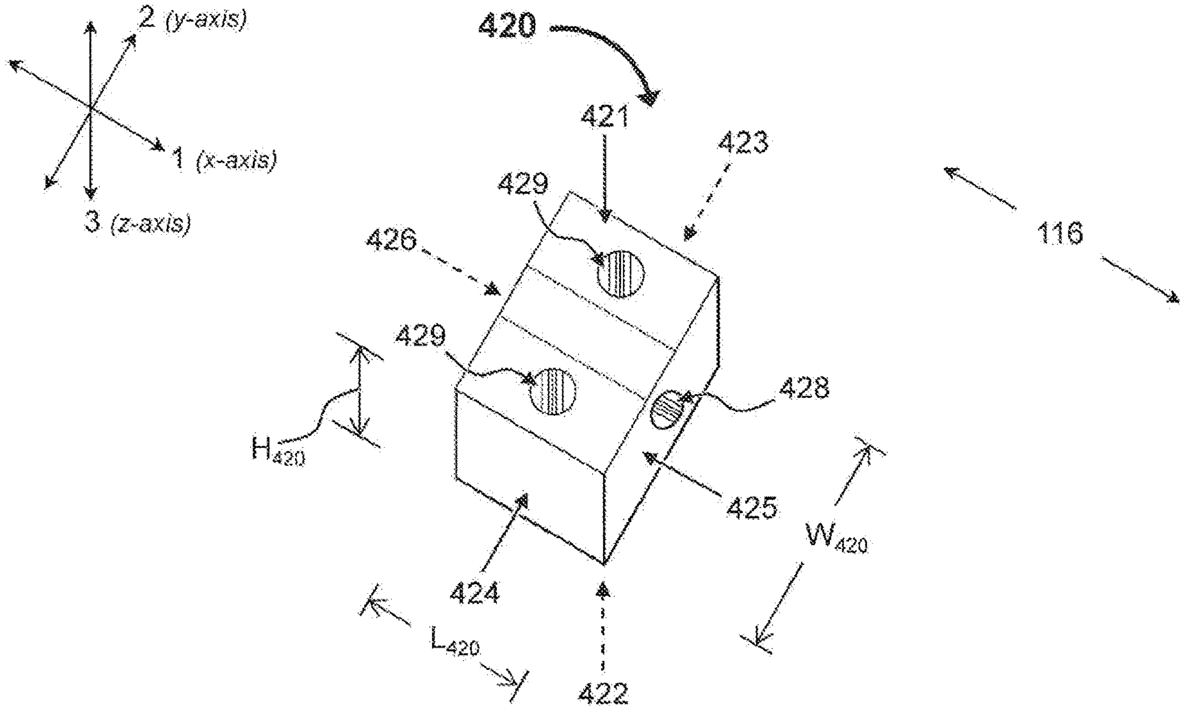
FIG. 14 is a perspective view showing a non-limiting exemplary embodiment of a second adjustment base member of the of the fletching jig alignment device of the present invention.

Referring now FIG. 14, the inventive fletching jig alignment device 100 also comprises a second adjustment base member 420 disposed upon the second adjustable member 250 (preferably upon the top side 251), generally proximate or adjacent to the adjustment end 255 thereof. One purpose of the second adjustment base member 420 is to enable the second adjustable member 250 to be positionally adjusted (e.g., longitudinally 116 moved) with respect to the device 100 by providing a connection or nexus between the second adjustable member 250 and the second adjustment element 440, and is adapted to receive the calibration end 446 portion of the second adjustment element 440.

As illustrated in the non-limiting exemplary embodiment of FIG. 14, the second adjustment base member 420 can comprise a generally cubical shape profile, though it need not be. Accordingly, the second adjustment base member 420 can comprise a first or top side 421, an opposing second or bottom side 422 distal to the top side 421, a third or point side or end 413 (which is generally orthogonal to the top side 421 and bottom side 422 in the y-z plane), an opposing fourth or nock side or end 424 distal to the point side 423, a fifth or adjustment side 425 (which may be a major planar surface and which is generally orthogonal to the point side 423 and nock side 424 in the x-y plane), and an opposing sixth or calibration side 426 distal to the adjustment side 425. However, it should be understood that the second adjustment base member 420 can comprise any suitable functional shape as would be known to persons having ordinary skill in the art, including a block, a tab, a stud, a cylinder, and the like, without departing from the scope of the invention. In the illustrated embodiment, the second adjustment base member 420 can comprise a length $L_{420}$, a width $W_{420}$ and a height $H_{420}$. In some embodiments, the width $W_{420}$ can be equivalent to, or less than, the width $W_{250}$ of the second adjustable member 250, though it may be greater than the width $W_{250}$ of the second adjustable member 250 without departing from the scope of the invention. In some embodiments, the second adjustment base member 420 can be dimensionally equivalent to the first adjustment base member 410, though it need not be in some alternative embodiments.

The second adjustment base member 420 can comprise any suitable material, preferably a rigid material, as known to persons having ordinary skill in the art, and can include metal, plastic, wood, ceramic, glass, and the like, and combinations thereof. In one non-limiting exemplary embodiment, the second adjustment base member 420 comprises aluminum.

The second adjustment base member 420 can desirably comprise an adjustment aperture 428 which can accept or accommodate the calibration end 446 portion of the second adjustment element 440. The adjustment aperture 428 is typically disposed through the adjustment side 425 of the second adjustment base member 420 and extends towards, or through, the calibration side 426 of the second adjustment base member 420. In embodiments where the second adjustment element 440 is threaded, the adjustment aperture 428 can comprise complimentary threading therewithin. Accordingly, the adjustment aperture 428 can have a diameter at least as great as the diameter of the second adjustment element 440. In some alternative embodiments, the adjustment aperture 428 can be replaced with an attachment means (not shown) which can secure (movably or immovably) the calibration end 446 portion of the first adjustment element 440 to the second adjustment base member 420.

In some preferred embodiments, the bottom side 422 of the second adjustment base member 420 can be affixed to, and generally in contact with, the top side 251 of the second adjustable member 250, though it need not be in some alternative embodiments. Suitable means for securing the second adjustment base member 420 to the second adjustable member 250 include those known to persons having ordinary skill in the art, such as screws, bolts, rivets, pins, studs, compression fittings, adhesives, hook-and-loop, and the like, and combinations thereof. For example, as illustrated in FIG. 14, disposed from the top side 421 of the second adjustment base member 420 through the bottom side 422 thereof can be an optional mounting aperture 429, such as for use with screws, bolts, pins, rivets, and the like.

Figure 15:
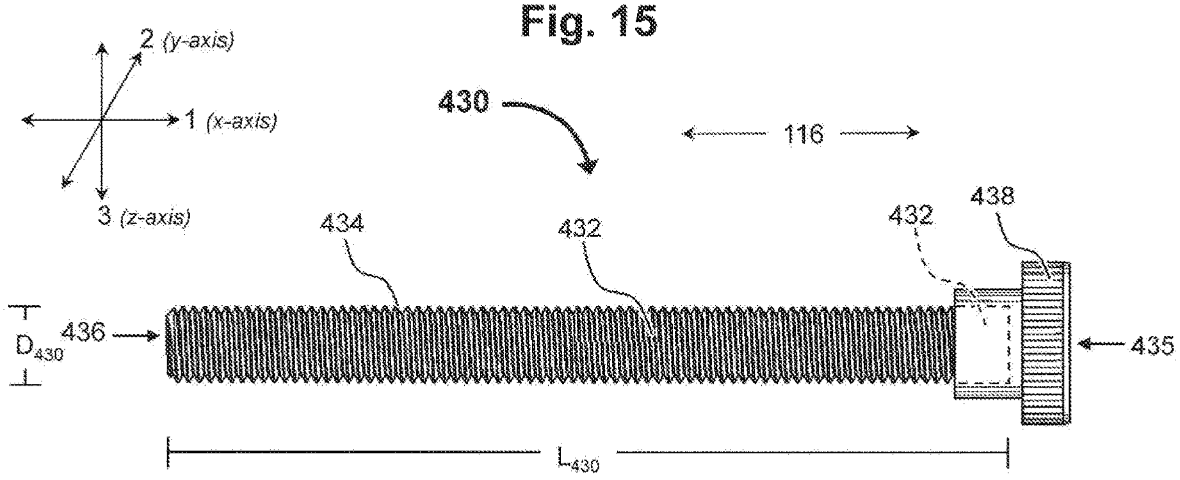
FIG. 15 is a perspective view showing a non-limiting exemplary embodiment of a first adjustment element of the of the fletching jig alignment device of the present invention.

Referring now to FIG. 15, the inventive fletching jig alignment device 100 also comprises a first adjustment element 430 disposed through the adjustment aperture 458 in the vertical element 450A of the first adjustment assembly support member 450 and at least partially into or through the adjustment aperture 418 of the first adjustment base member 410 (see e.g., FIGS. 1-2D). More particularly, the adjustment end 435 of the first adjustment element 430 will generally be disposed through and movably housed (e.g., rotatable, longitudinally movable, etc.) at the first adjustment assembly support member 450, and the calibration end 436 of the first adjustment element 430 will be attached to or disposed within or through the first adjustment base member 410. The purpose of the first adjustment element 430 is to enable positional adjustment of the first adjustable member 240 (and ultimately the point end 773 of the fletching clamp member 770).

As illustrated in the non-limiting exemplary embodiment of FIG. 15, the first adjustment element 430 can comprise a stud element 432 having at least an adjustment end 435 and a calibration end 436. In some preferred embodiments, the stud element 432 can have a generally cylindrical profile, and thus can have a length $L_{432}$ and a diameter $D_{432}$, wherein the length $L_{432}$ is greater than the distance between the first adjustment base member 410 and the first adjustment assembly support member 450. However, it should be understood that a cross-section of the stud element 432 can have any function shape as would be known to persons having ordinary skill in the art (e.g., circular, ovular, square, rectangular, octagonal, star-shaped, etc.) without departing from the scope of the invention.

The stud element 432 can comprise any functional material, preferably a rigid material, as would be known to persons having ordinary skill in the art, but will typically comprise metal or plastic. For example, in one non-limiting exemplary embodiment, the stud element 432 can comprise steel.

As illustrated in the non-limiting exemplary embodiment of FIG. 15, in some embodiments, the stud element 432 can comprise optional threads 434 thereon, such as to enable positional adjustment (e.g., longitudinal 116 movement) of the first adjustable member 240 via rotation of the first adjustment element 430. Accordingly, such threads 434 can enable a user to positionally adjust the first adjustable member 240 by rotating the stud element 432. However, it should be understood that other means for positionally adjusting the first adjustable member 240 as would be known to persons having ordinary skill in the art (e.g., manual plungers, pneumatics, hydraulics, etc.) can also be utilized without departing from the scope of the invention.

In some embodiments, such as where positional adjustment can be engaged via rotation for example, it may be desirable to include an optional control means 438 (e.g., a knob, etc.) on the first adjustment element 430, which can allow a user to more easily manipulate (e.g., rotate) the stud element 432 by hand (see e.g., FIG. 15). Such optional control means 438 can preferably be affixed to the adjustment end 435 of the first adjustment element 430 and can have any functional shape as would be known to persons having ordinary skill in the art. It should be understood that other means can also be utilized to engage rotation as would be known to persons having ordinary skill in the art (e.g., box-end wrench, Allen wrench, screw driver, etc.) without departing from the scope of the invention.

In some embodiments, the first adjustment element 430 can further comprise an optional biasing means 439 (e.g., a coiled compression spring) which surrounds at least a portion of the stud element 432 (i.e., shrouds the stud element 432). Accordingly, the inner diameter of a biasing means 439 in the form of a coiled spring is preferably at least equivalent to, or greater than, the diameter $D_{432}$ of the stud element 432. The purpose of such optional biasing means 439 includes preventing unwanted movement of the stud element 432 during use of the device 100, providing tension or pressure against the first adjustment base member 410 during adjustments and use of the device 100, maintaining a particular adjustment setting during use of the device 100, and/or preventing the stud element 432 from disengaging from the first adjustment assembly support member 450. Such biasing means 439 can comprise any suitable material as would be known to persons having ordinary skill in the art, but will typically be a metal, such as steel. In some embodiments, the length of the optional biasing means 439, in its uncompressed form, will generally be equivalent to the distance between the adjustment side 415 of the first adjustment base member 410 and the calibration side 456A of the first adjustment assembly support member 450 when the device 100 is in its fully extended form.

Figure 16:
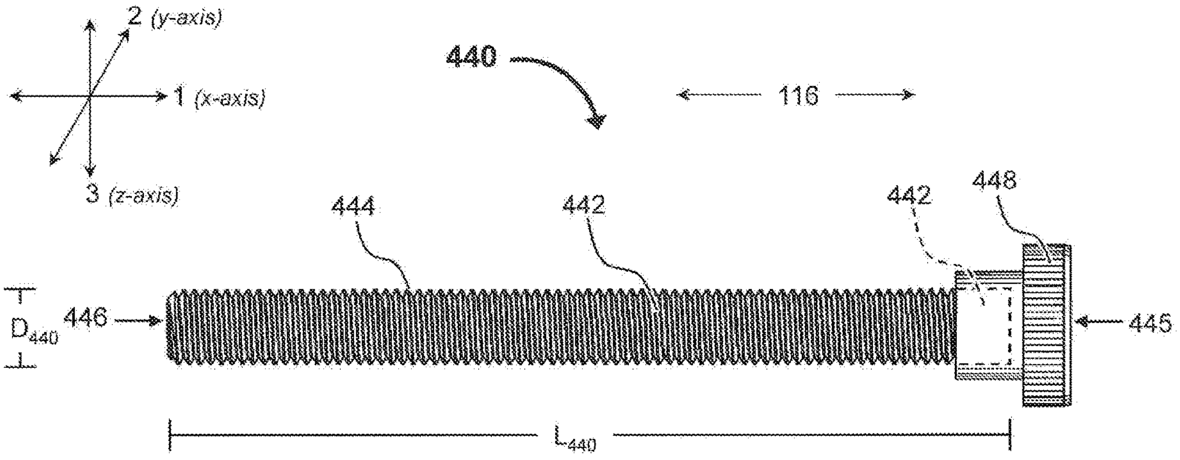
FIG. 16 is a perspective view showing a non-limiting exemplary embodiment of a second adjustment element of the of the fletching jig alignment device of the present invention.

Referring now to FIG. 16, the inventive fletching jig alignment device 100 also comprises a second adjustment element 440 disposed through the adjustment aperture 468 in the vertical element 460A of the second adjustment assembly support member 460 and at least partially into or through the adjustment aperture 428 of the second adjustment base member 420 (see e.g., FIGS. 1-2D). More particularly, the adjustment end 445 of the second adjustment element 440 will generally be disposed through and movably housed (e.g., rotatable, longitudinally movable, etc.) at the second adjustment assembly support member 460, and the calibration end 446 of the second adjustment element 440 will be attached to or disposed within or through the second adjustment base member 420. The purpose of the second adjustment element 440 is to enable positional adjustment of the second adjustable member 250 (and ultimately the nock end 774 of the fletching clamp member 770).

As illustrated in the non-limiting exemplary embodiment of FIG. 16, the second adjustment element 440 can comprise a stud element 442 having at least an adjustment end 445 and a calibration end 446. In some preferred embodiments, the stud element 442 can have a generally cylindrical profile, and thus can have a length $L_{442}$ and a diameter $D_{442}$, wherein the length $L_{442}$ is greater than the distance between the second adjustment base member 420 and the second adjustment assembly support member 460. However, it should be understood that a cross-section of the stud element 442 can have any function shape as would be known to persons having ordinary skill in the art (e.g., circular, ovular, square, rectangular, octagonal, star-shaped, etc.) without departing from the scope of the invention. In some embodiments, the second adjustment element 440 can be a substantial duplicate of the first adjustment element 430, though it need not be without departing from the scope of the invention.

The stud element 442 can comprise any functional material, preferably a rigid material, as would be known to persons having ordinary skill in the art, but will typically comprise metal or plastic. For example, in one non-limiting exemplary embodiment, the stud element 442 can comprise steel.

As illustrated in the non-limiting exemplary embodiment of FIG. 16, in some embodiments, the stud element 442 can comprise optional threads 444 thereon, such as to enable positional adjustment (e.g., longitudinal 116 movement) of the second adjustable member 250 via rotation of the second adjustment element 440. Accordingly, such threads 444 can enable a user to positionally adjust the second adjustable member 250 by rotating the stud element 442. However, it should be understood that other means for positionally adjusting the second adjustable member 250 as would be known to persons having ordinary skill in the art (e.g., manual plungers, pneumatics, hydraulics, etc.) can also be utilized without departing from the scope of the invention.

In some embodiments, such as where positional adjustment can be engaged via rotation for example, it may be desirable to include an optional control means 448 (e.g., a knob, etc.) on the second adjustment element 440 which can allow a user to more easily manipulate (e.g., rotate) the stud element 442 by hand (see e.g., FIG. 16). Such optional control means 448 can preferably be affixed to the adjustment end 445 of the second adjustment element 440 and can have any functional shape as would be known to persons having ordinary skill in the art. It should be understood that other means can also be utilized to engage rotation as would be known to persons having ordinary skill in the art (e.g., box-end wrench, Allen wrench, screw driver, etc.) without departing from the scope of the invention.

In some embodiments, the second adjustment element 440 can further comprise an optional biasing means 449 (e.g., a coiled compression spring) which surrounds at least a portion of the stud element 442 (i.e., shrouds the stud element 442). Accordingly, the inner diameter of a biasing means 449 in the form of a coiled spring is preferably at least equivalent to, or greater than, the diameter $D_{442}$ of the stud element 442. The purpose of such optional biasing means 449 includes preventing unwanted movement of the stud element 442 during use of the device 100, providing tension or pressure against the second adjustment base member 420 during adjustments and use of the device 100, maintaining a particular adjustment setting during use of the device 100, and/or preventing the stud element 442 from disengaging from the second adjustment assembly support member 460. Such biasing means 449 can comprise any suitable material as would be known to persons having ordinary skill in the art, but will typically be a metal, such as steel. In some embodiments, the length of the optional biasing means 449, in its uncompressed form, will generally be equivalent to the distance between the adjustment side 425 of the second adjustment base member 420 and the calibration side 466A of the second adjustment assembly support member 460 when the device 100 is in its fully extended form.

Figure 17:
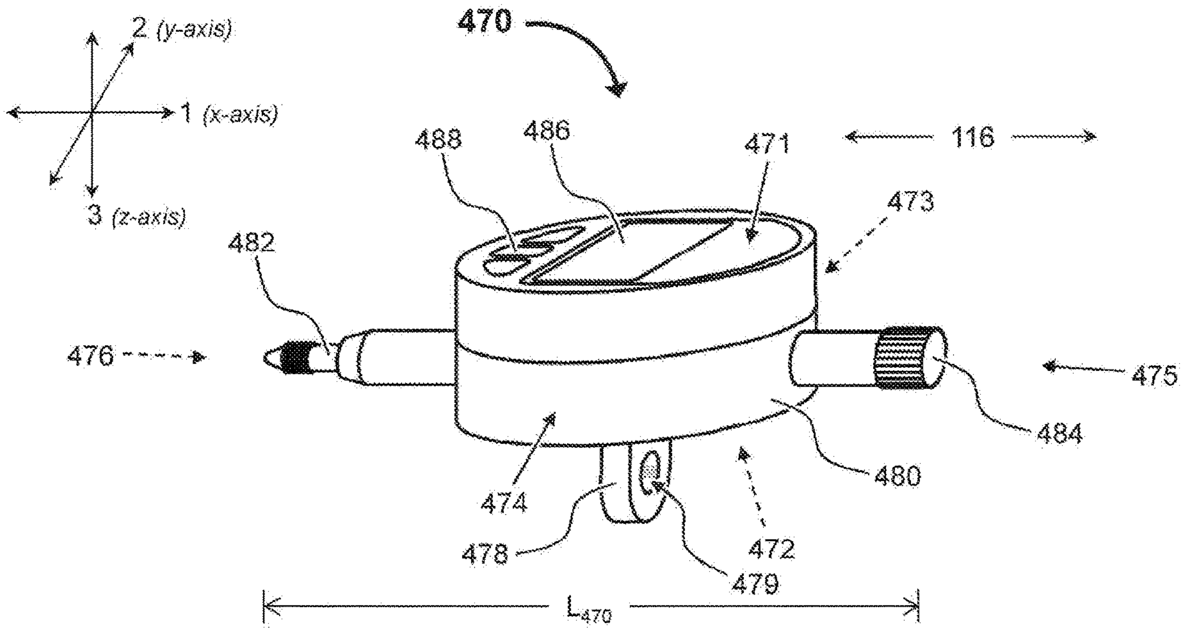
FIG. 17 is a perspective view showing a non-limiting exemplary embodiment of a first distance measurement device of the of the fletching jig alignment device of the present invention.

Referring now to FIG. 17, the inventive fletching jig alignment device 100 also comprises a first distance measurement device 470 typically disposed upon the first adjustment assembly support member 450 (such as upon the top side 451A thereof), though it may be located at another functional location of the device 100 without departing from the scope of the invention. One purpose of the first distance measurement device 470 is to measure the positional adjustment of the first adjustable member 240 (including the components disposed thereupon, and ultimately the point end 773 of the fletching clamp member 770) resulting from manipulation of the first adjustment element 430. Preferably, the first distance measurement device 470 can measure such positional adjustment accurately to within about 0.01 inch (0.25 mm) or less, more preferably to within about 0.005 inch (0.127 mm) or less, and most preferably to within about 0.001 inch (0.025 mm) or less, although greater or lesser accuracy can be utilized in some alternative embodiments without departing from the scope of the invention. In some preferred embodiments, the first distance measurement device 470 can be in the form of an electronic plunger indicator, such as a DIGR-0055 Digital Indicator, available from Clockwise Tools Inc., having a place of business located in Valencia, California, USA.

As illustrated in the non-limiting exemplary embodiment of FIG. 17, a non-limiting exemplary first distance measurement device 470 can comprise a main body 480, an adjustable length plunger element 482, a plunger adjustment means 484, a display or readout 486 and one or more functional means 488. Accordingly, when properly configured within the inventive device 100, such first distance measurement device 470 has a top side 471, an opposing bottom side 472 distal to the top side 471, a point side 473, an opposing nock side 474 distal to the point side 473, an adjustment side or end 475, and an opposing calibration side or end 476 distal to the adjustment end 475.

As illustrated in FIGS. 1-2D, such a first distance measurement device 470 is properly oriented such that it has at least a length $L_{470}$ dimension which is variable in the longitudinal 116 direction (i.e., wherein the plunger element 482 is substantially aligned along the x-axis 1). During use of the inventive device 100, the calibration end 476 of the plunger element 482 should desirably be in contact with the adjustment side 318 of the first clamp base member 300. Preferably, the variable length $L_{470}$ will have a sufficient range to measure the distance of the first adjustable member 240 in both its fully retracted configuration and its fully extended configuration. It should be understood that any suitable distance measuring device as would be known to persons having ordinary skill in the art (e.g., rulers, dial indicators, laser measurement devices, ultrasonic measurement devices, sensors, etc.) can be utilized without departing from the scope of the invention.

The first distance measurement device 470 can be affixed to the device 100 (such as to the first adjustment assembly support member 450) via suitable fastening means as would be known to persons having ordinary skill in the art, and can include screws, bolts, studs, rivets, doweling, pins, magnets, studs, compression fittings, adhesives, hook-and-loop, and the like. In some embodiments, the first distance measurement device 470 can comprise an optional mounting member 478, such as disposed on the bottom side 472 thereof for example (see e.g., FIG. 17). Such optional mounting member 477 can include an optional mounting aperture 479. In such embodiments, the mounting aperture 479 can desirably align with a corresponding optional mounting aperture 457 disposed through the vertical element 450A of the first adjustment assembly support member 450 for fastening the first distance measurement device 470 thereto.

Figure 18:
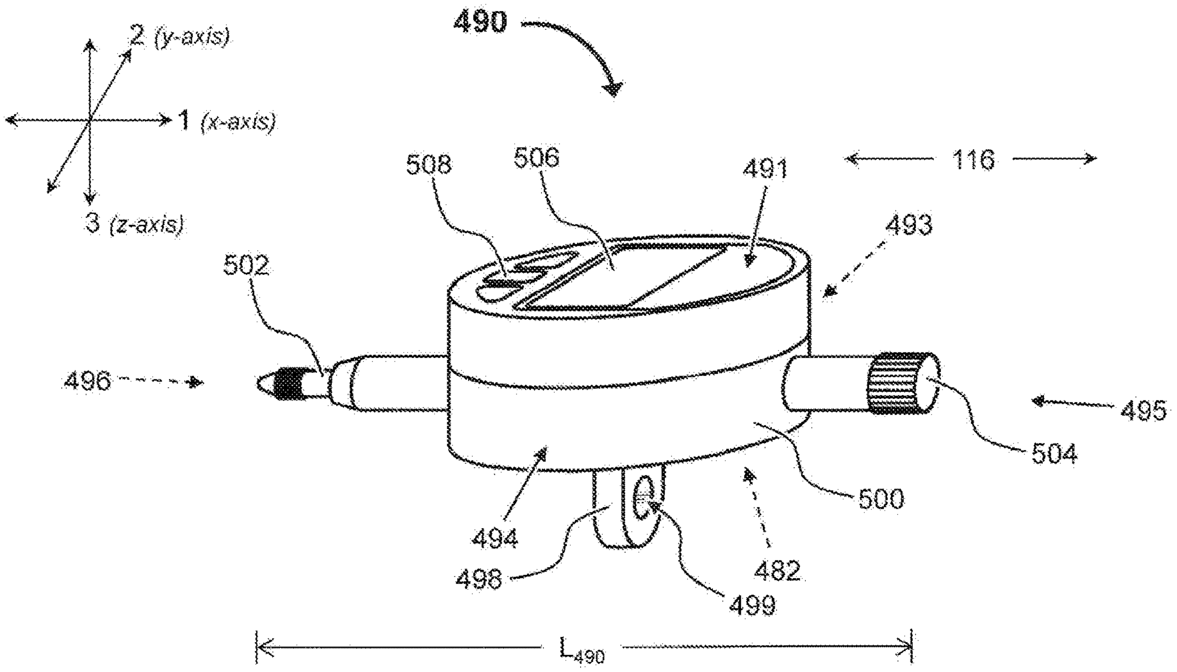
FIG. 18 is a perspective view showing a non-limiting exemplary embodiment of a second distance measurement device of the of the fletching jig alignment device of the present invention.

Referring now to FIG. 18, the inventive fletching jig alignment device 100 also comprises a second distance measurement device 490 typically disposed upon the second adjustment assembly support member 460 (such as upon the top side 461A thereof), though it may be located at another functional location of the device 100 without departing from the scope of the invention. One purpose of the second distance measurement device 490 is to measure the positional adjustment of the second adjustable member 250 (including the components disposed thereupon, and ultimately the nock end 774 of the fletching clamp member 770) resulting from manipulation of the second adjustment element 440. Preferably, the second distance measurement device 490 can measure such positional adjustment accurately to within about 0.01 inch (0.25 mm) or less, more preferably to within about 0.005 inch (0.127 mm) or less, and most preferably to within about 0.001 inch (0.025 mm) or less, although greater or lesser accuracy can also be utilized in some alternative embodiments without departing from the scope of the invention. In some preferred embodiments, the second distance measurement device 490 can be in the form of an electronic plunger indicator, such as a 3900-5 Electronic Indicator, available from L. S. Starrett Company, having a place of business located in Athol, Massachusetts, USA.

As illustrated in the non-limiting exemplary embodiment of FIG. 18, a non-limiting exemplary second distance measurement device 490 can comprise a main body 500, an adjustable length plunger element 502, a plunger adjustment means 504, a display or readout 506 and one or more functional means 508. Accordingly, when properly configured within the inventive device 100, such second distance measurement device 490 has a top side 491, an opposing bottom side 492 distal to the top side 491, a point side 493, an opposing nock side 494 distal to the point side 493, an adjustment side or end 495, and an opposing calibration side or end 496 distal to the adjustment end 495.

As illustrated in FIGS. 1-2D, such a second distance measurement device 490 is properly oriented such that it has at least a length L490 dimension which is variable in the longitudinal 116 direction (i.e., wherein the plunger element 502 is substantially aligned along the x-axis 1). During use of the inventive device 100, the calibration end 496 of the plunger element 502 should desirably be in contact with the adjustment side 348 of the second clamp base member 330. Preferably, the variable length L490 will have a sufficient range to measure the distance of the second adjustable member 250 in both its fully retracted configuration and its fully extended configuration. It should be understood that any suitable distance measuring device as would be known to persons having ordinary skill in the art (e.g., rulers, dial indicators, laser measurement devices, ultrasonic measurement devices, sensors, etc.) can be utilized without departing from the scope of the invention.

The second distance measurement device 490 can be affixed to the device 100 (such as to the second adjustment assembly support member 460) via suitable fastening means as would be known to persons having ordinary skill in the art, and can include screws, bolts, studs, rivets, doweling, pins, studs, compression fittings, magnets, adhesives, hook-and-loop, and the like. In some embodiments, the second distance measurement device 490 can comprise an optional mounting member 498, such as disposed on the bottom side 492 thereof for example (see e.g., FIG. 18). Such optional mounting member 498 can include an optional mounting aperture 499. In such embodiments, the mounting aperture 499 can desirably align with a corresponding optional mounting aperture 467 disposed through the vertical element 460A of the second adjustment assembly support member 460 for fastening the second distance measurement device 490 thereto.

As referenced above, the inventive fletching jig alignment device 100 can comprise one or more fletching assemblies 150. Accordingly, each fletching assembly 150 of the inventive fletching jig alignment device 100 comprises a fletching jig assembly 700. In general, each fletching jig assembly 700 comprises an arrow shaft support member 710, a clamp mounting member 740 and a fletching clamp member 770.

Figure 19A:
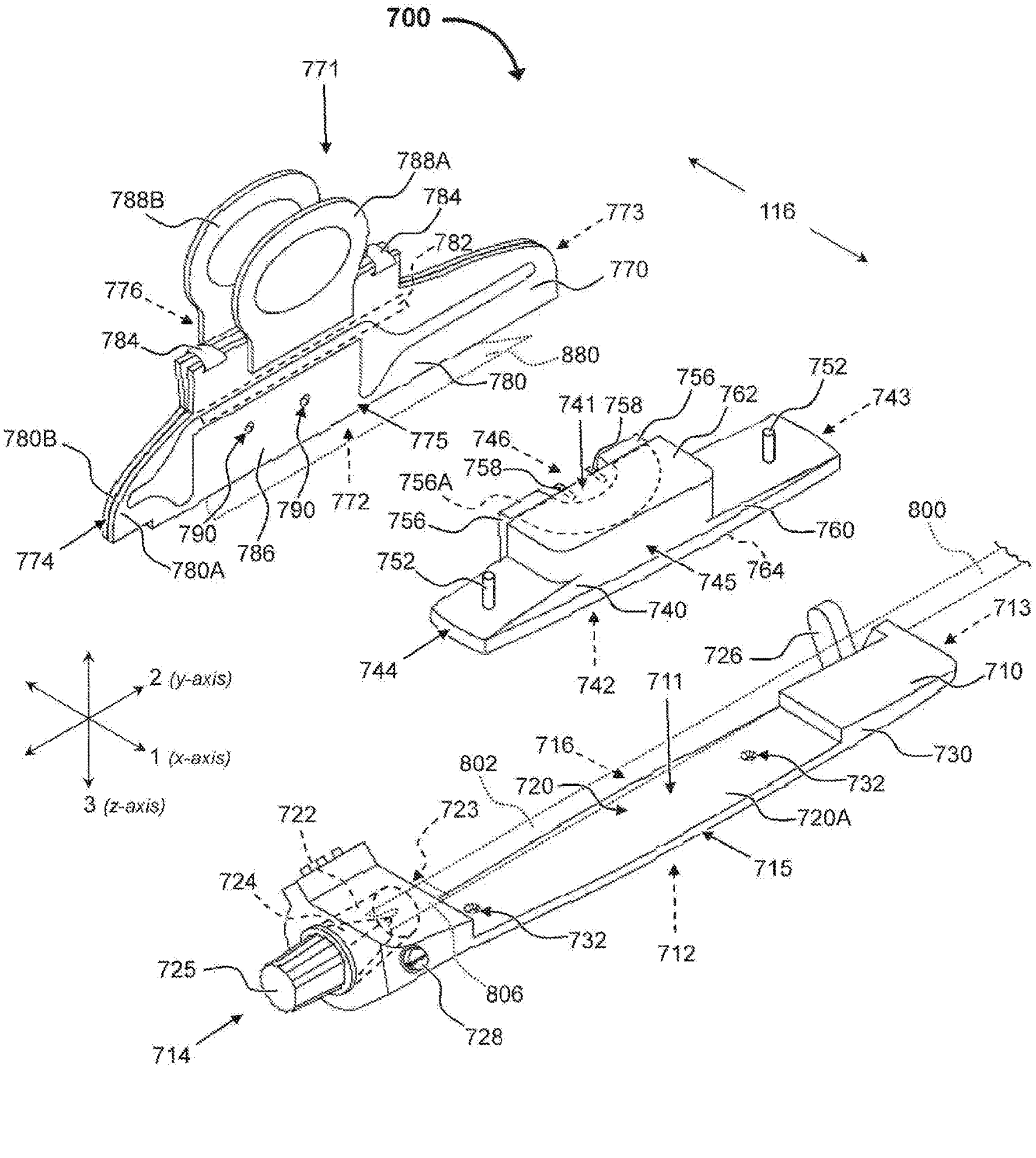
FIG. 19A is an exploded perspective view showing a non-limiting exemplary embodiment of a fletching jig assembly of the of the fletching jig alignment device of the present invention.
Figure 19B:
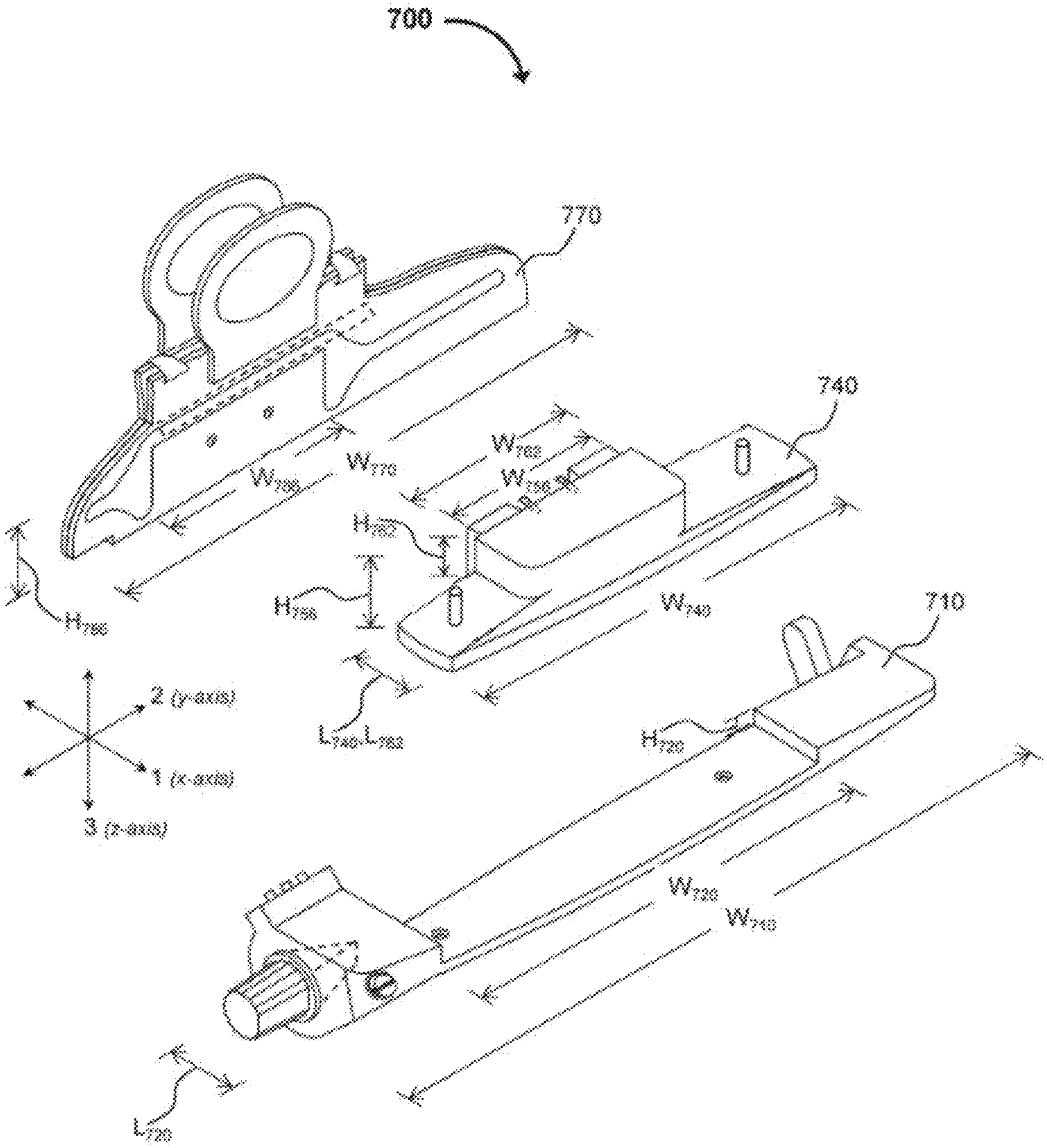
FIG. 19B is an exploded perspective view showing the fletching jig assembly of FIG. 19A.

Referring now to FIGS. 19A-19B, the inventive fletching jig alignment device 100 comprises an arrow shaft support member 710. With additional reference to FIGS. 1-2D and 20, the arrow shaft support member 710 is disposed upon the arrow shaft support base member 360. More preferably, the arrow shaft support member 710 is disposed upon the top side 361 of the arrow shaft support base member 360, though it may be disposed at another functional location without departing from the scope of the invention. One purpose of the arrow shaft support member 710 is to support or hold a shaft component 802 of an arrow 800 during alignment of a fletching component 808 thereto. Another purpose of the arrow shaft support member 710 is to enable axial rotation (i.e., about the y-axis 2 with respect to the device 100) of an arrow shaft component 802 during use of the inventive device 100.

As illustrated in the non-limiting exemplary embodiment of FIG. 19A, the arrow shaft support member 710 generally comprises a main body 730, an arrow shaft cradle element 726 (upon which a shaft component 802 is disposed and supported during use), a nock chamber 722 having an opening 723 thereto (into which a nock component 806 of an arrow 800 or a nock adapter (not shown) can be inserted during use), an optional rotatable nock acceptor element 724 located within the chamber 722 (which is configured to seat within a nock component 806 of an arrow 800 or a nock adapter, and which thus allows for axial rotation of the shaft component 802 during use), an external arrow shaft rotation control means 725 (e.g., a knob, a dial, etc.) connected to, or integrated with, the optional nock acceptor element 724 (which can enable a user to control the nock acceptor element 724 and thus the axial rotation of the shaft component 802 during use), and an optional securing means 728 (e.g., a set screw) which can prevent undesired rotation of the shaft component 802 during use of the inventive device 100. When properly configured within the inventive device 100 during use, the arrow shaft support member 710 can generally comprise a first or top side 711 (which may include a major planar surface), an opposing second or bottom side 712 distal to the top side 711, a third or point side or end 713, an opposing fourth or nock side or end 714 distal to the point end 713, a fifth or adjustment side 715, and an opposing sixth or calibration side 716 distal to the adjustment side 715. As further illustrated in FIG. 19B, the arrow shaft support member 710 can also comprise at least a width $W_{710}$ dimension (i.e., as measured along the y-axis 2 with respect to the device 100 when properly mounted thereto).

The arrow shaft support member 710 can comprise any suitable material, preferably a rigid material, as would be known to persons having ordinary skill in the art, and can include metal, plastic, wood, ceramic, and the like, and combinations thereof. In one non-limiting exemplary embodiment, the main body 730 comprises a zinc alloy.

The arrow shaft support member 710 can be affixed to the arrow shaft support base member 360 via suitable fastening means as would be known to persons having ordinary skill in the art, such as screws, bolts, studs, rivets, doweling, pins, compression fittings, adhesives, hook-and-loop, and the like, and combinations thereof. In some embodiments, the main body 730 of the arrow shaft support member 710 can comprise an optional mounting aperture 732 disposed therethrough (preferably extending from the top side 711 through the bottom side 712 thereof). In such embodiments, it is preferable that such mounting aperture 732 substantially aligns with a corresponding optional jig mounting aperture 370 of the arrow shaft support base member 360 (see e.g., FIG. 10A).

In some embodiments, the top side 711 of the main body 730 of the arrow shaft support member 710 can optionally comprise an opening or gap 720 along a portion of the width $W_{710}$ thereof. Accordingly, such opening 720 can be defined by a length $L_{720}$, a width $W_{720}$ and a height $H_{720}$. In some further embodiments, the length $L_{720}$ and width $W_{720}$ of the opening 720 can also define a substantially planar surface area 720A. In embodiments which include an optional opening 720, such opening 720 can generally correspond with at least the width $W_{740}$ dimension of the clamp base 740 (i.e., the width $W_{720}$ of the opening 720 is at least equivalent to, or greater than, the width $W_{740}$ of the clamp base 740) which can allow for positional adjustment (e.g., longitudinal 116 movement) of the clamp base 740 with respect to the arrow shaft support member 710 during use of the device 100. Accordingly, in some such embodiments, at least a portion of the top side 711 of the arrow shaft support member 710 can overlap with the bottom side 741 of the clamp mounting member 740, though it need not be (depending on the particular jig and configuration thereof).

Continuing with FIGS. 19A-19B, the inventive fletching jig alignment device 100 also comprises a clamp mounting member 740. The purpose of the clamp mounting member 740 is to securely (but removably) retain the fletching clamp member 770, and to help enable positional adjustment of one or both ends 773, 774 of the fletching clamp member 770 to align a fletching component 808 therewithin to a desired orientation with respect to the shaft component 802 of an arrow 800.

As illustrated in the non-limiting exemplary embodiment of FIG. 19A, the clamp mounting member 740 can comprise a main body 760 and an attachment means 756 sufficient to affix the fletching clamp member 770 to the clamp mounting member 740 (preferably to the calibration side 746 of the clamp mounting member 740). When properly configured within the inventive device 100 during use, the clamp mounting member 740 can generally comprise a first or top side 741, an opposing second or bottom side 742 distal to the top side 741, a third or point side or end 743, an opposing fourth or nock side or end 744 distal to the point end 743, a fifth or adjustment side 745, and an opposing sixth or calibration side 746 distal to the adjustment side 745. In addition, the clamp mounting member 740 can also comprise at least a width $W_{740}$ dimension (i.e., as measured along the y-axis 2 with respect to the device 100).

The clamp mounting member 740 can comprise any suitable material, preferably a rigid material, as known to persons having ordinary skill in the art, and can include metal, plastic, wood, ceramic, and the like, and combinations thereof. In one non-limiting exemplary embodiment, the clamp mounting member 740 comprises a zinc alloy.

With additional reference to FIGS. 1-2D, the clamp mounting member 740 is preferably disposed upon both the first clamp base member 300 and the second clamp base member 330. In some preferred embodiments, the top side 741 at the point end 743 of the clamp mounting member 740 can be affixed to the bottom side 314 of the upper horizontal portion 310 of the first clamp base member 300, and the top side 741 at the nock end 744 of the clamp mounting member 740 can be affixed to the bottom side 344 of the upper horizontal portion 340 of the second clamp base member 330, though other functional configurations can also be suitable without departing from the scope of the invention. Suitable fastening means include those as would be known to persons having ordinary skill in the art, such as screws, bolts, studs, rivets, doweling, pins, compression fittings, adhesives, hook-and-loop, and the like, and combinations thereof. For example, in some embodiments, the top side 741 of the main body 730 of the clamp mounting member 740 can comprise an optional attachment element 752 (e.g., stud, threaded rod, etc.) disposed adjacent to or near the ends 743, 744 thereof. In such embodiments, it is preferable that such attachment elements 752 substantially align with corresponding optional clamp base mounting apertures 328, 358 disposed through the upper horizontal portions 310, 340 of the first and second clamp base members 300, 330, respectively (see e.g., FIGS. 8 and 9).

Continuing with FIGS. 19A-19B, when properly configured during use of the inventive device 100, the clamp mounting member can optionally comprise an elevated middle region 762 which extends upward (i.e., along the z-axis 3) between the first clamp base member 300 and the second clamp base member 330. Accordingly, such middle region 762 can be defined by a length $L_{762}$, a width $W_{762}$ and a height $H_{762}$. In addition, the clamp mounting member 740 can also comprise a bottom side surface area or region 764 which can be generally defined by the overall length L740 and width $W_{740}$ of the clamp mounting member 740. In some embodiments, such bottom surface area 764 can generally correspond to the optional opening 720 of the arrow shaft support member 710 (and optionally to the surface area 720A thereof). In such embodiments, it is preferable that the width $W_{740}$ of the bottom side surface area 764 of the clamp mounting member 740 is at least equivalent to, or less than, the width $W_{720}$ of the optional opening 720 to allow for positional adjustment (e.g., longitudinal 116 movement) of the clamp base 740 with respect to the arrow shaft support member 710.

In some preferred embodiments, the clamp mounting member 740 can comprise an attachment means (typically located on the calibration side 746 thereof) for attaching the fletching clamp member 770 thereto. Suitable attachment means 756 preferably provide for non-permanent attachment of the fletching clamp member 770 and can include those known to persons having ordinary skill in the art, such as magnets, releasable adhesives, hook-and-loop, snaps, screws, compression fittings, and the like. In some preferred embodiments, the attachment means 756 comprises a magnet.

In some embodiments, the clamp mounting member 740 can comprise an optional alignment guide element 758 which can mate to a specific location on the fletching clamp member 770 to help ensure repeatable placement of the fletching clamp member 770 upon the clamp mounting member 740. Suitable alignment guide elements 758 include those known to persons having ordinary skill in the art, such as studs, bumps, depressions, markings, apertures, etc. For example, the clamp mounting member 740 can comprise an optional alignment guide element 758 in the form of a stud which corresponds to, and mates with, an optional alignment guide element 790 of the fletching clamp member 770, such as in the form of an aperture, for example. However, in some preferred embodiment, such optional alignment guide element 758 may not be desirable, as it could limit adjustment of the fletching clamp member 770 upon the clamp mounting member 740 when attempting to dispose the exposed edge or quill of a fletching component 808 in contact with the shaft component 802 during use of the device 100.

Continuing with FIGS. 19A-19B, inventive fletching jig alignment device 100 also comprises a fletching clamp member 770. The purpose of the fletching clamp member 770 is to securely retain a fletching component 808, to allow for alignment of the fletching component 8080 to a desired orientation or configuration with respect to the shaft component 802, as well as to engage deposition and attachment (via a suitable attachment means) of the fletching component 808 to the shaft component 802.

As illustrated in the non-limiting exemplary embodiment of FIG. 19A, when properly configured within the inventive device 100 during use, the fletching clamp member 770 can generally comprise a first or top side 771, an opposing second or bottom side 772 distal to the top side 771, a third or point side or end 773, an opposing fourth or nock side or end 774 distal to the point end 773, a fifth or adjustment side 775, and an opposing sixth or calibration side 776 distal to the adjustment side 775. Accordingly, the fletching clamp member 770 can also comprise at least a width $W_{770}$ dimension (i.e., as measured along the y-axis 2 with respect to the device 100) which may be equivalent to, or less than, the width $W_{710}$ of the arrow shaft support member 710, though it may be greater than the width $W_{710}$ of the arrow shaft support member 710 without departing from the scope of the invention.

As further illustrated in the non-limiting exemplary embodiment of FIG. 19A, the fletching clamp member 770 can comprise a main body 760, which in turn comprises a first clamp member 780A disposed on the adjustment side 775 of the fletching clamp member 770 and a second clamp member 780B disposed on the calibration side 776 of the fletching clamp member 770. Typically, the first clamp member 780A and the second clamp member 780B can generally be mirror images of each other, though they may be different without departing from the scope of the invention. In some preferred embodiments, the first and second clamp members 780A, 780B are joined or connected via a pivot means 782, and can preferably also include a bias means 784 (e.g., a spring, etc.) which biases (i.e., applies tension to) the fletching clamp member 770 to a closed configuration (i.e., wherein the bottom side 772 of the first and second clamp members 780A, 780B remain in contact without application of an external force). In addition, in some preferred embodiments, the first and second clamp members 780A, 780B can desirably each comprise a handle member 788A, 788B, respectively, preferably disposed at or near the top side 771 of the fletching clamp member 770. Such handle members 788A, 788B can provide a means for applying an opposing external force (i.e., an opposing force to the bias means 784 force) to the fletching clamp member 770 in order to open the fletching clamp member 770 (such as for deposition or release of a fletching component 808 therebetween).

The fletching clamp member 770 can comprise any suitable material, preferably a rigid material, as would be known to persons having ordinary skill in the art, and can include metal, plastic, wood, ceramic, and the like, and combinations thereof. In one non-limiting exemplary embodiment, the fletching clamp member 770 comprises steel.

With additional reference to FIGS. 1-2D, the fletching clamp member 770 is preferably disposed upon the clamp mounting member 740, more preferably upon the calibration side 746 of the clamp mounting member 740. In some preferred embodiments, the fletching clamp member 770 can be affixed to the clamp mounting member 740 via the fastening means 756 of the clamp mounting member 740 as described above. In some embodiments, the adjustment side 775 of the fletching clamp member 770 (i.e., the first clamp member 780A) can comprise a substantially planar attachment surface area or region 786 which preferably generally aligns with the attachment means region 756A of the clamp mounting member 740, and which can contact the attachment means 756 and/or the calibration side 746 of the clamp mounting member 740 during use. Such attachment region 786 can be defined by a width $W_{786}$ and height $H_{786}$. Preferably, the dimensions of the optional attachment region 786 will be equivalent to or greater than the attachment region 756A of the clamp mounting member 740 (though it can be less than the attachment region 756A of the clamp mounting member 740 without departing from the scope of the invention). Accordingly, in such embodiments, when properly configured during use of the device 100, the attachment region 786 of the fletching clamp member 770 will generally be disposed between the first clamp base member 300 and the second clamp base member 330, and the bottom side 772 of the fletching clamp member 770 will preferably be disposed slightly (e.g., about 0.5 mm) above an arrow shaft component 802. Accordingly, proper placement of a fletching component 808 within the fletching clamp member 770 will include small portion (e.g., about 0.05 mm) of the fletching component 808 exposed or extending beyond the bottom side 772 of the fletching clamp member 770. Such exposed portion of the fletching component 808 will preferably include an edge or quill portion thereof. However, it should be understood that regardless of the length (i.e., amount) of fletching component 808 disposed outside the fletching clamp member 770 (i.e., the exposed portion of the fletching component 808 below the bottom side 772 of the fletching clamp member 770), the fletching clamp member 770 should be affixed to, and oriented about, the clamp mounting member 740 such that the exposed edge or quill of the fletching component 808 is in contact with the shaft component along substantially the entire length of the fletching component 808 (typically starting about 1 inch (25.4 mm) from the nock end 814 of the shaft component 802 and extending towards the point end 813 thereof).

In some embodiments, the fletching clamp member 770 can comprise an optional alignment guide element 790 which mates to the optional alignment guide element 758 of the clamp mounting member 740. Such guide element 790 can enable the fletching clamp member 770 to mate to a specific location on the clamp mounting member 740 to help ensure repeatable placement and positioning of the fletching clamp member 770 thereupon. Suitable alignment guide elements 790 include those known to persons having ordinary skill in the art, such as apertures, bumps, depressions, markings, studs, etc. In one non-limiting exemplary embodiment, the fletching clamp member 770 can comprise an optional alignment guide element 790 in the form of an aperture which corresponds to, and mates with, an optional alignment guide element 758 of the clamp mounting member 740 in the form of a stud element. However, in some preferred embodiment, such optional alignment guide element 790 may not be desirable, as it could limit adjustment of the fletching clamp member 770 upon the clamp mounting member 740 when attempting to place the exposed edge or quill of a fletching component 808 in contact with the shaft component 802 during use of the device 100 In addition, such optional alignment guide element 790 may result in a need for a more precise attachment of the fletching component 808 within the fletching clamp member 770.

Figure 20:
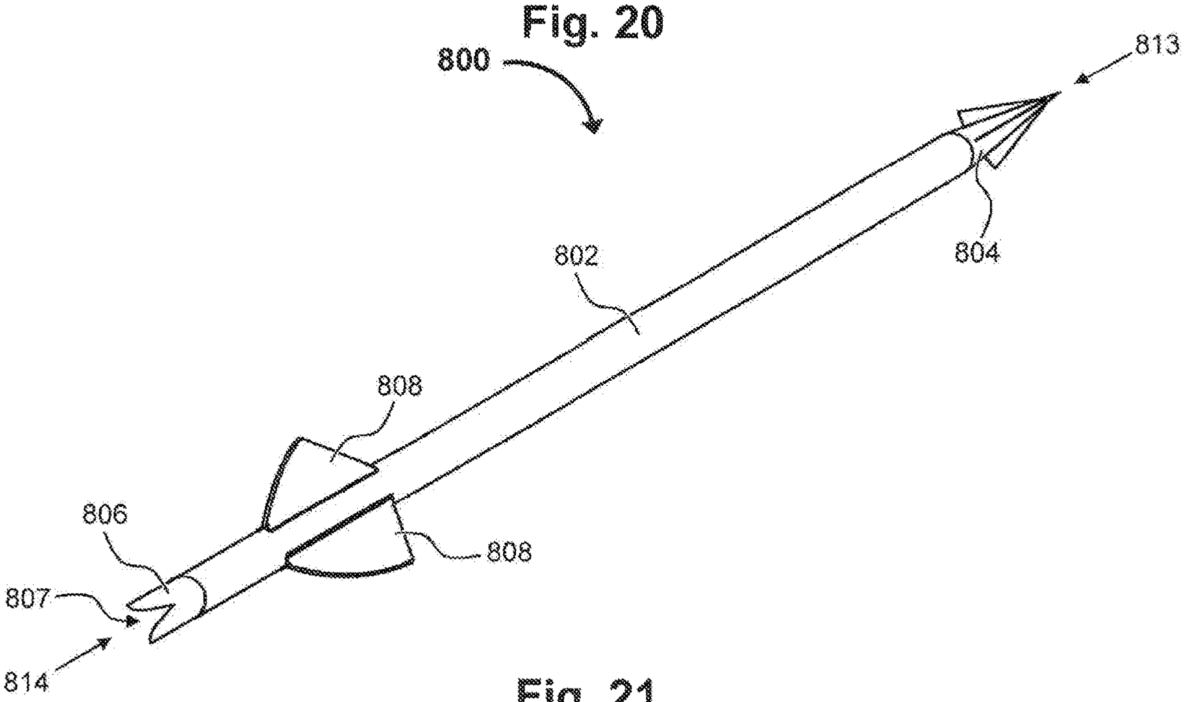
FIG. 20 is a perspective view showing a non-limiting exemplary embodiment of an arrow.

Referring now to FIG. 20, an arrow 800 (which is not part of the invention hereof) typically comprises four (4) main components, including a typically cylindrical shaft component 802, a point component (which desirably penetrates a particular target during use of the arrow 800), a nock component 806 (which desirably comprises a generally "V" shaped notch 807 that can accept the string of a bow (not shown)), and a generally planar fletching component 808. During use of the inventive device 100, preferably at least a shaft component 802 and an unattached fletching component 808 will be present. It should be understood that the point component 804 is not required for suitable use of the invention 100, and the presence of a nock component 806 is optional. As illustrated in FIGS. 2B and 20, when properly configured within the inventive fletching jig alignment device 100 during use, the arrow 800 comprises a point end 813 (which corresponds to the location of the point component 804 when present) and a nock end 814 (which corresponds to the location of the nock component 806 when present).

The invention also includes at least a first method for using the inventive fletching jig alignment device 100 of the present disclosure. The method comprises:

a) providing an inventive fletching jig alignment device 100 of the present disclosure comprising a base assembly 130, an adjustment assembly 140 and a fletching assembly 150;
b) providing a shaft component 802 of an arrow 800;
c) providing a fletching component 808;
d) manipulating the adjustment assembly 140 to positionally adjust the fletching assembly 150 to obtain a fletching jig assembly alignment configuration;
e) disposing the shaft component 802 into an arrow shaft support member 710 of the fletching assembly 150; and
f) disposing the fletching component 808 into a fletching clamp member 770 of the fletching assembly 150 such that an exposed edge or quill of the fletching component 808 is in contact with the shaft component 802 substantially along substantially the entire length of the fletching component 808.

Such method can further comprise applying a suitable attachment means to attach the fletching component 808 to the shaft component 802. It should be understood that any suitable attachment means for attaching the fletching component 808 to the shaft component 802 as would be known to persons having ordinary skill in the art (e.g., adhesive, ultrasonic bonding, heat bonding, laser bonding, etc.) can be utilized without departing from the scope of the invention. In an alternative embodiment of this first method, the manipulating step (step d) can be performed after the disposing step (step f) without departing from the scope of the invention. In further embodiments of this first method, the inventive fletching jig alignment device 100 can comprise a plurality of fletching assemblies 150.

The invention also includes at least a second method for using the inventive fletching jig alignment device 100 of the present disclosure. The method comprises:

a) providing an inventive fletching jig alignment device 100 of the present disclosure comprising a base assembly 130, an adjustment assembly 140 and a fletching assembly 150, wherein the base assembly 130 comprises a first adjustable member 240 and a second adjustable member 250, wherein the adjustment assembly 140 comprises a first adjustment subassembly 140A and a second adjustment subassembly 140B, and wherein the fletching assembly 150 comprises a fletching jig assembly 700 comprising an arrow shaft support member 710, a clamp mounting member 740 and a fletching clamp member 770;
b) providing a shaft component 802 of an arrow 800;
c) providing a fletching component 808;
d) manipulating the first adjustment subassembly 140A to positionally adjust the first adjustable member 240 and manipulating the second adjustment subassembly 140B to positionally adjust the second adjustable member 250 to obtain a fletching jig assembly alignment configuration;
e) suitably disposing and securing the shaft component 802 into the arrow shaft support member 710 such that a nock end 814 of the shaft component 802 generally faces a nock side 104 of the of the device 100;
f) removing the fletching clamp member 770 from the clamp mounting member 740;
g) suitably disposing and securing a fletching component 808 into the fletching clamp member 770 such that a portion of the bottom or lower portion of the fletching component 808 extends externally from a bottom side 772 of the clamp member 770 to form an exposed portion of the fletching component 808; and
h) affixing the fletching clamp member 770 (comprising the fletching component 808) onto the clamp mounting member 740 such that an outer edge of the exposed portion of the fletching component 808 is in contact with the shaft component 802.

This second method can also comprise applying a suitable attachment means to attach the fletching component 808 to the shaft component 802. The point in the method in which such step is performed will depend upon the type attachment means being utilized. For example, where the attachment means includes application of an adhesive to the exposed outer edge or quill of the exposed portion of the fletching component 808, such step can be performed after step G, whereas where the attachment means includes laser bonding for example, such step can be performed after step H. In an alternative embodiment of this second method, the manipulating step (step D) can be performed after the affixing step (step H) without departing from the scope of the invention. In further embodiments of this second method, the inventive fletching jig alignment device 100 can comprise a plurality of fletching assemblies 150.

The invention also includes at least a third method for using the inventive fletching jig alignment device 100 of the present disclosure. The method comprises:

a) providing a fletching jig alignment device 100 comprising a base assembly 130, an adjustment assembly 140 and a fletching assembly 150, wherein the base assembly 130 comprises a first adjustable member 240 and a second adjustable member 250, wherein the adjustment assembly 140 comprises a first adjustment subassembly 140A and a second adjustment subassembly 140B, and wherein the fletching assembly 150 comprises a fletching jig assembly 700; and b) manipulating the first adjustment subassembly 140A to positionally adjust the first adjustable member 240 and manipulating the second adjustment assembly 140B to positionally adjust the second adjustable member 250 to attain a fletching jig assembly alignment configuration.

In some further aspects of this method, the fletching jig assembly 700 comprises an arrow shaft support member 710, a clamp mounting member 740, and a fletching clamp member 770, and the method further comprises:

c) providing a shaft component 802 of an arrow 800;

d) providing a fletching component 808 of an arrow 800;

e) removing the fletching clamp member 770 from the fletching jig alignment device 100;

f) suitably securing the shaft component 802 upon the arrow shaft support member 710;

g) suitably securing a fletching component 808 into the fletching clamp member 770;

and h) affixing the fletching clamp member 770 to the clamp mounting member 740 such that an exposed edge of the fletching component 808 is in contact with the shaft component 802.

In still further aspects of this method embodiment, the method further comprises:

i) applying an attachment means to the exposed edge of the fletching component 808;

and j) attaching the fletching component 808 to the shaft component 802.

In other aspects of this method, the fletching jig assembly alignment configuration comprises an accuracy of about 0.01 inch or less. In still other aspects of this method, the fletching jig alignment device 100 comprises a plurality of fletching assemblies 150. In further aspects of this method, the fletching jig assembly alignment configuration of each of the plurality of fletching assemblies 150 is achieved simultaneously. In still further aspects of this method, the fletching jig assembly alignment configuration of each of the plurality of fletching assemblies 150 comprises an accuracy of about 0.01 inch or less. In other aspects of this method, the steps c-h can be performed prior to step b.

In some embodiments, upon suitable attachment (preferably permanent attachment) of the fletching component 808 to the shaft component 802, the fletching component 808 can be released from the fletching clamp member 770, the fletching clamp can be removed from the clamp mounting member 740, and the shaft component 802 and fletching component 802 combination can be removed from the device 100. Alternatively, the shaft component 802 can be axially rotated to a desired position (e.g., via an arrow shaft rotation control means 725), and then the methods above can be repeated to align, and optionally attach, another fletching component 808.

Typically, after alignment and/or attachment of a fletching component 808 to a shaft component 808, the fletching component 808 will be substantially orthogonal to the shaft component 802, though it may be functionally angled without departing from the scope of the invention.

It should be noted that the inventive fletching jig alignment device 100 of the present disclosure can comprise a plurality of fletching assemblies 150 (there is no particular upper limit to the number of such fletching assemblies 150). Accordingly, the inventive device can advantageously allow for the alignment and optional attachment of fletching components 808 to a plurality of shaft components 802 (i.e., one shaft component for each fletching assembly 150) simultaneously. Typically, each shaft component 802 will have substantially the same alignment configuration of the respective fletching component 808 attached thereto.

It should also be noted that a user can initiate each use of the inventive device 100 by positioning the first and second adjustable members 240, 250 in the same position for each such use. For example, this can be accomplished by fully retracting the first and second adjustable members 240, 250 (i.e., moving the adjustable members 240, 250 toward the adjustment end 105 of the device 100) for example and calibrating the device 100 at the beginning of each use (i.e., prior to any positional adjustment thereof). Alternatively, in some embodiments, the inventive device 100 can comprise alignment means 600 to designate a calibrated configuration of the device 100 such that the device can be utilized with repeated accuracy without the need for calibration between uses. For example, with reference to FIGS. 2D, 3, 6 and 7, once the device 100 has been calibrated and/or aligned to a desired alignment configuration, an optional first static alignment means 610 can be disposed upon an immovable component of the device 100, such as upon the top side 211 of the base member 210 (preferably proximate or adjacent to the first adjustable member 240), and a corresponding optional first dynamic alignment means 620 can be disposed upon the first adjustable member 240 or a component attached thereto. Similarly, an optional second static alignment means 630 can be disposed upon an immovable component of the device 100, such as upon the top side 211 of the base member 210 (preferably proximate or adjacent to the second adjustable member 240), and a corresponding second dynamic alignment means 640 can be disposed upon the second adjustable member 250 or a component attached thereto. In such embodiments, for instance, upon calibration of the device 100 and application of the alignment means 600, a user could then tare the distance measurement devices 470, 490, positionally adjust the first and second adjustable members 240, 250 to a desired configuration, and record the distance measurement data for future reference. Accordingly, prior to a subsequent use of the device 100, a user could reset the position of the first and second adjustable members 240 in accordance with the alignment means 600, and then manipulate the adjustment assembly 140 to a specific fletching jig assembly alignment configuration. Thus, a further advantage of the inventive device 100 is that any particular configuration for disposing a fletching component 808 onto a shaft component 802 can be repeated over time with precision (i.e., accurate to within 0.01 inch or less).

Figure 21:
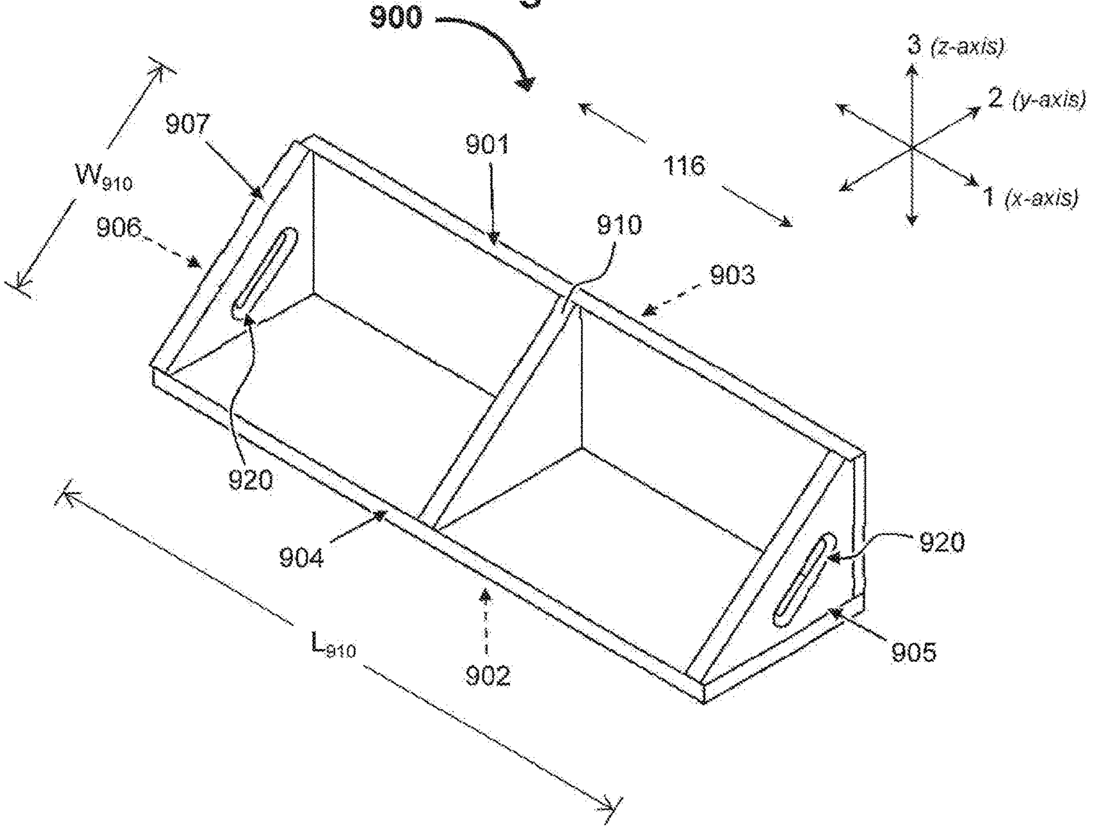
FIG. 21 is a perspective view showing a non-limiting exemplary embodiment of an optional device mounting member of the present invention.
Figure 22:
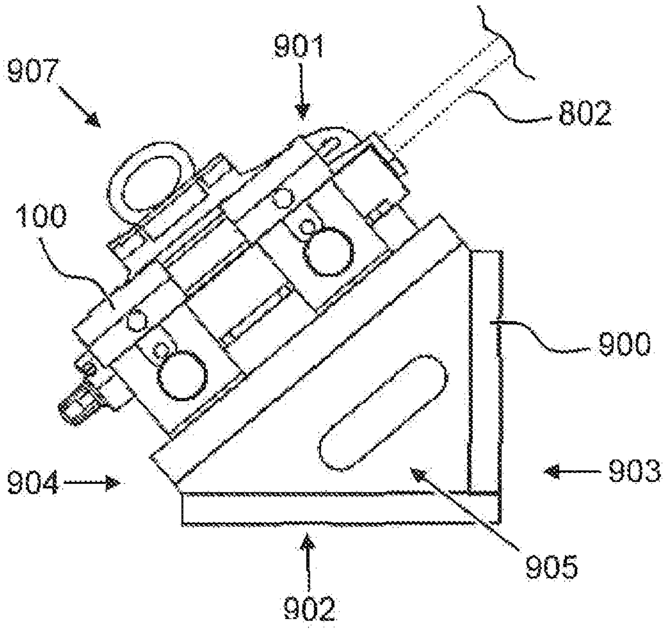
FIG. 22 is a side view showing a non-limiting exemplary embodiment of a fletching jig alignment device of the present invention disposed upon an exemplary optional mounting device.
Figure 23:
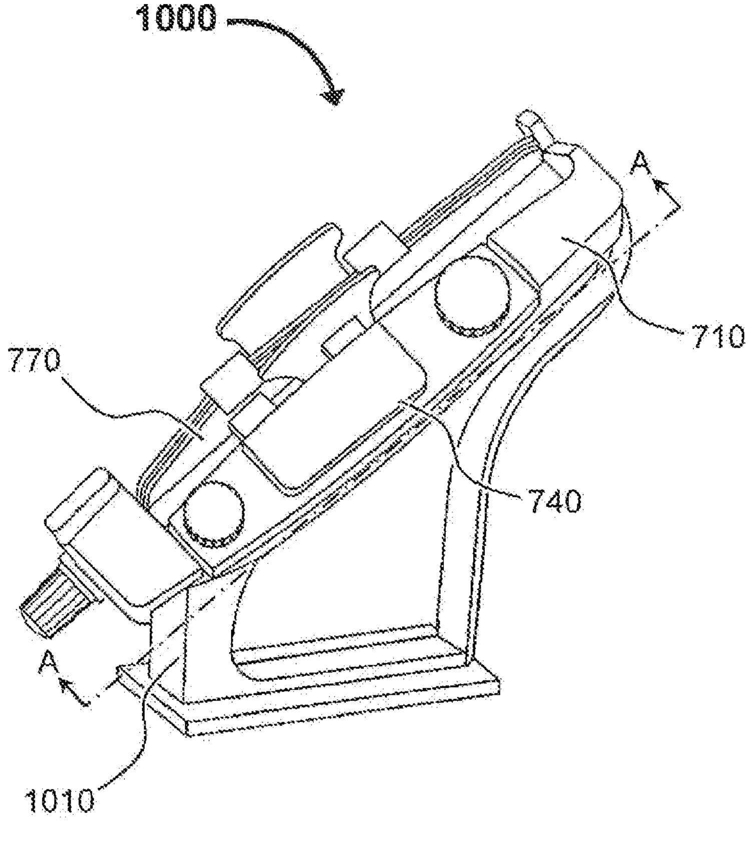
FIG. 23 is a perspective view showing an exemplary fletching jig.

Referring now to FIGS. 21-22, in some embodiments, the inventive device 100 can be attached upon an optional device mounting member 900. Such optional device mounting member 900 can assist a user with operating the device 100. For example, the optional device mounting member 900 can elevate the device 100 and/or present the device at an particular angle (e.g., 30°, 45°, 60°, etc.) with respect to the surface upon which the device mounting member 900 resides. Suitable device mounting members include those known to persons having ordinary skill in the art. One non-limiting exemplary embodiment of an optional device mounting member 900 is illustrated in FIG. 21, which comprises a generally triangular shape cross-sectional profile and which presents the device to a user at an approximately 45° angle. The illustrated device comprises a top side 901, an opposing bottom side 902 distal to the top side 901, a point side 903, an opposing nock side distal to the point side, an adjustment side or end 905, an opposing calibration side or end 906 distal to the adjustment end 905, and an angular side 907 disposed between the top side 901 and the nock side 904. The illustrated device mounting member 900 also comprises a mounting surface 910 which is defined by a length $L_{910}$ and a width $W_{910}$. Preferably, the bottom side 202 of the device 100 (e.g., the bottom side 211 of the base member 210) will be disposed upon, and in contact with, the angular side 907 (i.e., the mounting surface 910) of the device mounting member 900, though it may be affixed to another location upon the device mounting member in some alternative embodiments. In some desirable aspects, the length $L_{910}$ and width $W_{910}$ of the device mounting member 900 can be generally equivalent to the length $L_{100}$ and width $W_{100}$ of the device 100, though it can alternatively comprise different dimensions without departing from the scope of the invention. Suitable attachment means as would be known to persons having ordinary skill in the art can be utilized to affix the device 100 to the device mounting member 900, and can include screws, bolts, nails, studs, compression fittings, adhesives, hook-and-loop, and the like, and combinations thereof. With further reference to FIG. 3, the base member 210 of the device 100 can comprise optional mounting apertures 219 (e.g., suitable for use with screws, bolts, nails, studs, etc.) which preferably generally align to the mounting surface 910 of the device mounting member 900. In addition, in some embodiments, the optional device mounting member 900 can further include an optional grasping means 920 which can assist a user with positioning the device 100 and/or transporting the device 100. Suitable grasping means include those known to persons having ordinary skill in the art, and can include handles, knobs, depressions, openings, and the like, and combinations thereof. In the non-limiting exemplary illustrated embodiment, the device mounting member 900 comprises optional grasping means 920 in form of openings disposed through the adjustment side 905 and the calibration side 906 thereof.

The present invention may be better understood with reference to the following example.

EXAMPLES

Example 1

A generally rectangular base member 210 was prepared and adapted to utilize up to six (6) fletching assemblies 150, similar to the base member 210 shown in FIG. 3. The base member 210 comprised high-density polyethylene, and had a length $L_{210}$ of about 57.2 cm, a width $W_{210}$ of about 19.7 cm, and a thickness or height $H_{210}$ of about 19.0 mm. Disposed through the top side 211 of the base member 210 were a plurality of circular shaped static component apertures 217 and device mounting apertures 219, as well as and six (6) oblong racetrack-shaped adjustable mounting apertures 218 each having a longitudinal 116 length of about 21.5 mm (configured accordingly to accommodate a first adjustable member 240 and a second adjustable member 250), in a configuration similar to the embodiment shown in FIG. 3. Notably, each adjustable component aperture 218 comprised a general length of about 27.1 mm, a width of about 7.4 mm and a depth of about 12.7 mm. The component apertures 217, 218 were configured to correspond with apertures of the first jig support base member 220, second jig support base member 230, first adjustable member 240, second adjustable member 250, first adjustment assembly support member 450 and second adjustment assembly support member 460.

A generally rectangular first jig support base member 220 was prepared and adapted to utilize up to six (6) fletching assemblies 150, similar to the first jig support base member 220 shown in FIG. 4. The first jig support base member 220 comprised high-density polyethylene, and had a length $L_{220}$ of about 41.5 cm, a width $W_{220}$ of about 2.5 cm, and a thickness or height $H_{220}$ of about 19.0 mm. Disposed through the first jig support base member 220 were a plurality of circular shaped support base member mounting apertures 227 and circular-shaped jig support member mounting apertures 228, in a configuration similar to the embodiment shown in FIG. 4. Notably, the support base member mounting apertures 227 corresponded to respective static component apertures 217 disposed into the base member 210, wherein suitable screws were then utilized to securely affix the first jig support base member 220 to the top side 211 of the base member 210, located proximate to the point side 213 thereof.

A generally rectangular second jig support base member 230 was prepared and adapted to utilize up to six (6) fletching assemblies 150, similar to the second jig support base member 230 shown in FIG. 5. The second jig support base member 230 comprised high-density polyethylene, and had a length $L_{230}$ of about 41.5 cm, a width $W_{230}$ of about 6.4 cm, and a thickness or height $H_{230}$ of about 19.0 mm. Disposed through the second jig support base member 230 were a plurality of circular shaped support base member mounting apertures 237 and circular-shaped jig support member mounting apertures 238, in a configuration similar to the embodiment shown in FIG. 5. Notably, the support base member mounting apertures 237 corresponded to respective static component apertures 217 disposed into the base member 210, wherein suitable screws were then utilized to securely affix the second jig support base member 230 to the top side 211 of the base member 210, located generally between the first jig support base member 220 and the nock side 214 of the base member 210.

A generally rectangular first adjustable member 240 was prepared and adapted to utilize up to six (6) fletching assemblies 150, similar to the first adjustable member 240 shown in FIG. 5. The first adjustable member 240 comprised high-density polyethylene, and had a length $L_{240}$ of about 47.4 cm, a width $W_{240}$ of about 2.5 cm, and a thickness or height $H_{240}$ of about 17.8 mm. The first adjustable member 240 also comprised a plurality of apertures, in a configuration similar to the embodiment shown in FIG. 5. More particularly, disposed through the first adjustable member 240 were twelve (12) circular shaped clamp base mounting apertures 248 (spaced out accordingly to accommodate six (6) first clamp base members 300), two (2) transversely aligned circular adjustment base mounting apertures 249 (located proximate to the adjustment end 245 thereof to accommodate the first adjustment base member 410), and two (2) oblong racetrack-shaped adjustable mounting apertures 247B each having a longitudinal 116 length of about 21.5 mm (thus defining the adjustment range of the first adjustable member 240). Notably, the adjustable mounting apertures 247B corresponded to respective static component apertures 217 disposed into the top side 211 of the base member 210. In addition, disposed through the bottom side 242 of the first adjustable member 240 to a depth (i.e., height) of about 9.5 mm were three (3) static mounting apertures 247A, which corresponded to the respective adjustable component apertures 218 of the base member 210. Doweling pins having a diameter of ¼ inch (6.4 mm) and a length of ⅝ inch (15.9 mm) were press-fit into each static mounting aperture 247A on the bottom side 242 of the first adjustable member 240 to a depth of about 9.5 mm wherein the remainder (i.e., exposed portions) of the doweling pins were then disposed (and longitudinally 116 movable) within the corresponding adjustable component apertures 218 of the base member 210. Suitable screws (e.g., SAE 10 NC-24) having a length of 1⅜ inch (34.9 mm) were then disposed through (and longitudinally 116 movable within) the adjustable mounting apertures 247B (extending from the top side 241 through the bottom side 242 of the first adjustable member 240) and were loosely tightened into the corresponding static component apertures 217 of the base member 210. Hand pressure was then alternately applied to each end 245, 246 of the first adjustable member 240 to ensure it was longitudinally 116 moveable (i.e., with respect to base member 210).

A generally rectangular second adjustable member 250 was prepared and adapted to utilize up to six (6) fletching assemblies 150, similar to the second adjustable member 250 shown in FIG. 6. For this Example 1, the second adjustable member 250 was substantially a duplicate of the first adjustable member 240 described above. Accordingly, the second adjustable member 250 comprised high-density polyethylene, and had a length $L_{250}$ of about 47.4 cm, a width $W_{250}$ of about 2.5 cm, and a thickness or height $H_{250}$ of about 17.8 mm. The second adjustable member 250 also comprised a plurality of apertures, in a configuration similar to the embodiment shown in FIG. 6. More particularly, disposed through the second adjustable member 250 were twelve (12) circular shaped clamp base mounting apertures 258 (spaced out accordingly to accommodate six (6) second clamp base members 330), two (2) transversely aligned circular adjustment base mounting apertures 259 (located proximate to the adjustment end 255 thereof to accommodate the second adjustment base member 420), and two (2) oblong racetrack-shaped adjustable mounting apertures 257B each having a longitudinal 116 length of about 21.5 mm (thus defining the adjustment range of the second adjustable member 250). Notably, the adjustable mounting apertures 257B corresponded to respective static component apertures 217 disposed into the top side 211 of the base member 210. In addition, disposed through the bottom side 252 of the second adjustable member 250 to a depth (i.e., height) of about 9.5 mm were three (3) static mounting apertures 257A, which corresponded to the respective adjustable component apertures 218 of the base member 210. Doweling pins having a diameter of ¼ inch (6.4 mm) and a length of ⅝ inch (15.9 mm) were press-fit into each static mounting aperture 257A on the bottom side 252 of the second adjustable member 250 to a depth of about 9.5 mm wherein the remainder (i.e., exposed portions) of the doweling pins were then disposed (and longitudinally 116 movable) within the corresponding adjustable component apertures 218 of the base member 210. Suitable screws (e.g., SAE 10 NC-24) having a length of 1⅜ inch (34.9 mm) were then disposed through (and longitudinally 116 movable within) the adjustable mounting apertures 257B (extending from the top side 251 through the bottom side 252 of the second adjustable member 250) and were loosely tightened into the corresponding static component apertures 217 of the base member 210. Hand pressure was then alternately applied to each end 255, 256 of the second adjustable member 250 to ensure it was longitudinally 116 moveable (i.e., with respect to base member 210).

The assembling of the base member 210, first jig support base member 220, second jig support base member 230, first adjustable member 240, and second adjustable member 250 accordingly provided the base assembly 130 of the invention, similar to the base assembly 130 embodiment shown in FIGS. 2A-2D.

Six (6) generally C-shaped first clamp base members 300 were fabricated out of aluminum, similar to the first clamp base member 300 shown in FIG. 8. Accordingly, although fabricated as single unitary units, each first clamp base member 300 generally comprised an upper horizontal planar portion 310, a lower horizontal planar portion 322 and a vertical planar portion 316 disposed therebetween. Due to its general shape profile and the thickness of the aluminum, each first clamp base member 300 comprised outer dimensions and inner dimensions. Accordingly, each first clamp base member 300 comprised an outer length $L_{300A}$ of about 44.5 mm, an outer width $W_{300}$ of about 27.0 mm and an outer height $H_{300A}$ of about 50.8 mm; an inner length $L_{300B}$ of about 38.1 mm, an inner width $W_{300}$ of about 27.0 mm (which is the same as the outer width) and an inner height $H_{300B}$ of about 38.1 mm; and a thickness or caliper $T_{300}$ of about 6.4 mm. Two (2) circular attachment apertures 329 (aligned generally longitudinally 116 with respect to the device 100) were disposed through the lower portion 322 of each first clamp base member 300, and one (1) circular clamp base mounting aperture 328 was disposed through the upper portion 310 of each first clamp base member 300 (at about the center thereof). Each first clamp base member 300 was then disposed upon the top side 241 of the first adjustable member 240 in a generally longitudinal 116 configuration (wherein the "open" portion of each C-shaped member 300 faced the calibration end 106 of the device 100) and were generally evenly spaced out such that the respective attachment apertures 329 aligned with corresponding clamp base mounting apertures 248. Each first clamp base member 300 was then securely fastened to the first adjustable member 240 by inserting suitable screws through the attachment apertures 329 and tightening the screws within the clamp base mounting apertures 248 of the first adjustable member 240 (similar to FIGS. 2A-2D).

Six (6) generally C-shaped second clamp base members 330 were fabricated out of aluminum, similar to the second clamp base member 330 shown in FIG. 9. For this Example 1, the second clamp base members 330 were substantially duplicates of the first clamp base members 300 described above. Accordingly, although fabricated as single unitary units, each second clamp base member 330 generally comprised an upper horizontal planar portion 340, a lower horizontal planar portion 352 and a vertical planar portion 346 disposed therebetween. Due to its general shape profile and the thickness of the aluminum, each second clamp base member 330 comprised outer dimensions and inner dimensions. Accordingly, each second clamp base member 330 comprised an outer length $L_{330A}$ of about 44.5 mm, an outer width $W_{330}$ of about 27.0 mm and an outer height $H_{330A}$ of about 50.8 mm; an inner length $L_{330B}$ of about 38.1 mm, an inner width $W_{330}$ of about 27.0 mm (which is the same as the outer width) and an inner height $H_{330B}$ of about 38.1 mm; and a thickness or caliper $T_{330}$ of about 6.4 mm. Two (2) circular attachment apertures 359 (aligned generally longitudinally 116 with respect to the device 100) were disposed through the lower portion 352 of each second clamp base member 330, and one (1) circular clamp base mounting aperture 358 was disposed through the upper portion 340 of each second clamp base member 330 (at about the center thereof). Each second clamp base member 330 was then disposed upon the top side 251 of the second adjustable member 250 in a generally longitudinal 116 configuration (wherein the "open" portion of each C-shaped member 330 faced the calibration end 106 of the device 100) and were generally evenly spaced out such that the respective attachment apertures 359 aligned with corresponding clamp base mounting apertures 258. Each second clamp base member 330 was then securely fastened to the second adjustable member 250 by inserting suitable screws through the attachment apertures 359 and tightening the screws within the clamp base mounting apertures 258 of the second adjustable member 250 (similar to FIGS. 2A-2D).

A generally rectangular-shaped arrow shaft support base member 360 was fabricated out of aluminum, similar to the arrow shaft support base member 360 shown in FIGS. 10A-10B. The arrow shaft support base member 360 had an overall length $L_{360}$ of about 28.8 mm (which included a 14.4 mm long lip portion extending from the top side 361 toward the calibration end 106 of the device 100, wherein the lip portion further comprised a width 165.1 mm and a thickness or height of about 5.1 mm), a width $W_{360}$ of about 165.1 mm and a height $H_{360}$ of about 31.8 mm. Starting approximately 34.6 mm from the point side 363 of the arrow shaft support base member 360, a first opening 360A was cut into the general bottom side 362 portion of the arrow shaft support base member 360 (i.e., extending upward from the bottom side 362 and towards the nock side 364 thereof). The first opening 360A had a length $L_{360A}$ of about 14.4 mm, a width $W_{360A}$ of about 35.3 mm and a height $H_{360A}$ of about 12.7 mm. In addition, starting at the nock side 364 of the arrow shaft support base member 360, a second opening 360B was cut into the general bottom side 362 portion of the arrow shaft support base member 360 (i.e., extending upward from the bottom side 362 and towards the point side 363 thereof). The second opening 360B had a length $L_{360B}$ of about 14.4 mm, a width $W_{360B}$ of about 30.4 mm and a height $H_{360B}$ of about 12.7 mm. Two (2) circular jig mounting apertures 370 were disposed into the top side 361 of the arrow shaft support base member 360 such as shown in FIGS. 10A-10B (wherein the apertures 370 were generally aligned transversely 118 along the y-axis 2, but with a slight longitudinal 116 offset of about 2.0 mm). More particularly, a first jig mounting aperture 370 was disposed at a location measuring about 6.8 mm from the nock end 364 and about 10.7 mm from the calibration side 366, and a second jig mounting aperture 370 was disposed at a location measuring about 107.0 mm from the nock end 364 and about 12.6 mm from the calibration side 366. Such configuration of the jig mounting apertures 370 was intended to align with corresponding mounting apertures 732 disposed in a particular arrow shaft support member 710 of a fletching jig 700 (discussed further below). Each jig mounting aperture 370 was then threaded using a threading die (e.g., SAE 10 NC-24). It should be appreciated that alternative arrow shaft support members may require a different configuration of the jig mounting apertures 370. The arrow shaft support base member 360 further comprised a first mounting element 380 and a second mounting element 390, each of which extended from the general bottom side 362 portion of the arrow shaft support base member 360 towards adjustment end 365 of the device 100. The first mounting element 380 was located about 11.7 mm from the point side 363 of the arrow shaft support base member 360 (i.e., disposed between the point end 363 and the first opening 360A) and had a length $L_{380}$ of about 15.6 mm, a width $W_{380}$ of about 19.1 mm and a thickness or height $H_{380}$ of about 5.1 mm, and comprised one (1) open-ended U-shaped mounting aperture 382. The second mounting element 390 was located about 34.2 mm from the nock side 364 of the arrow shaft support base member 360 (i.e., disposed between the second opening 360B and the first opening 360A) and had a length $L_{390}$ of about 15.6 mm, a width $W_{390}$ of about 57.2 mm and a thickness or height $H_{390}$ of about 5.1 mm, and comprised two (2) open-ended U-shaped mounting apertures 392. The arrow shaft support base member 360 was disposed upon the first jig support base member 220 and the second jig support base member 230, and the mounting apertures 382, 392 were aligned with corresponding jig support member mounting apertures 228, 238 in the first and second jig support base members 220, 230, respectively (similar to FIGS. 2A-2D). Each arrow shaft support base member 360 was transversely 118 aligned with the device 100 (using a squaring tool and a caliper) and then suitable screws were utilized to securely affix the aligned arrow shaft support base members 360 to the top side 221 of the first jig support base member 220 and to the top side 231 of the second jig support base member 230.

A generally L-shaped first adjustment assembly support member 450 was fabricated out of aluminum, similar to the first adjustment assembly support member 450 shown in FIG. 11. The first adjustment assembly support member 450 comprised a vertical element 450A and a horizontal element 450B (extending from the bottom end 452A of the vertical element 450A), wherein the vertical element 450A and the horizontal element 450B were fabricated as a single unitary unit. The first adjustment assembly support member 450 had a length L450 of about 38.1 mm (which included the length of the horizontal element 450B), a width $W_{450}$ of about 50.8 mm and a height $H_{450}$ of about 50.8 mm. Four (4) circular mounting apertures 459 were disposed through the horizontal element 450B (extending from the top side 451B through the bottom side 452B thereof). In addition, one (1) circular adjustment aperture 458 having a diameter of about 8.0 mm was disposed through the vertical member 450A (extending from the adjustment side 455A through the calibration side 456A thereof) near the approximate center of the vertical element 450A (such that it would be substantially aligned with the adjustment aperture 418 of the first adjustment base member 410 during use of the device 100). Furthermore, a distance measuring device mounting aperture 457 was disposed approximately 13 mm above the adjustment aperture 458. The first adjustment assembly support member 450 was disposed upon the top side 211 of the base member 210 proximate to the adjustment end 215 thereof (generally longitudinally 116 aligned with the first adjustable member 240, and wherein the horizontal element 450B extended towards the adjustment end 105 of the device 100), and the mounting apertures 459 were then aligned with corresponding component apertures 217 of the base member 210 (similar to FIGS. 2A-2D). Suitable screws were then inserted through the mounting apertures 459 of the first adjustment assembly support member 450 and tightened into the respective mounting apertures 217 of the base member to secure the first adjustment assembly support member 450 to the base member 210.

A generally L-shaped second adjustment assembly support member 460 was fabricated out of aluminum, similar to the second adjustment assembly support member 460 shown in FIG. 12. For this Example 1, the second adjustment assembly support member 460 was substantially a duplicate of the first adjustment assembly support member 450 described above. Accordingly, the second adjustment assembly support member 460 comprised a vertical element 460A and a horizontal element 460B (extending from the bottom end 462A of the vertical element 460A), wherein the vertical element 460A and the horizontal element 460B were fabricated as a single unitary unit. The second adjustment assembly support member 460 had a length L460 of about 38.1 mm (which included the length of the horizontal element 460B), a width $W_{460}$ of about 50.8 mm and a height $H_{460}$ of about 50.8 mm. Four (4) circular mounting apertures 469 were disposed through the horizontal element 460B (extending from the top side 461B through the bottom side 462B thereof). In addition, one (1) circular adjustment aperture 468 having a diameter of about 8.0 mm was disposed through the vertical member 460A (extending from the adjustment side 465A through the calibration side 466A thereof) near the approximate center of the vertical element 460A (such that it would be substantially aligned with the adjustment aperture 428 of the second adjustment base member 420 during use of the device 100). Furthermore, a distance measuring device mounting aperture 467 was disposed approximately 13 mm above the adjustment aperture 468. The second adjustment assembly support member 460 was disposed upon the top side 211 of the base member 210 proximate to the adjustment end 215 thereof (generally longitudinally 116 aligned with the second adjustable member 250, and wherein the horizontal element 460B extended towards the adjustment end 105 of the device 100), and the mounting apertures 469 were then aligned with corresponding component apertures 217 of the base member 210 (similar to FIGS. 2A-2D). Suitable screws were then inserted through the mounting apertures 469 of the second adjustment assembly support member 460 and tightened into the respective mounting apertures 217 of the base member to secure the second adjustment assembly support member 460 to the base member 210.

A generally cubical-shaped first adjustment base member 410 was fabricated out of aluminum, similar to the first adjustment base member 410 shown in FIG. 13. The first adjustment base member 410 had a length L410 of about 19.1 mm, a width $W_{410}$ of about 25.4 mm and a height $H_{410}$ of about 12.7 mm. Two (2) circular mounting apertures 419 (aligned generally transversely 118 with respect to the device 100) were disposed through the first adjustment base member 410 (extending from the top side 411 through the bottom side 412). In addition, one (1) circular adjustment aperture 418 was disposed through the first adjustment base member 410 (extending from the adjustment side 415 through the calibration side 416) at the approximate center of the adjustment side 415 (between and perpendicular to the mounting apertures 419). The adjustment aperture 418 was then threaded with a mating thread to the first adjustment element 430 using a threading die (e.g., SAE ¼ inch NC-28). The first adjustment base member 410 was then disposed upon the top side 241 of the first adjustment member 240 adjacent to the adjustment end 245 thereof, and the mounting apertures 419 were aligned with corresponding adjustment base mounting apertures 249 of the first adjustment member 240 (similar to FIGS. 2A-2D). Suitable screws were then inserted through the mounting apertures 419 and tightened into the respective adjustment base mounting apertures 249 of the first adjustment member 240 to secure the first adjustment base member 410 to the first adjustment member 240.

A generally cubical-shaped second adjustment base member 420 was fabricated out of aluminum, similar to the second adjustment base member 420 shown in FIG. 14. For this Example 1, the second adjustment base member 420 was substantially a duplicate of the first adjustment base member 410 described above. Accordingly, the second adjustment base member 420 had a length $L_{420}$ of about 19.1 mm, a width $W_{420}$ of about 25.4 mm and a height $H_{420}$ of about 12.7 mm. Two (2) circular mounting apertures 429 (aligned generally transversely 118 with respect to the device 100) were disposed through the second adjustment base member 420 (extending from the top side 421 through the bottom side 422). In addition, one (1) circular adjustment aperture 428 was disposed through the second adjustment base member 420 (extending from the adjustment side 425 through the calibration side 426) at the approximate center of the adjustment side 425 (between and perpendicular to the mounting apertures 429). The adjustment aperture 428 was then threaded with a mating thread to the second adjustment element 440 using a threading die (e.g., SAE ¼ inch NC-28). The second adjustment base member 420 was then disposed upon the top side 251 of the second adjustment member 250 adjacent to the adjustment end 255 thereof, and the mounting apertures 429 were aligned with corresponding adjustment base mounting apertures 259 of the second adjustment member 250 (similar to FIGS. 2A-2D). Suitable screws were then inserted through the mounting apertures 429 and tightened into the respective adjustment base mounting apertures 259 of the second adjustment member 250 to secure the second adjustment base member 420 to the second adjustment member 250.

A cylindrical first adjustment element 430 was provided, similar to the first adjustment element 430 shown in FIG. 15. The first adjustment element 430 comprised a threaded steel stud element 432 (e.g., an SAE ¼ inch NC-28 threaded stud). The stud element 432 utilized for this Example 1 comprised a diameter $D_{432}$ of about 6.4 mm and a length $L_{432}$ of about 6.7 cm. When properly oriented within the device 100, the stud element 432 exhibited an adjustment end 435 and a calibration end 436. Disposed upon the adjustment end 435 was a control means 438 in the form of a generally circular knob. With the first adjustment member 240 positioned as far to the calibration end 106 of the device 100 as practicable, the calibration end 436 of the stud element 432 was partially inserted through the adjustment aperture 458 of the first adjustment assembly support member 450 (starting from the adjustment side 455 thereof) while holding a biasing means 439 in the form of a cylindrical coiled spring (comprising an inner diameter of 6.9 mm, and outside diameter of about 9.1 mm, an uncompressed length of about 38.1 mm and a compressed length of about 9.4 mm) against the calibration side 456 of the adjustment aperture 458. The stud element 432 was then urged through the entire length of the biasing means 439, the calibration end 436 of the stud element 432 was inserted into the adjustment aperture 418 of the first adjustment base member 410, and the stud element 432 was partially rotated to ensure the threads had mated and movement of the first adjustable member 240 towards the adjustment end 105 of the device 100 was observed. Notably, the configuration of the first adjustment element 430 was similar to that shown in FIGS. 2A-2D.

A cylindrical second adjustment element 440 was provided, similar to the second adjustment element 440 shown in FIG. 16. For this Example 1, the second adjustment element 440 was substantially a duplicate of the first adjustment element 430 described above. Accordingly, the second adjustment element 440 comprised a threaded steel stud element 442 (e.g., an SAE ¼ inch NC-28 threaded stud).

The stud element 442 utilized for this Example 1 comprised a diameter $D_{432}$ of about 6.4 mm and a length $L_{432}$ of about 6.7 cm. When properly oriented within the device 100, the stud element 442 exhibited an adjustment end 445 and a calibration end 446. Disposed upon the adjustment end 445 was a control means 448 in the form of a generally circular knob. With the second adjustment member 250 positioned as far to the calibration end 106 of the device 100 as practicable, the calibration end 446 of the stud element 442 was partially inserted through the adjustment aperture 468 of the second adjustment assembly support member 460 (starting from the adjustment side 465 thereof) while holding a biasing means 449 in the form of a cylindrical coiled spring (comprising an inner diameter of 6.9 mm, and outside diameter of about 9.1 mm, an uncompressed length of about 38.1 mm and a compressed length of about 9.4 mm) against the calibration side 466 of the adjustment aperture 468. The stud element 442 was then urged through the entire length of the biasing means 449, the calibration end 446 of the stud element 442 was inserted into the adjustment aperture 428 of the second adjustment base member 420, and the stud element 442 was partially rotated to ensure the threads had mated and movement of the second adjustable member 250 towards the adjustment end 105 of the device 100 was observed. Notably, the configuration of the second adjustment element 440 was similar to that shown in FIGS. 2A-2D.

A first distance measurement device 470 in the form of an electronic plunger indicator was provided. More particularly, the first distance measurement device 470 was a DIGR-0055 Digital Indicator, available from Clockwise Tools Inc. The first distance measurement device 470 comprised a mounting member 478 disposed upon the bottom side 472 thereof, wherein such mounting member 478 further comprised a mounting aperture 479 disposed therethrough. The first distance measurement device 470 was oriented such that the plunger element 482 pointed towards the calibration end 106 of the device 100, and then the bottom side 472 of the first distance measurement device 470 was placed upon the top side 451A of the vertical member 450A of the first adjustment assembly support member 450, such that the mounting aperture 479 of the first distance measurement device 470 aligned with the corresponding distance measuring device mounting aperture 457 of the first adjustment assembly support member 450. The first distance measurement device 470 was secured to the first adjustment assembly support member 450 using a suitable bolt and nut. Notably, the configuration of the first distance measurement device 470 was similar to that shown in FIGS. 2A-2D.

A second distance measurement device 490 in the form of an electronic plunger indicator was provided. For this Example 1, the second distance measurement device 490 was a duplicate of the first distance measurement device 470 described above. Thus, the second distance measurement device 490 was a DIGR-0055 Digital Indicator, available from Clockwise Tools Inc. Accordingly, the second distance measurement device 490 comprised a mounting member 498 disposed upon the bottom side 492 thereof, wherein such mounting member 498 further comprised a mounting aperture 499 disposed therethrough. The second distance measurement device 490 was oriented such that the plunger element 502 pointed towards the calibration end 106 of the device 100, and then the bottom side 492 of the second distance measurement device 490 was placed upon the top side 461A of the vertical member 460A of the second adjustment assembly support member 460, such that the mounting aperture 499 of the second distance measurement device 490 aligned with the corresponding distance measuring device mounting aperture 467 of the second adjustment assembly support member 460. The second distance measurement device 490 was secured to the second adjustment assembly support member 460 using a suitable bolt and nut. Notably, the configuration of the second distance measurement device 490 was similar to that shown in FIGS. 2A-2D.

The assembling of the first and second adjustment assembly support members 450, 460, first and second adjustment base members 410, 420, first and second adjustment elements 430, 440, and first and second distance measurement devices 470, 490 accordingly provided the adjustment assembly 140 of the invention, similar to the adjustment assembly 140 shown in FIGS. 2A-2D.

While a fletching jig assembly 700 may be provided with the invention, for purposes of this Example 1, a suitable fletching jig assembly 700 was created by modifying a commercially available fletching jig unit 1000. More particularly, with reference to FIG. 23, six (6) commercially available fletching jig units 1000 were provided. Each fletching jig unit 1000 was a Bitzenburger Jig, Catalog Number: #1000, available from Bitzenburger Machine & Tool, Inc. having a place of business located in Grand Ledge, Michigan, USA 48837. It should be noted that each fletching jig unit 1000 was also equipped with a Zenith nock receiver (i.e., a nock adapter), available from Zenith Archery Products, disposed into the nock chamber 722 of each arrow shaft support member 710. Each fletching jig unit 1000 was disassembled to remove the fletching clamp member 770 (which was magnetically attached to the clamp mounting member 740 of the unit 1000) and the clamp mounting member 740 (by removing the compression fittings from the integrated vertical studs 752 thereof), all of which were set aside for use with the inventive device 100 of the present disclosure. The remaining integrated portion of each fletching jig unit 1000 was then cut approximately along Line A-A of FIG. 23 to create and separate an arrow shaft support member 710 from the stand member 1010. (It should be noted that the separated stand member 1010 portion is not utilized with the present invention.)

Two (2) counter-sunk mounting apertures 732 were then disposed through the surface area 720A of the open portion 720 of each created arrow shaft support member 710, extending from the top side 711 through the bottom side 712 thereof (wherein one (1) aperture was located near the point end 713 of each opening 720 and one (1) aperture was located near the nock end 714 of each opening 720, and wherein the apertures 732 substantially aligned with the jig mounting apertures 370 of each arrow shaft support base member 360), such that each arrow shaft support member 710 appeared similar to the arrow shaft support member 710 shown in FIGS. 19A-19B. Each arrow shaft support member 710 was then disposed upon one of the six (6) corresponding arrow shaft support base members 360. The mounting apertures 732 of each arrow shaft support member 710 were aligned with the corresponding jig mounting apertures 370 of the respective arrow shaft support base members 360, and were fastened thereto using flathead machine screws (e.g., SAE 10 NC-24) such that the heads of the screws where substantially flush with the surface area 720A.

With the six (6) arrow shaft support members 710 securely fastened to the device 100, the six (6) clamp mounting members 740 were then attached. More particularly, the upward-facing vertical stud elements 752 of each clamp mounting member 740 were inserted through the clamp base mounting apertures 328, 358 of transversely 118 corresponding first and second clamp base members 300, 330 from the bottom sides 314, 344 of the upper horizontal portions 310, 340 thereof, respectively. The compression fittings previously removed from the commercially available fletching jig units 1000 were then utilized for attachment to the stud elements 752 to secure each clamp mounting member 740 to the device 100. The fletching clamp members 770 were then disposed upon the attachment means 756 of each clamp mounting member 740 (held in place via a magnet within each clamp mounting member 740) to complete the inventive fletching device 100 of the present disclosure.

The assembling of the arrow shaft support members 710, the clamp mounting members 740 and the fletching clamp members 770 accordingly provided six (6) fletching jig assemblies 700 of the invention, similar to the fletching jig assembly 700 shown in FIGS. 19A-19B. Furthermore, the assembling of the first and second clamp base members 300, 330, arrow shaft support base members 360, arrow shaft support members 710, clamp mounting members 740 and fletching clamp members 770 accordingly provided six (6) fletching assemblies 150 of the invention, similar to the fletching assemblies 150 shown in FIGS. 2A-2D.

At this point, the first adjustable member 240 and the second adjustable member 250 were contracted (i.e., positionally adjusted towards the adjustment end 105 of the device 100 by rotating the adjustment elements 430, 440 clockwise) and the device 100 was then calibrated (longitudinally 116) using suitable calibration tools as would be known to persons having ordinary skill in the art such that the components disposed upon the first adjustable member 240 and the second adjustable member 250 were precisely aligned longitudinally 116 and transversely 118 (with respect to the device 100) with each other to within 0.01 inch (0.25 mm). Four (4) adhesive labels having a straight line disposed thereon were then fastened to the device to serve as alignment means 600 for the calibrated device 100 (which allowed for quickly resetting the device 100 to its calibrated state for multiple re-uses, thus eliminating the need for re-calibration between uses). More particularly, a first label 610 (with the line facing transversely 118 with respect to the device 100) was placed horizontally upon the base member 210 adjacent to the first adjustable member 240, and a first corresponding label 620 was adjacently placed vertically upon the side of the first adjustable member 240 such that the lines of the labels 610, 620 were aligned. Similarly, a second label 630 (with the line facing transversely 118 with respect to the device 100) was placed horizontally upon the base member 210 adjacent to the second adjustable member 250, and a second corresponding label 640 was adjacently placed vertically upon the side of the second adjustable member 250 such that the lines of the labels 630, 640 were aligned. The arrangement of the labels resembled the alignment means 610, 620, 630, 640 as shown in FIGS. 2D, 6 and 7.

After affixing the alignment means 600 to the device 100, it was observed that the plunger element 482 of the first distance measurement device 470 was in contact with the first clamp base member 300 (i.e., the first clamp base member located proximate to the alignment end 245 of the first adjustable member 240) and the first distance measurement device 470 was then tared (i.e., zeroed-out). Similarly, it was observed that the plunger element 502 of the second distance measurement device 490 was in contact with the second clamp base member 330 (i.e., the second clamp base member located proximate to the alignment end 255 of the second adjustable member 250) and the second distance measurement device 490 was then tared. The device was now ready for use.

The first adjustment element 430 of the first adjustment subassembly 140A and the second adjustment element 440 of the second adjustment subassembly 140B were each manipulated (rotated counter-clockwise in this Example 1) to move the first and second adjustment elements 240, 250, respectively, in a longitudinal 116 direction (towards the calibration end 106 of the device 100), each to a predetermined setting (as measured by the first and second distance measurement devices 470, 490, respectively) to achieve a particular fletching jig assembly alignment configuration. Accordingly, each fletching jig assembly 700 (and thus each fletching clamp member 770 by virtue of each fletching assembly 150) was precisely aligned to an accuracy within 0.01 inch or less.

The fletching clamp members 770 were then each removed from the device 100. Six (6) arrow shafts 802 were provided which did not have nock components 806 attached thereto. With the nock ends 814 of each shaft 802 facing the nock side 104 of the device 100, shaft components 802 were each placed onto a respective arrow shaft cradle element 726 of the six (6) arrow shaft support members 710 (i.e., one arrow 800 per arrow shaft support member 710) of the device 100, and the nock end 814 of each shaft component 802 was then inserted snugly onto the respective Zenith nock receiver.

An EASTON DIAMOND HD 3" VANE fletching component 808 (available from Easton Technical Products, Inc., having a place of business located in Salt Lake City, Utah, USA) was placed and secured into each of the six (6) fletching clamp members 770 (and held in place via the force provided by the spring biasing means 784), such that approximately 0.5 mm of the fletching component 808 extended (i.e. was exposed) along the bottom side 772 of each fletching clamp member 770 wherein the edge or quill of each fletching component 808 was exposed (i.e., extended externally from the fletching clamp member 770). A bead of liquid adhesive glue was disposed upon the exposed edge of each fletching component 808, and the fletching clamp members 770 (each containing a fletching component 808 with adhesive) were properly attached to the six (6) clamp mounting members 740 (i.e., one fletching clamp member 770 per clamp mounting member 740) such that the exposed edge of each fletching component 808 (coated with adhesive) was in contact with the respective shaft component 802 along substantially the entire length of the fletching components 808 (starting from about 1 inch (25.4 mm) from the nock end 814 of the shaft component 802). The fletching clamp members 770 were each held in place upon the respective clamp mounting members 740 via magnetic attachment means 756 disposed within each clamp mounting member 740, such that the inventive device 100 appeared similar to the device 100 shown in FIGS. 2A-2C.

The adhesive was allowed to dry until fully cured. For this Example 1, each shaft component 802 was then rotated 120° (via a rotation control means 725) and the process was repeated to affix a second fletching component 808 to each arrow shaft 802. Upon the adhesive fully curing, each shaft component 802 was again rotated 120° and the process was repeated again to affix a third fletching component 808 to each arrow shaft 802. Upon the adhesive once again fully curing, each arrow 800 was removed from the inventive device 100 to provide six (6) arrows 800, each comprising three (3) precisely aligned fletching components 808.

The spacing between the point ends 813 of each fletching component 808 on each arrow 800 was measured and found to be within 0.01 inch (0.25 mm) of each other (both within each arrow 800 and in comparison to each arrow 800). The spacing between the nock ends 814 of each fletching component 808 on each arrow 800 was then measured and was also found to be within 0.01 inch (0.25 mm) of each other (both within each arrow 800 and in comparison to each arrow 800).

It will be appreciated that details of the foregoing examples, given for purposes of illustration, are not to be construed as limiting the scope of the present invention. Although only a few exemplary embodiments of the present invention have been described in detail above, persons having ordinary skill in the art will readily appreciate that many modifications are possible in the examples without materially departing from the novel teachings and advantages of this invention. For example, features described in relation to one example may be incorporated into any other example of the invention.

Accordingly, all such modifications are intended to be included within the scope of the present invention, which is defined in the following claims and all equivalents thereto. Further, it is recognized that many embodiments may be conceived that do not achieve all of the advantages of some embodiments, particularly of the desirable embodiments, yet the absence of a particular advantage shall not be construed to necessarily mean that such an embodiment is outside the scope of the present invention. As various changes could be made in the above constructions without departing from the scope of the invention, it is intended that all matter contained in the above description shall be interpreted as illustrative and not in a limiting sense.

What is claimed is:

1. A fletching jig alignment device for aligning a fletching component to a shaft component of an arrow comprising a base assembly, a fletching assembly and an adjustment assembly, and further comprising an alignment accuracy of about 0.01 inch or less;

wherein the base assembly comprises a base member, a first jig support base member, a second jig support base member, a first adjustable member and a second adjustable member;

wherein the base member comprises a top side, a bottom side, a point side, a nock side, an adjustment end and a calibration end, and wherein the first jig support base member, the second jig support base member, the first adjustable member and the second adjustable member are disposed upon the top side of the base member; and wherein the first jig support base member is disposed proximate to the point side of the base member, the second adjustable member is disposed proximate to the nock side of the base member, the first adjustable member is disposed between the first jig support base member and the second adjustable member, and the second jig support base member is disposed between the first adjustable member and the second adjustable member.

2. The fletching jig alignment device of claim 1, wherein an alignment of the fletching component is adjustable in a longitudinal direction with respect to the device.

3. The fletching jig alignment device of claim 1, wherein the device is capable of aligning a fletching component to a shaft component of a plurality of arrows simultaneously.

4. The fletching jig alignment device of claim 1, wherein the device can further provide for attachment of the fletching component to the shaft component.

5. The fletching jig alignment device of claim 1, wherein the device comprises a plurality of fletching assemblies.

6. A fletching jig alignment device comprising a base assembly, a fletching assembly and an adjustment assembly;

wherein the base assembly comprises a base member, a first jig support base member, a second jig support base member, a first adjustable member and a second adjustable member;

wherein the base member comprises a top side, a bottom side, a point side, a nock side, an adjustment end and a calibration end, and wherein the first jig support base member, the second jig support base member, the first adjustable member and the second adjustable member are disposed upon the top side of the base member; and wherein the first jig support base member is disposed proximate to the point side of the base member, the second adjustable member is disposed proximate to the nock side of the base member, the first adjustable member is disposed between the first jig support base member and the second adjustable member, and the second jig support base member is disposed between the first adjustable member and the second adjustable member.

7. The fletching jig alignment device of claim 6, wherein the first adjustable member and the second adjustable member are each positionally adjustable in at least a longitudinal direction with respect to the base member.

8. The fletching jig alignment device of claim 6, wherein the fletching assembly comprises an arrow shaft support base member, a first clamp base member, a second clamp base member and a fletching jig assembly.

9. The fletching jig alignment device of claim 8, wherein the arrow shaft support base member is disposed upon the first jig support base member and the second jig support base member, the first clamp base member is disposed upon the first adjustable member, and the second clamp base member is disposed upon the second adjustable member.

10. The fletching jig alignment device of claim 9, wherein the fletching jig assembly is disposed upon the arrow shaft support base member, the first clamp base member, and the second clamp base member.

11. The fletching jig alignment device of claim 10, wherein the fletching jig assembly comprises an arrow shaft support member adapted to hold a shaft component of an arrow, a clamp mounting member, and a fletching clamp member adapted to secure a fletching component of the arrow.

12. The fletching jig alignment device of claim 11, wherein the arrow shaft support member is disposed upon the arrow shaft support base member, the clamp mounting member is disposed upon the first clamp base member and the second clamp base member, and the fletching clamp member is removably disposed upon the clamp mounting member.

13. The fletching jig alignment device of claim 6, wherein the adjustment assembly comprises a first adjustment subassembly and a second adjustment subassembly.

14. The fletching jig alignment device of claim 13, wherein the first adjustment subassembly is disposed at least upon the base member proximate to the adjustment end thereof and is substantially longitudinally aligned with the first adjustable member, and wherein the second adjustment subassembly is disposed at least upon the base member proximate to the adjustment end thereof and is substantially longitudinally aligned with the second adjustable member.

15. The fletching jig alignment device of claim 14, wherein the first adjustment subassembly comprises a first adjustment assembly support member disposed upon the base member, a first adjustment base member disposed upon the first adjustable member, a first adjustment element extending from the first adjustment assembly support member to the first adjustment base member, and a first distance measurement device disposed upon the first adjustment assembly support member, and wherein the second adjustment subassembly comprises a second adjustment assembly support member disposed upon the base member, a second adjustment base member disposed upon the second adjustable member, a second adjustment element extending from the second adjustment assembly support member to the second adjustment base member, and a second distance measurement device disposed upon the second adjustment assembly support member.

16. The fletching jig alignment device of claim 15, wherein the first adjustment subassembly can adjust the position of the first adjustable member with an accuracy of about 0.01 inch or less, and wherein the second adjustment subassembly can adjust the position of the second adjustable member with an accuracy of about 0.01 inch or less.

17. The fletching jig alignment device of claim 15, wherein the first adjustment subassembly further comprises a biasing means, and wherein the second adjustment subassembly further comprises a biasing means.

18. The fletching jig alignment device of claim 6, wherein the device comprises a plurality of fletching assemblies.

19. The fletching jig alignment device of claim 18, wherein the fletching jig alignment device can adjustably align the plurality of fletching assemblies simultaneously.

20. The fletching jig alignment device of claim 18, wherein the fletching jig alignment device can adjustably align the plurality of fletching assemblies with an accuracy of about 0.01 inch or less.

21. A method for aligning a fletching jig assembly comprising:

a) providing a fletching jig alignment device comprising a base assembly, a fletching assembly and an adjustment assembly; wherein the base assembly comprises a first jig support base member, a second jig support base member, a first adjustable member and a second adjustable member; wherein the base member comprises a top side, a bottom side, a point side, a nock side, an adjustment end and a calibration end; wherein the first jig support base member, the second jig support base member, the first adjustable member and the second adjustable member are disposed upon the top side of the base member; wherein the first jig support base member is disposed proximate to the point side of the base member, the second adjustable member is disposed proximate to the nock side of the base member, the first adjustable member is disposed between the first jig support base member and the second adjustable member, and the second jig support base member is disposed between the first adjustable member and the second adjustable member; wherein the adjustment assembly comprises a first adjustment subassembly and a second adjustment subassembly, and wherein the fletching assembly comprises a fletching jig assembly; and b) manipulating the first adjustment subassembly to positionally adjust the first adjustable member and manipulating the second adjustment assembly to positionally adjust the second adjustable member to attain a fletching jig assembly alignment configuration.

22. The method of claim 21, wherein the fletching jig assembly comprises an arrow shaft support member, a clamp mounting member, and a fletching clamp member, and wherein the method further comprises:

a) providing a shaft component of an arrow;
b) providing a fletching component of an arrow;
c) removing the fletching clamp member from the fletching jig alignment device;
d) suitably securing the shaft component upon the arrow shaft support member;
e) suitably securing a fletching component into the fletching clamp member; and
f) affixing the fletching clamp member to the clamp mounting member such that an exposed edge of the fletching component is in contact with the shaft component.

23. The method of claim 22, further comprising:

a) applying an attachment means to the exposed edge of the fletching component; and
b) attaching the fletching component to the shaft component.

24. The method of claim 22, wherein the steps of the method of claim 22 are performed prior to the manipulating step of claim 21.

25. The method of claim 21, wherein the fletching jig assembly alignment configuration comprises an accuracy of about 0.01 inch or less.

26. The method of claim 21, wherein the fletching jig alignment device comprises a plurality of fletching assemblies.

27. The method of claim 26, wherein the fletching jig assembly alignment configuration of each of the plurality of fletching assemblies is achieved simultaneously.

28. The method of claim 26, wherein the fletching jig assembly alignment configuration of each of the plurality of fletching assemblies comprises an accuracy of about 0.01 inch or less.

* * * * *